(12) United States Patent
Munoz et al.

(10) Patent No.: US 11,937,065 B2
(45) Date of Patent: Mar. 19, 2024

(54) ADJUSTMENT OF PARAMETER SETTINGS FOR EXTENDED REALITY EXPERIENCES

(71) Applicant: QUALCOMM Incorporated, San Diego, CA (US)

(72) Inventors: Isaac Garcia Munoz, San Diego, CA (US); Siddhartha Goutham Swaminathan, San Diego, CA (US); Nils Günther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 16/918,754

(22) Filed: Jul. 1, 2020

(65) Prior Publication Data

US 2021/0006921 A1    Jan. 7, 2021

Related U.S. Application Data

(60) Provisional application No. 62/870,570, filed on Jul. 3, 2019.

(51) Int. Cl.
*H04S 7/00* (2006.01)
*G06F 3/16* (2006.01)

(52) U.S. Cl.
CPC .............. *H04S 7/301* (2013.01); *G06F 3/165* (2013.01); *H04S 7/305* (2013.01); *H04S 7/307* (2013.01)

(58) Field of Classification Search
CPC .......... H04S 7/301; H04S 7/305; H04S 7/307; H04S 7/306; G06F 3/165
See application file for complete search history.

(56) References Cited

U.S. PATENT DOCUMENTS

| 10,657,974 B2 | 5/2020 | Kim et al. |
| 2010/0014682 A1* | 1/2010 | Shin ...................... H03G 3/3026 |
| | | 381/57 |
| 2011/0013790 A1* | 1/2011 | Hilpert .................. G10L 19/008 |
| | | 381/1 |

(Continued)

FOREIGN PATENT DOCUMENTS

WO    2018064528 A1    4/2018

OTHER PUBLICATIONS https://www.mdpi.com/1424-8220/23/10/4645 (last accessed Aug. 25, 2023.*

(Continued)

*Primary Examiner* — Akelaw Teshale
(74) *Attorney, Agent, or Firm* — QUALCOMM Incorporated; Espartaco Diaz Hidalgo

(57) ABSTRACT

Systems and methods for determining parameter adjustments for a capture of audio are disclosed. The systems and methods includes processing circuitry configured to access at least one energy map that corresponds to one or more audio streams. The processing circuitry may then determine, from the at least one energy map, a parameter adjustment with respect to at least one audio element. The parameter adjustment may be configured to adjust the capture of audio by the at least one audio element. In addition, the process circuitry may be configured to output an indication indicating the parameter adjustment with respect to the at least one audio element.

30 Claims, 22 Drawing Sheets

(56) References Cited

U.S. PATENT DOCUMENTS

| | | |
|---|---|---|
| 2011/0035033 A1* | 2/2011 | Friedenberger .... H04N 21/4398 700/94 |
| 2011/0249821 A1 | 10/2011 | Jaillet et al. |
| 2015/0063599 A1* | 3/2015 | Ring ..................... H04R 1/1083 381/107 |
| 2016/0014513 A1 | 1/2016 | McCoy et al. |
| 2017/0048615 A1* | 2/2017 | Son ........................ H03G 5/165 |
| 2018/0088900 A1 | 3/2018 | Glaser et al. |
| 2018/0205897 A1* | 7/2018 | Kim ..................... H04N 25/778 |
| 2018/0206057 A1* | 7/2018 | Kim ..................... G10L 19/008 |
| 2018/0357038 A1* | 12/2018 | Olivieri ................... H04S 7/303 |
| 2019/0007781 A1 | 1/2019 | Peters et al. |
| 2020/0322743 A1* | 10/2020 | Cengarle ................. H04S 1/002 |
| 2021/0006921 A1* | 1/2021 | Munoz .................... G06F 3/165 |
| 2021/0191685 A1* | 6/2021 | Bharitkar ................ G06F 3/165 |

OTHER PUBLICATIONS www.techopedia.com/definition/11155/capture-data-acquisition#:~:text=Similarly%2C%20audio,to%20digitally%20recording%20analog%20audio (emphasis added) (last accessed Aug. 25, 2023.*

Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.

ETSI TS 103 589 V1.1.1, "Higher Order Ambisonics (HOA) Transport Format", Jun. 2018, 33 pages.

Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), pp. 770-779, XP055243182, US ISSN: 1932-4553, DOI: 10.1109/JSTSP.2015.2411578.

Hollerweger F., "An Introduction to Higher Order Ambisonic", Oct. 2008, pp. 1-13, Accessed online [Jul. 8, 2013].

"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.

"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.

"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.

International Search Report and Written Opinion—PCT/US2020/040691—ISA/EPO—dated Oct. 13, 2020 15 Pages.

ISO/IEC/JTC: "ISO/IEC JTC 1/SC 29 N ISO/IEC CD 23008-3 Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].

Peterson J., et al., "Virtual Reality, Augmented Reality, and Mixed Reality Definitions", EMA, version 1.0, Jul. 7, 2017, 4 Pages.

Poletti M.A., "Three-Dimensional Surround Sound Systems Based on Spherical Harmonics", The Journal of the Audio Engineering Society, vol. 53, No. 11, Nov. 2005, pp. 1004-1025.

Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.

Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. M31827, Jan. 11, 2014 (Jan. 11, 2014), 83 Pages, XP030060280.

Sen D., et al., "Technical Description of the Qualcomm's HoA Coding Technology for Phase II", 109. MPEG Meeting, Jul. 7, 2014-Jul. 11, 2014; Sapporo, (Motion Picture Expert Group or ISO/IEC JTC1/SC29/WG11), No. M34104, Jul. 2, 2014 (Jul. 2, 2014), 4 Pages, XP030062477.

U.S. Appl. No. 16/918,441, filed Jul. 1, 2020.

U.S. Appl. No. 62/870,570, filed Jul. 3, 2019, 97 Pages.

Zheng X., "Soundfield Navigation: Separation Compression and Transmission", School of Electrical, Computer, and Telecommunications Engineering, University of Wollongong, 2013, 254 Pages.

International Preliminary Report on Patentability—PCT/US2020/040691, The International Bureau of WIPO—Geneva, Switzerland, dated Jan. 13, 2022 9 Pages.

* cited by examiner

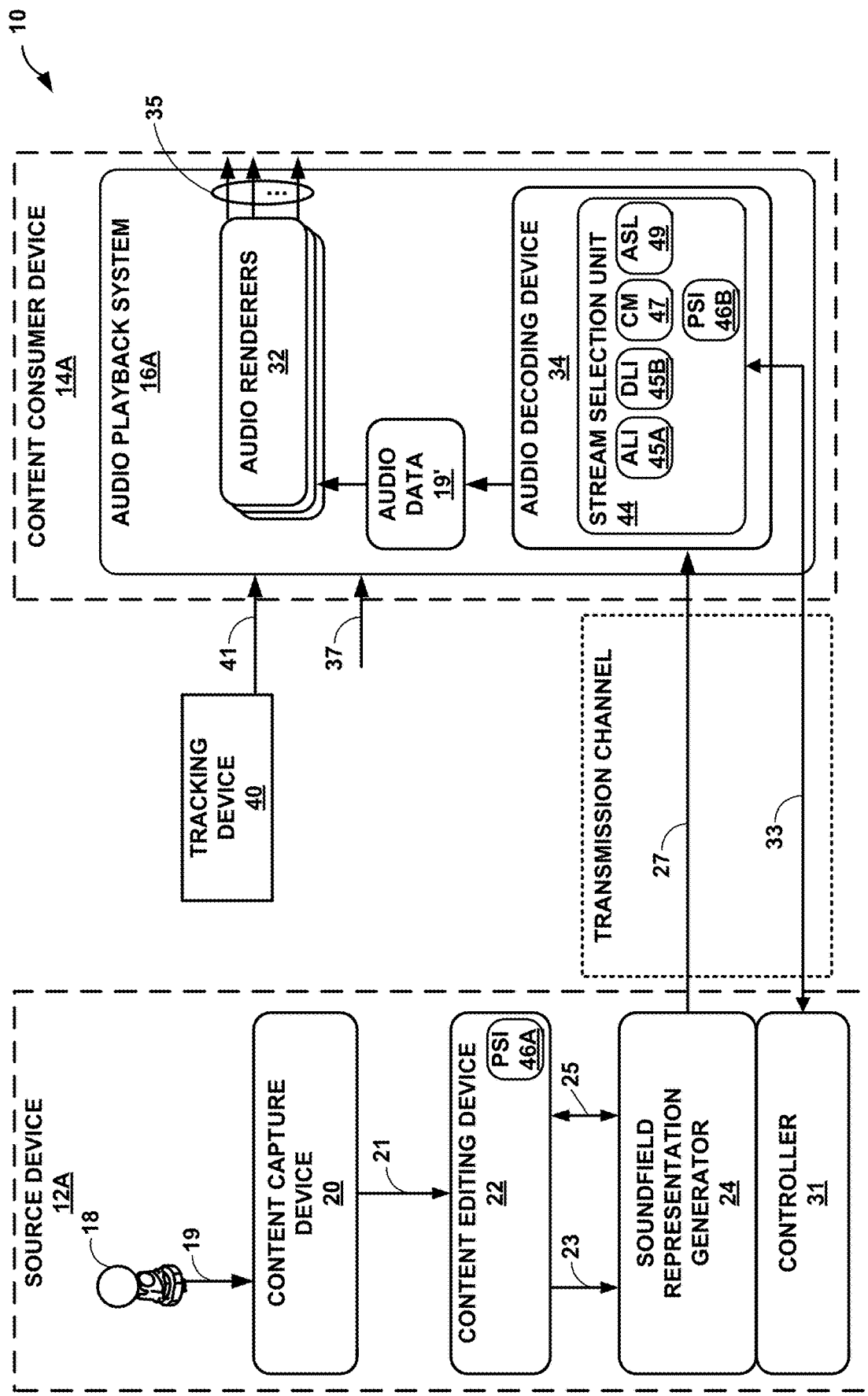

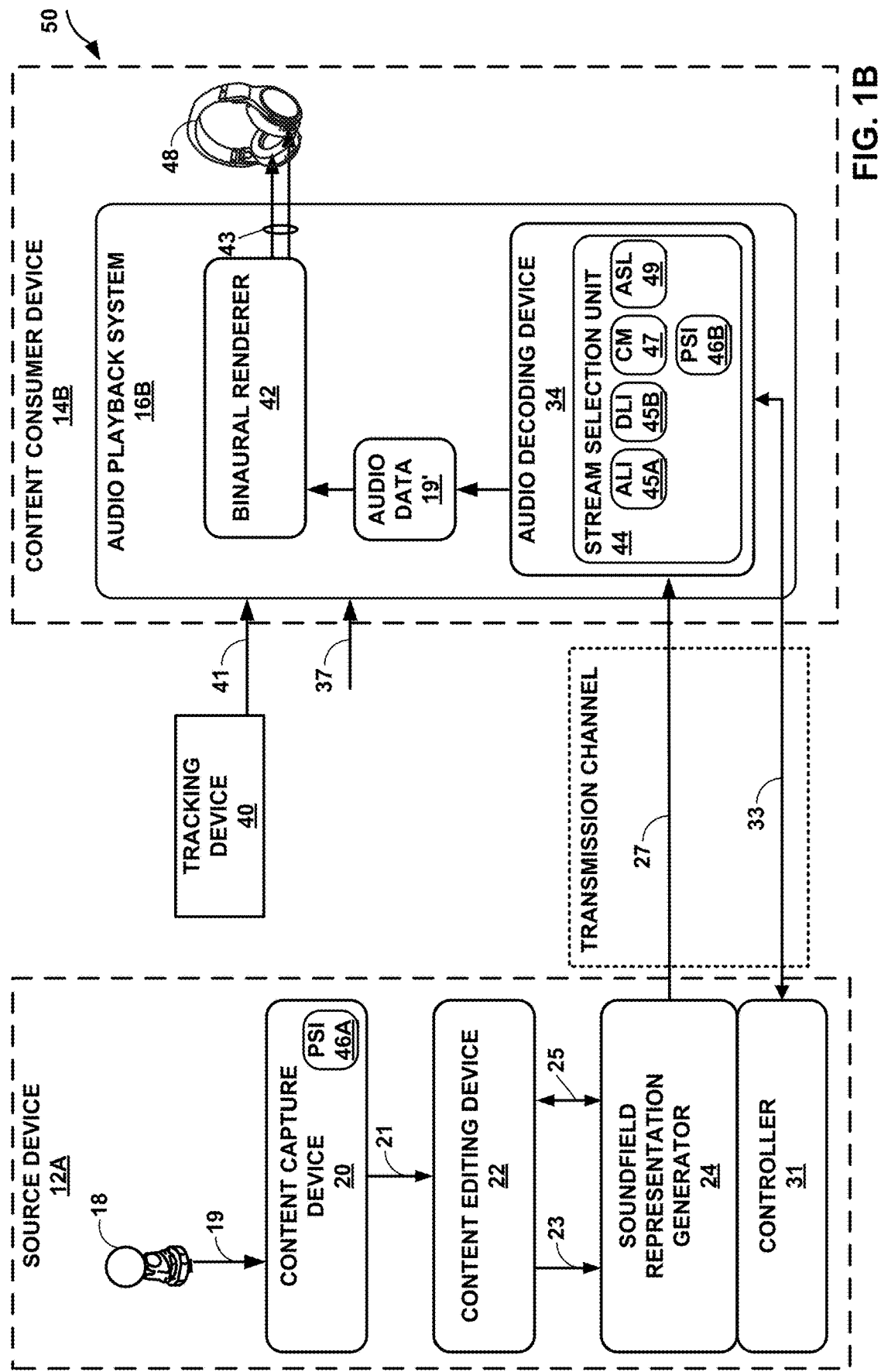

ADJUSTMENT OF PARAMETER SETTINGS FOR EXTENDED REALITY EXPERIENCES

This application claims the benefit of U.S. Provisional Application No. 62/870,570, entitled "ADJUSTMENT OF PARAMETER SETTINGS FOR EXTENDED REALITY EXPERIENCES," filed Jul. 3, 2019, the entire contents of which are hereby incorporated in their entirety as though set forth fully herein.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems is generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for adaptive audio capture, rendering for extended reality systems, and compensation for parameter setting discrepancies via one or more parameter adjustments. Various aspects of the techniques may provide for adaptive audio capture or synthesis and rendering of an acoustical space for extended reality (XR) systems. As used herein, an acoustic environment is represented as either an indoor environment or an outdoor environment, or both an indoor environment and an outdoor environment. The acoustic environment may include one or more sub-acoustic spaces that may include various acoustic elements. An example of an outdoor environment could include a car, buildings, walls, a forest, etc. An acoustical space may be an example of an acoustical environment and may be an indoor space or an outdoor space. As used herein, an audio element is either a sound captured by a microphone (e.g., directly captured from near-field sources or reflections from far-field sources whether real or synthetic), or a sound field previously synthesized, or a sound synthesized from text to speech, or a reflection of a virtual sound from an object in the acoustic environment.

In one example, various aspects of the techniques are directed to a device configured to determine parameter adjustments for a capture of audio, the device including a memory configured to store at least one energy map that corresponds to one or more audio streams; and one or more processors coupled to the memory, and configured to access the at least one energy map that corresponds to the one or more audio streams, determine, based at least in part on the at least one energy map, a parameter adjustment with respect to at least one audio element, the parameter adjustment configured to adjust the capture of audio by the at least one audio element, and output the parameter adjustment.

In another example, various aspects of the techniques are directed to a method for determining parameter adjustments for a capture of audio, the method including accessing at least one energy map, the at least one energy map corresponding to one or more audio streams, determining, based at least in part on the at least one energy map, a parameter adjustment with respect to at least one audio element, the parameter adjustment configured to adjust the capture of audio by the at least one audio element, and outputting an indication indicating the parameter adjustment with respect to the at least one of audio element.

In another example, various aspects of the techniques are directed to a device configured to determine parameter adjustments for a capture of audio, the device including means for accessing at least one energy map, the at least one energy map corresponding to one or more audio streams, means for determining, based at least in part on the at least one energy map, a parameter adjustment with respect to at least one audio element, the parameter adjustment configured to adjust the capture of audio by the at least one audio element, and means for outputting an indication indicating the parameter adjustment with respect to the at least one audio element.

In another example, various aspects of the techniques are directed to a non-transitory computer-readable storage medium having stored thereon instructions that, when executed, cause one or more processors to access at least one energy map that corresponds to one or more audio streams, determine, based at least in part on the at least one energy map, a parameter adjustment with respect to at least one audio element, the parameter adjustment configured to adjust the capture of audio by the at least one audio element, and output an indication indicating the parameter adjustment with respect to the at least one audio element.

In another example, various aspects of the techniques are directed to a device configured to generate a soundfield, the device including a memory configured to store audio data representative of the soundfield; and one or more processors coupled to the memory, and configured to transmit an audio stream to one or more source devices, determine an instruction to adjust a parameter setting of an audio element, and adjust the parameter setting to adjust generation of the soundfield.

In another example, various aspects of the techniques are directed to a method of adjusting parameter settings for generation of a soundfield, the method including transmitting an audio stream to one or more source devices, determining an instruction to adjust a parameter setting of an audio element, and adjusting the parameter setting to adjust generation of the soundfield.

In another example, various aspects of the techniques are directed to a device configured to generate a soundfield, the device including means for transmitting an audio stream to one or more source devices, means for determining an instruction to adjust a parameter setting of an audio element, and means for adjusting the parameter setting to adjust generation of the soundfield.

In another example, various aspects of the techniques are directed to a non-transitory computer-readable storage medium having stored thereon instructions that, when executed, cause one or more processors to transmit an audio stream to one or more source devices, determine an instruction to adjust a parameter setting of an audio element, and adjust the parameter setting to adjust generation of the soundfield.

The details of one or more examples of this disclosure are set forth in the accompanying drawings and the description below. Other features, objects, and advantages of various aspects of the techniques will be apparent from the description and drawings, and from the claims.

BRIEF DESCRIPTION OF DRAWINGS

FIGS. 1A-1C are diagrams illustrating systems that may perform various aspects of the techniques described in this disclosure.

DETAILED DESCRIPTION

Figure 1C:
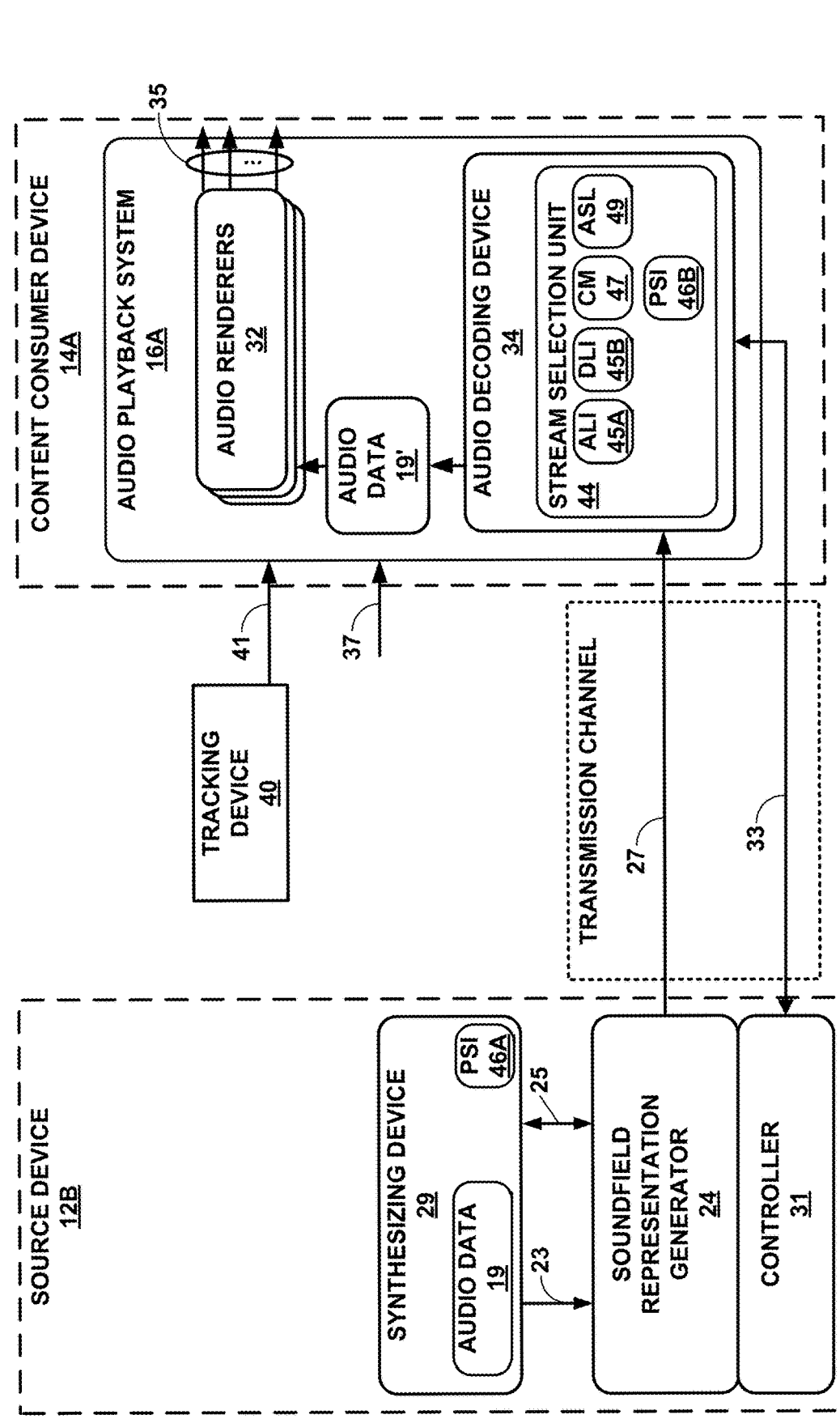

The techniques of this disclosure generally relate to the adjustment of certain audio elements configured to facilitate the rendering of audio in an extended reality (XR) systems. In particular, the disclosed technology relates to determining ideal parameter settings for audio elements configured to capture or synthesize audio data for an XR system. Multiple audio elements may be working in tandem to provide an audio experience for an XR experience. In an example, the XR system may utilize various audio elements, such as audio receivers (e.g., microphones) or audio synthesizers, configured to capture and/or generate (e.g., produce, reproduce, recreate, synthesize, etc.) audio data representative of a particular soundfield in an environment. In an example, the XR system may utilize audio elements configured to synthesize audio data for providing audio in the XR experience. In some examples, a user may utilize a computer program to generate audio for an XR experience. In any case, audio elements configured to capture or generate audio in XR systems may do so based on the application of adjustable parameter settings that condition audio signals or audio elements. When properly compensated across devices, audio streams may be provided in a uniform or equalized manner. Without proper compensation between audio elements, the audio elements may not provide an immersive XR experience and may ultimately, disorient or confuse a user attempting to experience the XR space (e.g., the XR world, virtual world, AR world, etc.).

Parameter setting(s) for an audio element may not necessarily be initially coordinated or compatible with respect to other audio elements configured to contribute audio streams for the rendering of an immersive audio experience. In an example, two microphones capturing audio of a common soundfield may apply different gain settings when capturing the audio within the common soundfield. In another example, two microphones from different manufacturers or suppliers may apply similar gain settings, but due to differences in manufacturing, the two microphones may do so in a way that nevertheless results in variations in the generated audio data. In another example, a source device may provide synthesized audio that is to be included with other another audio rendering, such from audio captured by a microphone or other audio receiving device. In such examples, parameter settings may need to be synchronized such that a user experiencing the audio may not perceive differences in the audio renderings from the various different audio elements. A lack of coordination between audio elements may especially become apparent where a user manually alters parameter settings, such as where the user adjusts the gain with respect to high frequency sounds for an audio-receiving device or audio synthesizing device, or as mentioned, where a system of audio elements includes audio elements from different manufacturers or suppliers.

According to the techniques of this disclosure, an XR device may receive an energy map for each audio element (e.g., microphone, synthesized sound source, etc.) in a constellation of audio elements. An energy map corresponds to an audio representation of the audio captured or synthesized via the audio element. The XR device may also form a composite energy map that encompasses several energy maps that correspond to different audio elements implementing audio streams in an XR environment. Based on the energy maps, the XR device may cause an adjustment to the parameter settings for one or more of the audio elements where the energy maps vary from the energy maps of other audio elements in the same audio environment. The XR device may cause parameter adjustments by transmitting adjustment instructions to an audio element, such as an instruction to adjust a gain of a microphone in an environment to align with the sound generated by other audio elements (e.g., microphones, etc.) in the environment as determined from the energy maps. In some examples, the XR device may cause parameter adjustments when decoding audio data received from a source device or may adjust parameters of an audio stream when rendering the audio using an audio renderer.

Additionally, the XR device may determine an operational status from the various audio element implemented in an environment. In an example, the XR device may receive a sample of audio from a microphone or may receive other status data from a microphone indicating a current operational status of the audio element. The operational status may include a signal-to-noise ratio (SNR) indicating that the microphone is currently operating to generate audio that does or does not satisfy a predefined SNR threshold.

In an illustrative and non-limiting example, a first audio element (e.g., a microphone) may be unable to generate a high quality audio signal due to the first audio element being in the pocket of a person during an audio capture. As such, the XR device may determine the operational status of the first audio element indicates the SNR of the first audio element is below a predefined SNR threshold (e.g., does not satisfy the SNR threshold). In such examples, the XR device may, prior to forming or updating a composite energy map for the constellation, remove the ineligible first audio element from a constellation set of other audio elements. As such, an XR device may determine an audio element to be an ineligible audio element where the audio element is, for example, corrupt, noisy (e.g., poor SNR), not generating sound, and so on. In another example, the XR device may disable or remove the audio stream of the first audio element from a plurality of audio streams prior to forming or updating a composite energy map for the constellation. In this way, the XR device may form a composite energy map that the XR device is then configured to reference as a baseline for comparing against additional energy maps of various other audio elements.

In some examples, the XR device may determine, based upon the composite energy map, parameter adjustments to transmit to valid (e.g., eligible) audio elements in the constellation set of audio elements. In an example, the XR device may compare the composite energy map to an energy map of an audio element, and based upon the comparison, the XR device may determine parameter adjustments for conditioning audio data obtained from an audio element (e.g., gain adjustments, etc.). In this way, the XR device may effectively lessen variations between individual energy maps in view of energy maps determined for audio streams of other audio elements, such as in view of a composite energy map generated from multiple energy maps.

According to one or more of the various techniques of this disclosure, an XR device may determine certain parameter adjustments for audio elements. The XR device may be configured to apply the parameter adjustments during the capture of audio data, during the synthesis of audio data, or at a time when the XR device renders the audio data, such as to render aspects of the audio experience for providing an XR experience to the user. In an example, the parameter adjustment may include an adjustment to a gain parameter setting for a particular audio element in a constellation set of audio elements or the disablement of the audio element, such as where the audio element is generating corrupt or otherwise noisy audio.

In some examples, the parameter adjustment may further include disabling an audio element or excluding an audio element where infeasible to use audio from the audio element, such as where certain privacy restrictions may be set by the user. In such instances, the XR device is configured to exclude energy maps of the disabled audio elements when forming a composite energy map. Following particular parameter adjustments, the user may perceive, when utilizing the XR device, an equalized and immersive XR experience. In addition, the XR device may conserve processing and memory resources by identifying and excluding certain audio elements from a constellation set of audio elements that are configured to capture audio data from and/or in a common soundfield. This is because the XR device may utilize those resources efficiently to manage and analyze energy maps for only those audio elements that are able to provide the equalized and immersive XR experience.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to generate a soundfield.

Object-based audio formats may refer to formats in which audio objects, often encoded using pulse-code modulation (PCM) and referred to as PCM audio objects, are specified in order to represent the soundfield. Such audio objects may include location information (e.g., metadata) identifying a location of the audio object relative to a listener or other point of reference in the soundfield, such that the audio object may be rendered to one or more speaker channels for playback in an effort to generate the soundfield. The techniques described in this disclosure may apply to any of the following formats, including scene-based audio formats, channel-based audio formats, object-based audio formats, or any combination thereof.

Scene-based audio formats may include a hierarchical set of elements that define the soundfield in three dimensions (3D). One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (e.g., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k)=g(\omega)(-4\pi i k)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in 3D in a manner that potentially enables accurate 3D localization of sound sources within the soundfield. As such, XR devices may render the ambisonic coefficients to speaker feeds that, when played via one or more speakers or headphones, accurately generate the soundfield.

As another example, the ambisonic coefficients may be translated or rotated to account for user movement without overly complex mathematical operations, thereby potentially accommodating the low latency requirements of XR devices. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR devices may enable development of a number of use cases that rely on the more immersive soundfields provided by the ambisonic coefficients, particularly for computer gaming applications and live video streaming applications. In these highly dynamic use cases that rely on low latency generation (e.g., reproduction) of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to a VR device, various aspects of the techniques may be performed in the context of other devices, such as a mobile device, speaker, audio element (e.g., microphone, synthesized audio source, etc.), or other XR device(s). In an illustrative and non-limiting example, a mobile device (such as a so-called smartphone) may present the acoustical space (e.g., via a speaker, one or more headphone(s), etc.). The mobile device, or at least portions thereof, may be mounted to the head of the user or viewed as would be done when normally using the mobile device. That is, any information generated via a speaker, headphone, or audio element, as well as any information on a screen of the mobile device, can be considered as part of the mobile device. The mobile device may be able to provide tracking information and thereby allow for both an XR experience (when head mounted) and a normal experience to experience the acoustical space, where the normal experience may still allow the user to experience the acoustical space providing an XR-lite-type experience (e.g., holding up the device and rotating, moving, or translating the device to experience different portions of the acoustical space). Additionally, the techniques of this disclosure may also be used with a displayed world that may, in some instances, correspond to an acoustical space, where the displayed world may be presented on a screen of the XR device (e.g., the mobile device, a VR device, etc.).

FIGS. 1A-1C are diagrams illustrating systems that may perform various aspects of the techniques described in this disclosure. As shown in the example of FIG. 1A, system 10 includes a source device 12A and a content consumer device 14A. While described in the context of the source device 12A and the content consumer device 14A, the techniques may be implemented in any context in which any representation of a soundfield is encoded to form a bitstream representative of the audio data (e.g., an audio stream). Moreover, the source device 12A may represent any form of computing device capable of generating the representation of a soundfield and is generally described herein in the context of being a VR content creator device. Likewise, the content consumer device 14A may represent any form of computing device capable of implementing audio compensation techniques described in this disclosure as well as audio playback and is generally described herein in the context of being a VR client device.

The source device 12A may be operated by an entertainment company or other entity that may generate multi-channel audio content for consumption by operators of content consumer devices, such as the content consumer device 14A. In some VR scenarios, the source device 12A generates audio content in conjunction with video content. The source device 12A includes a content capture device 20, a content editing device 22, and a soundfield representation generator 24. The content capture device 20 may be configured to interface or otherwise communicate with a microphone 18 or other audio element.

The microphone 18 may represent an Eigenmike® or other type of three-dimensional (3D) audio microphone capable of capturing and representing the soundfield as audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19. Audio data 19 may represent an audio stream or include an audio stream.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via microphone 18, the content capture device 20 may process the audio data 19 after the audio data 19 is input via some type of removable storage, wirelessly and/or via wired input processes. In an example, the content capture device 20 may process the audio data 19 after the audio data 19 is input, and in conjunction with processing the input audio data 19, the content capture device 20 may capture audio data 19 via microphone 18. In some examples, the audio data 19 may include layers of audio types. In an example, the content capture device 20 may output the audio data 19 as including previously-stored audio data 19, such as a previously recorded audio input, layered together with audio captured in conjunction with the real-time or near real-time processing of the previously-stored audio data 19. It will be understood that various other combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing (e.g., signal conditioning)). In some examples, the content editing device 22 is a physically separate device from content capture device 20.

The content editing device 22 may represent a unit configured to edit or otherwise alter content 21 received from content capture device 20, including the audio data 19. The content editing device 22 may output edited content 23 and associated metadata 25 to the soundfield representation generator 24. Metadata 25 may include privacy restriction metadata, feasibility metadata, parameter setting information (PSI), audio location information, and other audio metadata. In an example, content editing device 22 may apply parameter adjustments, such as adjustments that may be defined by the PSI, to audio data 19 or to content 21 (e.g., gain parameters, frequency response parameters, SNR parameters, etc.) and generate edited content 23 therefrom.

In some examples, the content editing device 22 may apply parameter settings, such as gain, frequency response, compression, compression ratio, noise reduction, directional microphones, translation/compression, and/or an equalization setting, to modify or condition a capture of incoming audio and/or to modify or condition an outgoing audio stream (e.g., soundfield synthesized so as to be rendered to appear as though an audio stream was captured at a particular location in a virtual or non-virtual world or other generated soundfield). The parameter settings may be defined by PSI 46A. PSI 46A may include information received from content consumer device 14A via a side channel 33 or via bitstream 27. PSI 46A may define an adjustment to a parameter setting, such as a gain adjustment, frequency response adjustment, compression adjustment, or otherwise an equalization setting.

In another example, content consumer device 14A may transmit one or more energy maps, such as a composite energy map, to source device 12A. Source device 12A may receive the one or more energy maps and determine PSI 46A based on the one or more energy maps. Source device 12A may apply an adjusted parameter setting to the capture of audio data 19, where the adjusted parameter setting is defined by PSI 46A. Source device 12A may then transmit audio data 19 via bitstream 27 to content consumer device 14A, where the bitstream 27 has been conditioned based on the determined PSI 46A. As such, content consumer device 14A may receive a bitstream 27 (e.g., an audio stream) from source device 12A that conforms to the one or more energy maps without content consumer device 14A needing to perform additional conditioning of bitstream 27 (e.g., the audio signal) to align the audio stream with other audio streams of other source devices 12 (e.g., one or more source devices 12B of FIG. 1C, other source devices 12A, one or more source device 12C of FIG. 7A or 7B, etc.).

In some examples, content editing device 22 may generate edited content 23 that includes audio data 19 with PSI 46A applied to the audio data 19. In addition, content editing device 22 may generate metadata 25 which may include PSI 46A. In such examples, source device 12A may communicate the parameter settings applied via PSI 46A to content consumer device 14A, either before adjusting PSI 46A based on PSI 46B or after. In this way, content consumer device 14A may determine an adjustment to the parameter settings based on the current parameter settings of source device 12A as those settings relate to an energy map of an audio stream (e.g., bitstream 27) and a difference between the energy map and a composite energy map that has been formed and/or stored to constellation map (CM) 47.

In an example, content consumer device 14A (e.g., an XR device) may determine PSI 46B based on the energy map for one or more audio streams of an audio element. Content consumer device 14A may determine PSI 46B and utilize the PSI 46B to adjust an audio stream received from source device 12A or from another source device (e.g., source device 12B of FIG. 1C). Content consumer device 14A may receive the energy map from source device 12A, may determine the energy map for source device 12A based on an audio stream received from source device 12A, or a combination thereof. In an example, content consumer device 14A may receive energy maps from some multiple source devices 12A and may determine energy maps for other source device 12A. Content consumer device 14A may store the energy maps to CM 47 or in another storage location of audio decoding device 34. In some instances, audio decoding device 34 may include PSI 46B as part of audio data 19', such that audio renderers 32 may apply PSI 46B to audio data 19' at the time of rendering the audio data 19'.

In addition, or alternatively, content consumer device 14A may output the PSI 46B to source device 12A. Source device 12A may store the information as PSI 46A, which may, in some instances, simply involve an update to PSI 46A that has already been applied by source device 12A previously. In some instances, source device 12A may reconfigure or otherwise adjust parameters of the source device 12A based on PSI 46A.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19 and information (e.g., metadata 25) provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the soundfield. In some examples, the bitstream 27 may further include the metadata 25 (e.g., audio metadata).

For instance, to generate the different representations of the soundfield using ambisonic coefficients (which again is one example of the audio data 19), the soundfield representation generator 24 may use a coding scheme for ambisonic representations of a soundfield, referred to as Mixed Order Ambisonics (MOA) as discussed in more detail in U.S. patent application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. Patent Application Publication No. 2019/0007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield (e.g., that is generated as a partial subset of the ambisonic coefficients) may be less storage-intensive and less bandwidth intensive (e.g., in instances where the MOA representation of the soundfield is transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to herein as the "full order representation").

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 or the content editing device 22 and the soundfield representation generator 24, the content capture device 20 or the content editing device 22 may provide content in various forms, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D Audio Coding Standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA), or other standard.

The content capture device 20 may, in some examples, not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21. In some examples, soundfield representation generator 24 may apply PSI 46A to the audio aspects of the content 21 to generate bitstream 27 (e.g., an audio stream) that conforms to an initial parameter setting or an adjusted parameter setting of PSI 46A, such as a gain setting or an adjusted gain setting.

The soundfield representation generator 24 may also assist in content capture and transmission by generating one or more bitstreams 27 based, at least in part, on the audio content (e.g., MOA representations and/or first (or higher) order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, such as a Wi-Fi™ channel, a Bluetooth® channel, or a channel conforming to a fifth generation (5G) cellular standard, a data storage device, or the like. The bitstream 27 may represent an encoded version of the audio data 19 and may include a primary bitstream and another side bitstream, which may be referred to as side channel information (e.g., metadata), as shown via side channel 33. In some instances, the bitstream 27 representing the compressed version of the audio data 19 (which again may represent scene-based audio data, object-based audio data, channel-based audio data, or combinations thereof) may conform to bitstreams generated in accordance with the MPEG-H 3D Audio Coding Standard and/or the MPEG-I Immersive Audio standard.

In some examples of the disclosure, the source device 12A may be configured to generate a plurality of audio streams for transmission to the content consumer device 14A. The source device 12A may be configured to generate each of the plurality of audio streams via a single content capture device 20 and/or a cluster (e.g., multiple) of content capture devices 20. In some use cases, it may be desirable to be able to control which of the plurality of audio streams generated by the source device 12A are available for playback by the content consumer device 14A.

For example, audio from certain capture devices of the content capture devices 20 may contain sensitive information and/or the audio from certain capture devices of the content capture devices 20 may not be meant for exclusive access (e.g., unrestricted access by all users). In some examples, it may be desirable to restrict access to audio from certain capture devices of the content capture devices 20 based on the type of information captured by the content capture device 20 and/or based on the location of physical zone in which the content capture device 20 resides. Such privacy restrictions may factor into whether content consumer device 14A may utilize one or more audio streams from certain audio elements to form a composite energy map, where privacy restrictions or other types of restrictions cause the content consumer device 14A to exclude such audio elements when forming the composite energy map.

In accordance with example techniques of the disclosure, the source device 12A may further include a controller 31 configured to generate metadata 25. In an example, the metadata 25 may indicate privacy restrictions (e.g., privacy restriction metadata). In some examples, source device 12 and content consumer device 14 may be configured to communicate via a side channel 33. In an example, content consumer device 14 may transmit PSI to source device 12. In another example, content consumer device 14 may transmit at least one energy map (e.g., a composite energy map) to source device 12. In such examples, source device 12 may access the at least one energy map. Source device 12 may determine PSI 46A based on a comparison of an energy map (e.g., one corresponding to source device 12) and the at least one accessed energy map.

In some examples, the metadata 25 may correspond to one or more of the plurality of bitstreams 27 generated by the source device 12A. In an example, the privacy restriction metadata may indicate when one or more of the plurality of bitstreams 27 are restricted or unrestricted audio streams.

In some examples, the controller 31 may only generate the privacy restriction metadata to indicate bitstreams 27 include restricted or unrestricted audio streams. In such examples, the content consumer device 14 may infer that audio streams without privacy restriction metadata (e.g., metadata indicting a restricted audio stream) are unrestricted. The content consumer device 14 may receive the privacy restriction metadata and determine one or more bitstreams 27 (e.g., audio streams) available for decoding and/or playback based on the privacy restrictions. The content consumer device 14A may generate the corresponding soundfields based on the one or more bitstreams 27 determined to be available for decoding and/or playback.

In the example of FIG. 1A, the controller 31 transmits the privacy restriction metadata in side channel 33. In another example, the controller 31 may transmit the privacy restriction metadata in the bitstream 27.

In some examples, the controller 31 need not be a separate physical unit. Rather, the controller 31 may be integrated into the content editing device 22 or the soundfield representation generator 24. In another example, the controller 31 may receive data, such as PSI 46B, from content consumer device 14A. Controller 31 may in turn, reconfigure content editing device 22, content capture device 20, and/or soundfield representation generator 24, based on PSI 46A. Following the parameter adjustment (e.g., reconfiguration), source device 12 may then generate an audio stream represented by an energy map that has been compensated to align with other energy maps and/or with a composite energy map (e.g., an energy map formed from multiple energy maps).

In other examples, the controller 31 may be configured to use a password to determine audio streams available for playback by the content consumer device 14. The content consumer device 14 may be configured to send a password to the controller 31 (e.g., via a side channel 33). In some examples, the content consumer device 14 may be configured to receive one or more of the plurality of bitstreams 27 (e.g., audio streams) based on privacy restrictions associated with the password, and generate the corresponding soundfields based on the one or more of the plurality of audio streams.

In some examples, the controller 31 may be configured to generate (or cause other structural units of the source device 12 to generate) one or more of the plurality of bitstreams 27 based on privacy restrictions associated with the password. Various password techniques may be performed or may be used in conjunction with privacy restriction audio metadata techniques. Additional examples of privacy restrictions (e.g., permission statuses) are described herein. In an example, certain privacy restrictions may influence the formation of a composite energy map used to determine PSI 46A or PSI 46B, where the PSI may define a parameter setting adjustment.

The content consumer device 14A may be operated by an individual and may represent a VR client device. Although described with respect to a VR client device, content consumer device 14A may represent other types of devices, such as an augmented reality (AR) client device, a mixed reality (MR) client device (or other XR client device), a standard computer, an audio speaker, a headset, headphones, a mobile device (including a so-called smartphone), or any other device capable of generating (e.g., reproducing) a soundfield based on bitstreams 27 (e.g., audio streams), and/or tracking head movements and/or general translational movements of the individual operating the content consumer device 14A. As shown in the example of FIG. 1A, the content consumer device 14A includes an audio playback system 16A, which may refer to any form of audio playback system capable of rendering the audio data 19' for playback as mono or multi-channel audio content.

The content consumer device 14A may include a user interface (UI). The UI may include one or more input devices and one or more output devices. The output devices may include, for example, one or more speakers, one or more display devices, one or more haptic devices, or the like, that are configured to output information for user perception. The output devices may be integral to the content consumer device 14A or may be separate devices coupled to the content consumer device 14.

In some examples, content consumer device 14A may provide a visual depiction of the energy maps. In such examples, the user may manually identify problematic devices in the XR space. In an example, content consumer device 14A may provide a visual depiction of the energy maps via the UI with an indication that a particular audio element in a constellation set of audio elements (e.g., a set of audio elements configured to capture a common soundfield) is not working properly and is not accepting a parameter adjustment or otherwise continues to generate bitstreams 27 that do not have corresponding energy maps that conform to an expected energy map (e.g., a composite energy map) following a parameter adjustment. In some examples, this type of nonconformance may be indicative of a calibration failure of an audio element.

The one or more input devices may include any suitable device with which a user may interact to provide inputs to the content consumer device 14A. For example, the one or more input devices may include a microphone, a mouse, a pointer, a game controller, a remote, a touch screen, a linear slider potentiometer, a rocker switch, a button, a wheel, a knob, or the like. In examples in which the one or more user input devices include a touch screen, the touch screen may allow selection of one or more capture device representations based on a single touch input (e.g., touching, swiping, tapping, long pressing, and/or circling an area of a graphical user interface). In some implementations, the touch screen may allow multi-touch input. In these examples, the touch screen may allow selection of the multiple areas of a graphical user interface based on multiple touch inputs.

While shown in FIG. 1A as being directly transmitted to the content consumer device 14A, the source device 12A may output the bitstream 27 to an intermediate device positioned between the source device 12A and the content consumer device 14A. The intermediate device may store the bitstream 27 for later delivery to the content consumer device 14A, which may request the bitstream 27. The intermediate device may include a file server, a web server, a desktop computer, a laptop computer, a tablet computer, a mobile phone, a smart phone, or any other device capable of storing the bitstream 27 for later retrieval by or transmittal to an audio decoding device (e.g., audio decoding device 34 of content consumer device 14A). The intermediate device may reside in a content delivery network capable of streaming the bitstream 27 (and possibly in conjunction with transmitting a corresponding video data bitstream) to subscribers requesting the bitstream 27, such as by transmitting the bitstream 27 to the content consumer device 14A.

Alternatively, the source device 12A may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanisms). In any event, the techniques of this disclosure should not therefore be limited in this respect to the example of FIG. 1A.

As noted herein, the content consumer device 14A includes the audio playback system 16A. The audio playback system 16A may represent any system capable of playing back mono and/or multi-channel audio data. The audio playback system 16A may include a number of different audio renderers 32. The audio renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or "both A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). The audio decoding device 34 may be part of the same physical device as the audio renderers 32 or may be part of a physically separate device and be configured to communicate via a wireless or wired connection with audio renderers 32. Again, the audio data 19' may include scene-based audio data that, in some examples, may form the full first (or higher) order ambisonic representation or a subset thereof that forms an MOA representation of the same soundfield, decompositions thereof, such as a predominant audio signal, ambient ambisonic coefficients, and the vector based signal (which may refer to a multi-dimensional spherical harmonic vector having a number of elements that represent spatial characteristics of a corresponding predominant audio signal) described in the MPEG-H 3D Audio Coding Standard, or other forms of scene-based audio data. Audio data 19' may include an audio stream or a representation of an audio stream.

In some examples, the audio decoding device 34 may decode bitstream 27 according to PSI 46B. In an example, audio decoding device 34 may determine a composite energy map from CM 47 and from the composite energy map may determine a parameter adjustment for a particular audio element (e.g., source device 12A) and a bitstream 27 (e.g., an audio stream) received from the audio element. In an illustrative example, when decoding bitstream 27, audio decoding device 34 may adjust the frequency response for bitstream 27 to generate audio data 19' for subsequent audio rendering.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Application Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19, but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data, or channel-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. In some examples, audio data 19' may include PSI 46B. In such examples, audio renderers 32 may render the audio data 19' in accordance with the PSI 46B. The speaker feeds 35 may drive one or more speakers or headphones (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D. In an example, audio renderers 32 may normalize a soundfield based on PSI 46B. In this way, audio renderers 32 may further provide a soundfield as having a uniform parameter setting, such that a user may not perceive differences in gain when listening to audio streams of different audio elements.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause the transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32. In some examples, the speaker information 37, such as a volume or number of speakers, may cause further adjustments to audio data 19', where audio data 19' includes PSI 46B. In an example, audio renderers 32 may apply a version of PSI 46B to audio data 19' that suits a particular speaker configuration and/or speaker settings.

When outputting the speaker feeds 35 to headphones, the audio playback system 16A may utilize one of the audio renderers 32 that provides for binaural rendering using head-related transfer functions (HRTFs) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers or headphones may then playback the rendered speaker feeds 35 to generate a soundfield. In an example, one or more speakers may be placed near a user and may generate a soundfield configured to immerse the user in the soundfield or portray the soundfield at a location near the user where the user may perceive the soundfield as emanating from various different locations as defined by audio data 19'.

Although described as rendering the speaker feeds 35 from the audio data 19', reference to rendering of the speaker feeds 35 may refer to other types of rendering, such as rendering incorporated directly into the decoding of the audio data from the bitstream 27. An example of the alternative rendering can be found in Annex G of the MPEG-H 3D Audio Coding Standard, where rendering occurs during the predominant signal formulation and the background signal formation prior to composition of the soundfield. As such, reference to rendering of the audio data 19' should be understood to refer to both rendering of the actual audio data 19' or decompositions or representations of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translational movements of a user of the VR device. The audio playback system 16A may adapt, based on the tracking information 41, the audio renderers 32 such that the speaker feeds 35 reflect changes in the head and possibly translational movements of the user to generate the soundfield in a manner that is responsive to such movements.

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 (in audio playback system 16B of content consumer device 14B) capable of performing binaural rendering using one or more HRTFs or the other functions capable of rendering to left and right speaker feeds 43.

The audio playback system 16B may output the left and right speaker feeds 43 to headphones 48. Headphones 48 represent another example of a wearable device and which may be coupled to additional wearable devices, such as to an XR device (e.g., a VR headset), smart glasses, smart clothing, smart jewelry (e.g., a watch, rings, bracelets, necklaces, etc.), or the like, to facilitate generation (e.g., reproduction) of the soundfield. The headphones 48 may couple wirelessly or via wired connection to the additional wearable devices.

Additionally, the headphones 48 may couple to the audio playback system 16B via a wired connection (such as a standard 3.5 mm audio jack, a universal system bus (USB) connection, an optical audio jack, or other forms of wired connection) or wirelessly (such as by way of a Bluetooth® connection, a wireless network connection, and the like). The headphones 48 may generate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

FIG. 1C is a block diagram illustrating another example system 60. The example system 60 is similar to the example system 10 of FIG. 1A, but source device 12B of system 60 does not include a content capture device. Source device 12B contains synthesizing device 29. Synthesizing device 29 may be used by a content developer to generate synthesized audio sources. The synthesized audio sources may have location information associated therewith that may identifying a location of the audio source relative to a listener or other point of reference in the soundfield, such that the audio source may be rendered to one or more speaker channels for playback in an effort to generate the soundfield. In some examples, synthesizing device 29 may also synthesize visual or video data.

For example, a content developer may generate synthesized audio streams for a video game. While the example of FIG. 1C is shown with the content consumer device 14A of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain both captured audio stream(s) and synthesized audio stream(s).

Figure 2:
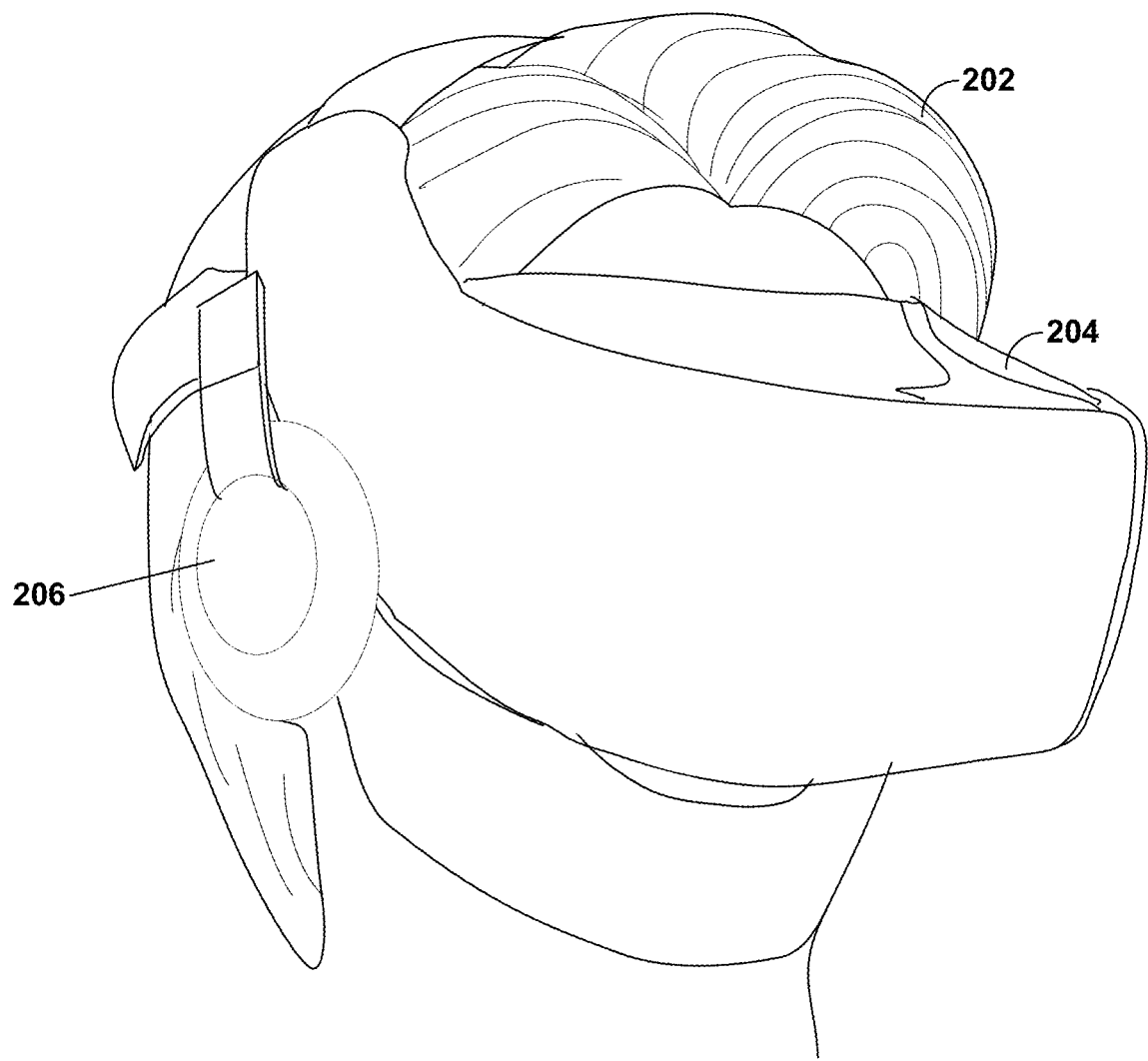
FIG. 2 is a diagram illustrating an example of a VR device worn by a user.

As described above, the content consumer device 14A or 14B (either of which may be hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR device 204. In the illustrative example, VR device 204 is depicted as a headset worn by a user 202. While depicted as such, the techniques of this disclosure are not so limited, and a person skilled in the art will understand that VR devices may come in different form. In an example, the VR device 204 may include one or more speakers (e.g., headphones worn by the user 202, an external speaker set, one or more mountable speakers, etc.).

In some examples, the VR device 204 is coupled to, or otherwise includes, headphones 206, which may generate a soundfield represented by the audio data 19' through playback of the speaker feeds 35. The speaker feeds 35 may represent an analog or digital signal capable of causing a membrane within the transducers of headphones 206 to vibrate at various frequencies, where such process is commonly referred to as driving the headphones 206.

Video, audio, and other sensory data may play important roles in the XR experience. To participate in a VR experience, for example, the user 202 may wear the VR device 204 (which may also be referred to as a VR client device) or other wearable electronic device. The VR client device (such as the VR device 204) may include a tracking device (e.g., the tracking device 40) that is configured to track head movement of the user 202, and adapt the video data shown via the VR device 204 to account for the head movements, providing an immersive experience in which the user 202 may experience an acoustical space, a displayed world, or both an acoustical space and a displayed world. The displayed world may refer to a virtual world (in which all of the world is simulated), an augmented world (in which portions of the world are augmented by virtual objects), or a physical world (in which a real world image is virtually navigated).

While VR (and other forms of AR and/or MR) may allow the user 202 to reside in the virtual world visually, often the VR device 204 may lack the capability to place the user in the acoustical space audibly. In other words, the VR system (which may include a computer responsible for rendering the video data and audio data—that is not shown in the example of FIG. 2 for ease of illustration purposes, and the VR device 204) may be unable to support full 3D immersion audibly (and in some instances realistically in a manner that reflects the displayed scene presented to the user via the VR device 204).

While described in this disclosure with respect to the VR device, various aspects of the techniques may be performed in the context of other devices, such as a mobile device, speaker, audio element (e.g., microphone, synthesized audio source, etc.), or other XR device(s). In this instance, the mobile device may present the acoustical space (e.g., via a speaker, one or more headphone(s), etc.). The mobile device, or at least portions thereof, may be mounted to the head of the user 202 or viewed as would be done when normally using the mobile device. As such, any information on the screen can be part of the mobile device, as well as any information generated via a speaker, headphone, or audio element, as well. The mobile device may be able to provide tracking information 41 and thereby allow for both a VR experience (when head mounted) and a normal experience to experience the acoustical space, where the normal experience may still allow the user to experience the acoustical space providing a VR-lite-type experience (e.g., holding up the device and rotating or translating the device to view different portions of the displayed world).

The audio aspects of XR have been classified into three separate categories of immersion. The first category provides the lowest level of immersion and is referred to as three degrees of freedom (3DOF). 3DOF refers to audio rendering that accounts for movement of the head in the 3DOF (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the 3DOF (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the 3DOF in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as though present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (either of which may be hereinafter referred to as source device 12) may stream content 21, where the source devices 12 may have widely different capabilities. For example, one source device 12 may be a smartphone with a digital fixed-lens camera and one or more microphones, while another source device may be production level television equipment capable of obtaining video of a much higher resolution and quality than the smartphone. However, all of the source devices 12, in the context of the live streaming applications, may offer streams of varying quality from which the VR device may attempt to select an appropriate one to provide an intended experience.

Moreover, similar to the gaming applications, latency in audio data such that loss of synchronization occurs with the video data may result in less immersion. Moreover, spatial accuracy may also be important such that the users may better understand the context or location of different audio sources. Further, when users are live streaming using cameras and audio elements (e.g., microphones), privacy may become an issue, as users may not want to live streams fully available to the public.

In the context of conditioning audio streams, audio elements (e.g., XR devices, audio-receiving devices, audio-synthesizing devices, etc.) may apply various parameter settings, such as gain, frequency response, and/or other conditioning settings, in order to modify a capture of audio and generate an immersive XR experience. In some instances, the parameter settings for an audio-receiving device may be fully compensated so as to allow the audio decoding device 34 to generate an adequate soundfield for the XR environment based on an audio stream.

In some examples, the parameter setting(s) for an audio element may not be initially coordinated or compatible with respect to other audio elements, source devices, or accessory devices, such as wearables, mobile devices, etc., that may also be equipped with audio-receiving devices (e.g., microphones) that also apply various parameter settings. For instance, the parameter settings for one audio element may not initially correspond to the parameter settings for another audio element, resulting in poor audio captures and a distorted representation of a soundfield.

This lack of coordination may especially cause problems where a user manually alters parameter settings (e.g., adjusts the gain with respect to high frequency sounds for an audio-receiving device or XR device, or where a system of audio elements includes audio elements from different manufacturers or suppliers. In an example involving a microphone as the at least one audio element, it can be the case that not all microphones across the constellation of microphones that are streaming audio to an XR device have the same gain, frequency response, or other parameter, or may be otherwise uncompensated so as not to be coordinated with other microphones or other audio elements across a constellation of microphones or other audio elements. In another example, not all microphones across the constellation of microphones that are streaming audio to an XR device may be compensated so as to provide an audio stream that is non-noisy, or the audio element may be uncompensated so as to be coordinated with other audio elements across a constellation of audio elements. That is to say, without proper compensation between audio elements, such as through parameter adjustments (e.g., equalization, calibration, etc.), the audio elements may not provide an immersive XR experience and may ultimately, disorient or confuse a user utilizing an XR device.

In accordance with the techniques described in this disclosure, the audio decoding device 34 may access energy maps that correspond to audio streams available via the bitstream 27 (which are represented by the bitstream 27 and hence the bitstream 27 may be referred to as "audio streams 27"). The audio decoding device 34 may utilize the energy maps to determine parameter adjustments, for example, gain or frequency response adjustments, with respect to at least one audio element (e.g., an audio-receiving device, such as a microphone or other receiver, or an audio-generating device, such as a virtual speaker or other virtual device configured to synthesize audio soundfields in a virtual environment). In this way, audio decoding device 34 may automatically adjust an audio element upon detecting a discrepancy with respect to the parameter settings of the audio element. The audio decoding device 34 may apply the parameter adjustments as an adjusted parameter setting so as to modify the capture of audio and compensate the audio element for a discrepancy in an applied parameter setting. The parameter adjustments may be determined based on an analysis of one energy map relative to a reference energy map (e.g., a baseline energy map, composite energy map, etc.). In some examples, the parameter adjustments may be configured so as to shift a target energy map, in accordance with the parameter adjustments, so that the target energy map overlaps as close as possible with the reference energy map.

The audio element may be able to use the parameter adjustments to both increase audio spatialization accuracy and increase the quality of 6DOF rendering. In operation, the audio decoding device 34 may interface with one or more source devices 12 to determine the parameter adjustment for each audio element. As shown in the example of FIGS. 1A-1C, the audio playback system 16A or 16B may include an audio decoding device 34 and the source device 12A or 12B may include a content editing device 22 or synthesizing device 29. Individually or together, these systems and devices may represent one or more audio elements configured to perform various aspects of the audio compensation techniques described in this disclosure.

In some instances, the audio element (e.g., a microphone, audio soundfield synthesizer, or other XR device, etc.) may include the source device 12A or 12B, in which case the content editing device 22 or synthesizing device 29 may determine and apply parameter adjustments in accordance with energy maps that correspond to one or more of the bitstreams 27. In such instances, content editing device 22 may be configured to perform some or all aspects of the adjustment techniques with respect to compensating the source device 12A or 12B (which may be referred to herein generally as "source device 12"). Similarly, in instances where the content consumer device 14A or 14B (which may be referred to herein generally as content consumer device 14) includes one or more audio elements (e.g., microphone(s), etc.), the audio decoding device 34 may perform some or all aspects of the adjustment techniques with respect to compensating the content consumer device 14. In some instances, the source device 12 and the content consumer device 14 may be integrated into an audio element (e.g., a stand-alone microphone). For example, the content consumer device 14 may include an XR device, whereas the source device may include a microphone 18 that interfaces with the XR device as an audio element. In a non-limiting example, an XR device may include a microphone attachment that captures speech of a user as the user navigates, or otherwise experiences, the XR space.

Further, in some examples, the audio decoding device 34 may determine operational status information (e.g., diagnostic data) for one or more audio elements and/or may receive operational status information from one or more audio elements. Likewise, the audio elements may transmit the operational status information (e.g., self-diagnostic data) to the audio decoding device 34. The operational status information may provide information as to the quality of an audio signal received, permission status of an audio element (e.g., permission to access energy maps of an audio element, permission to access audio streams of an audio element, etc.), and/or other feasibility characteristics. For example, the operational status information may include SNR information or gain information. The operational status information may indicate that the audio element is currently inactive, such as by being detected in a pocket of a user so as to not be receiving a clear audio stream or based on accelerometer, light detection, or other sensor data.

The operational status (e.g., diagnostic data, feasibility data, etc.) may also represent a permission status of an audio element (e.g., a privacy setting). For example, the operational status information may indicate that a particular audio element is restricting the transmission of an amount or type of audio data. The permission status may indicate whether the one or more audio streams are restricted or unrestricted. In some examples, a privacy setting may refer to digital access rights that limit access to one or more of the bitstreams 27, e.g., by way of a password, an authorization level or rank, a time, etc.

The operational status information may also indicate that it would be infeasible to use a particular audio element in determining a parameter adjustment. For example, the particular audio element may not be configured to allow manipulation of the parameter settings for conditioning the capture of audio. In other words, an audio element may not have configurable settings and may only able to apply a single parameter setting that may be the parameter setting programmed by the manufacturer. In another example, the feasibility status may indicate microphone position with respect to the audio decoding device 34. When the microphone is too far from the audio decoding device 34, the audio decoding device 34 may determine that it would be infeasible to use an audio stream from that particular microphone in determining parameter adjustments for another audio element (e.g., one corresponding to audio decoding device 34).

In some examples, the operational status information may include tracking information (e.g., to determine whether a user is facing the audio source 308). In such examples, audio decoding device 34 may use the tracking information to determine a feasibility status.

The audio decoding device 34 may, based at least in part on the operational status information, exclude at least one of the bitstreams 27 (e.g., at least one of the audio streams) and/or energy maps from a set of energy maps, such that the excluded audio streams do not contribute to the parameter adjustment determination. For example, an audio stream from an ineligible microphone may be excluded from a set of bitstreams 27 used to determine a parameter adjustment.

The audio decoding device 34 may perform an energy analysis with respect to each of the bitstreams 27 to determine an energy map for each of the bitstreams 27, storing the energy map in the CM 47. The energy maps may jointly define an energy of a common soundfield represented by the bitstream 27. In some instances, audio decoding device 34 may receive one or more energy maps from a source device 12. In addition, the audio decoding device 34 may generate a single energy map based on multiple bitstreams 27. In other instances, audio decoding device 34 may aggregate multiple energy maps that correspond to multiple bitstreams 27 (e.g., a plurality of audio streams) to determine a composite energy map. In some instances, the single energy map may include the composite energy map that corresponds to the multiple energy maps.

In some examples, the audio decoding device 34 may receive one or more of the composite energy map and/or other individual energy maps from the source device 12. In some instances, a single energy map, such as a composite energy map, may include multiple energy map components. For example, an energy map component may be based on an energy analysis of one or more audio streams. In another example, an energy map component may be another energy map. For example, multiple energy maps may form a single composite energy map (e.g., the multiple energy maps may be fused together or synthesized into a single composite energy map). In this way, an energy map may include multiple energy map components that correspond to one or more audio streams, where the energy map components may be audio streams or energy maps that correspond to audio streams.

The audio decoding device 34 may store one or more of the composite energy map, individual energy maps, or bitstreams 27 to memory for subsequent access and analysis. For example, audio playback system 16A or 16B may be configured to store energy maps and audio streams to CM 47. In some examples, source device 12 may be configured to store energy maps and audio streams to a memory device of source device 12. Source device 12 may be configured to transmit the energy maps and/or audio streams to content consumer device 14.

The audio decoding device 34 may analyze the one or more energy maps to determine a parameter adjustment with respect to an audio element (e.g., one of microphones 18, etc.). For example, the audio decoding device 34 may analyze gain or analyze frequency response as defined by one or more energy maps in determining whether a parameter adjustment is warranted in order to equalize the microphones and/or sound generating devices. In some instances, the audio decoding device 34 may perform a comparison of energy maps to determine whether a parameter setting requires adjustment (e.g., an increase or decrease in gain). In one example, the audio decoding device 34 may compare an energy map derived from multiple audio streams to another energy map to determine a proper adjustment to the parameter setting of an audio element, such as a microphone, so as to adequately compensate for the inadequate capture of audio from the audio element. In some examples, the audio decoding device 34 may compare a composite energy map to another energy map, where the other energy map was also used in the generation of the composite energy map. In some examples, audio decoding device 34 may utilize a long-term energy map to handle transient cases, such as shouting, or loud engines.

The audio decoding device 34 may analyze for discrepancies in the energy maps and determine parameter adjustments to compensate for the discrepancies. In some examples, the audio decoding device 34 may determine a variance, such as a discontinuity in the audio stream, when analyzing the energy maps. For example, the audio decoding device 34 may detect, from a comparison of the energy maps, a gap in the frequency response of an audio stream. The audio decoding device 34 may determine, from analyzing the energy maps, an adjustment to a parameter setting of an audio-receiving device to remove or compensate for the discrepancy. In some instances, a remote server may analyze the energy maps and determine the adjustment, in which case, the remote server transmits the adjustment to one or more of the audio elements. In addition, a remote server may generate one or more of the energy maps, including a composite energy map, based on bitstreams 27.

The audio decoding device 34 may output an indication indicating the one or more parameter adjustments, including details of the parameter adjustment, such as how much gain to apply, whether the gain is specified to a certain frequency region, a compression setting, a frequency response setting, and/or other settings configured to adjust the parameters settings of an audio element in the presence of other audio elements (e.g., physical or virtual presence). For example, in compensating an audio element, the settings may be configured to coordinate, optimize, equalize, calibrate, normalize, modify, or otherwise increase compatibility between the audio elements, for example, by adjusting a capture of audio or a generation of audio. In one example, one or more processors may optimize the parameter settings for XR experiences, in accordance with some techniques disclosed herein. In such examples, an XR device may then be configured to provide an equalized, immersive experience after parameter adjustment (e.g., gain adjustment, frequency response adjustment, enablement, disablement, etc.) of audio elements in a constellation set of audio elements and in addition, the XR device then require less processing from corrupted audio elements (e.g., upon being disabled) and also, in some examples, may require less processing when forming a composite energy map, such as when only energy maps are used that have a high or relatively high SNR so those energy maps can be used to form the composite energy map.

A parameter adjustment may be implemented such that the parameter adjustment may be applied to captured audio. For example, implementation may include adjusting a current parameter setting for a microphone to another parameter setting in accordance with the parameter adjustment. Implementation of a parameter adjustment may include replacing a current parameter setting with another parameter setting in accordance with the parameter adjustment. In a non-limiting example, the parameter adjustment may be one of an adjustment to gain of one or more microphones. One or more processors of the microphones may determine or receive the parameter adjustment indication and implement the gain adjustment, thereby effectuating the parameter adjustment.

The parameter adjustments may be applied to audio captured by microphones (such as microphone 18), either upon the audio being captured or prior to being generated (e.g., at the sound source). For example, the audio decoding device 34 may utilize one or more parameter settings (adjusted or not) to condition audio received via one or more microphones. The parameter adjustment may only be determined for a specific microphone that has an audio stream energy map that does not correspond to one or more other energy maps that correspond to audio captured by one or more other microphones.

In some instances, the audio decoding device 34 may transmit the parameter adjustment to source device 12, such that source device 12 may utilize the parameter adjustment when generating audio (e.g., streaming content from source device 12 to content consumer device 14). In any event, a particular parameter adjustment will correspond to a microphone that has a discrepancy in the energy map as compared to one or more other energy maps, such that the parameter adjustment is configured to optimize the particular microphone and compensate for or remove the discrepancy. In removing the discrepancy through implementation of an adjusted parameter setting, the microphone will be able to generate a soundfield that more closely mirrors the true soundfield.

In some examples, the parameter adjustment will correspond to a microphone capturing an audio stream based on how much an energy map corresponding to capture of audio from the microphone deviates from a normal or reference energy map. In some instances, the audio decoding device 34 may also receive identification details regarding the microphones in the system, such as model numbers, manufacturers, etc., that may aid in the audio decoding device 34 determining the parameter adjustment. For example, the audio decoding device 34 may apply a confidence score that the parameter adjustment is necessary where the identification details indicate that the microphones are from different OEMs (Original Equipment Manufacturers). In such instances, it may be more likely that the initial parameter settings are not compatible with one another and one or both should be adjusted (such as through normalization, equalization, or calibration) to mirror one another or to more closely mirror the true soundfield.

Based at least in part on the parameter settings (adjusted or not), audio decoding device 34 may output the bitstreams 27 as audio data 19'. In addition, the audio decoding device 34 may select, based on quality characteristics, which of the bitstreams 27 are to be conditioned in accordance with the parameter settings. Audio decoding device 34 may apply the parameter settings to condition one or more of bitstreams 27 to generate audio data 19'. In such instances, the audio decoding device 34 may generate audio data 19' that includes the parameter setting information or that already has the parameter setting information applied to the audio data 19'. The audio playback system 16A or 16B may then generate soundfields using the audio data 19'. In another example, the audio renderers 32 or the binaural renderer 42 may apply the parameter settings to the audio data 19' when rendering the audio data 19' to speaker feeds 35 or speaker feeds 43.

In some examples, the audio decoding device 34 may generate an energy plot overlay based on the energy maps. In some examples, the energy plot overlay may be based on a composite energy map. The energy plot overlay may also include an overlay for a particular energy map as it compares to the composite energy map or another energy map corresponding to a different audio stream. The audio decoding device 34 may provide the energy plot for display to a user. For example, the audio decoding device 34 may output the energy plot overlay or overlays as part of a UI. As such, the audio decoding device 34 may be configured to generate UI data, that includes energy map data, audio data, and/or parameter setting data. Audio decoding device 34 may work in conjunction with a UI generation device to cause the display of a UI on the XR device or on another audio element (e.g., microphone of a mobile phone).

In some examples, audio decoding device 34 may be configured to test whether the adjustment was successful for the one or more stray microphones so as to bring the microphones into synchronization with other audio rendering devices (e.g., content consumer device 14) and/or receiving devices (e.g., source devices 12). The audio decoding device 34 may monitor the newly configured microphone to determine whether the microphone is receiving audio in accordance with the parameter adjustment. The audio decoding device 34 may output a signal that the adjustment was successful. In other instances, however, the audio decoding device 34 may output a warning signal that the adjustment was not successful. The warning signal may be based on another comparison of energy maps following the implementation of the parameter adjustment. The signals may take the form of a notification displayed on a UI. For example, audio decoding device 34 may generate feedback for a live streamer whether the audio of the live streamer is corrupted or whether adjustment of an audio element (e.g., a microphone, etc.) was otherwise successful. Likewise, feedback may be sent to the user regarding successful calibration of the XR device. More information regarding how the audio decoding device 34 may adjust the capture of audio is discussed below, for example, with reference to FIGS. 3A-3D, FIGS. 4A-4B, and FIGS. 5A-5D.

Figure 3A:
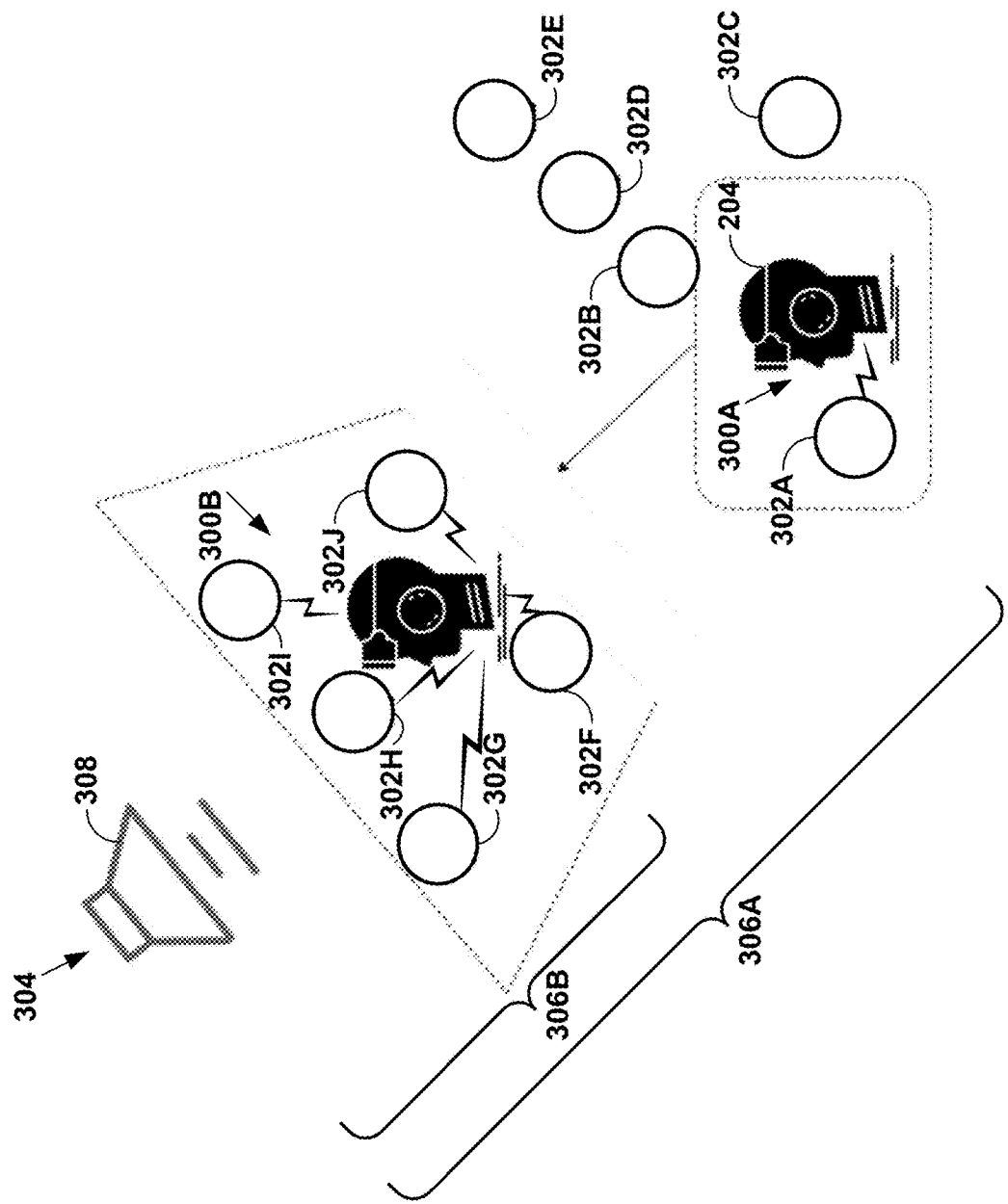
FIGS. 3A-3D are diagrams illustrating, in more detail, example operations of the stream selection unit shown in the examples of FIGS. 1A-1C.

FIGS. 3A-3D are diagrams illustrating, in more detail, example operations of the stream selection unit 44 shown in the example of FIGS. 1A-1C. As shown in the example of FIG. 3A, the stream selection unit 44 may determine that the device location information (DLI) (e.g., 45B in FIGS. 1A-1C) indicates that the content consumer device 14 (shown as the VR device 204) is at virtual location 300A. The stream selection unit 44 may next determine the audio location information (ALI) 45A for one or more of audio elements 302A-302J (collectively referred to as audio elements 302), which may represent not just microphones, such as the microphone 18 shown in FIG. 1A or 1B, but other types of capture devices, including other XR devices, mobile phones—including so-called smartphones—and the like, or synthesized soundfield, such as the audio data 19 of FIG. 1C generated by synthesizing device 29 according to PSI 46A).

The stream selection unit 44 may next obtain energy maps in the manner described above, analyzing the energy maps to determine the audio source location 304, which may represent one example of the ASL 49 shown in the example of FIGS. 1A-1C. The energy maps may denote the audio source location 304. In an example, stream selection unit 44 may denote the audio source location 304 based on at least one energy map (e.g., a composite energy map), where the energy at the audio source location 304 may be higher than the surrounding area. That is, stream selection unit 44 may determine, based on the at least one energy map, the higher energy location and may determine the audio source location 304 as corresponding to the higher energy location (e.g., virtual or physical location). In some examples, stream selection unit 44 may denote the audio source location 304 based on a plurality of energy maps. Given that each of the energy maps may denote this higher energy corresponding to the audio source location 304, the stream selection unit 44 may triangulate, based on the higher energy in the energy maps, the audio source location 304.

Next, the stream selection unit 44 may determine an audio source distance 306A as a distance between the audio source location 304 and the virtual location 300A of the VR device 204. The stream selection unit 44 may compare the audio source distance 306A to an audio source distance threshold. The stream selection unit 44 may, in some examples, derive the audio source distance threshold based on the energy of the audio source 308. That is, when the audio source 308 has a higher energy (or, in other words, when the audio source 308 is louder), the stream selection unit 44 may increase the audio source distance threshold. When the audio source 308 has a lower energy (or, in other words, when the audio source 308 is quieter), the stream selection unit 44 may decrease the audio source distance threshold. In other examples, the stream selection unit 44 may obtain a statically defined audio source distance threshold, which may be statically defined or specified by the user (e.g., user 202).

In any event, the stream selection unit 44 may select, when the audio source distance 306A is greater than the audio source distance threshold (which is assumed in this example for purposes of illustration), a single audio stream of the bitstreams 27 of the audio elements 302A-302J ("audio elements 302"). For example, the stream selection unit 44 may select the bitstream 27 of the audio element(s) (e.g., audio element 302A in the example of FIG. 3A) having the shortest distance to the virtual location 300A. The stream selection unit 44 may output the corresponding ones of the bitstreams 27, which the audio decoding device 34 may decode and output as the audio data 19'.

Assuming that the user (e.g., user 202) moves from the virtual location 300A to the virtual location 300B, the stream selection unit 44 may determine an audio source distance 306B as a distance between the audio source location 304 and the virtual location 300B. In some examples, the stream selection unit 44 may only update after some configurable release time, which may refer to a time after the listener stops moving.

In any event, the stream selection unit 44 may again compare the audio source distance 306B to the audio source distance threshold. The stream selection unit 44 may select, when the audio source distance 306B is less than or equal to the audio source distance threshold (which is assumed in this example for purposes of illustration), multiple audio streams of the bitstreams 27 of the audio elements 302. The stream selection unit 44 may output the corresponding ones of the bitstreams 27, which the audio decoding device 34 may decode and output as the audio data 19'.

The stream selection unit 44 may also determine one or more proximity distances between the virtual location 300A and one or more (and possibly each) of the capture locations (or synthesize locations) represented by the ALI 45A to obtain one or more proximity distances. The stream selection unit 44 may then compare the one or more proximity distances to a threshold proximity distance. The stream selection unit 44 may select, when the one or more proximity distances are greater than the threshold proximity distance, a smaller number of the bitstreams 27 compared to when the one or more proximity distances are less than or equal to the threshold proximity distance to obtain the audio data 19'. However, the stream selection unit 44 may select, when the one or more of the proximity distances are less than or equal to the threshold proximity distance, a larger number of the bitstreams 27 compared to when the one or more proximity distances are greater than the threshold proximity distance to obtain the audio data 19'.

In other words, the stream selection unit 44 may attempt to select those of the bitstreams 27 such that the audio data 19' are most closely aligned to the virtual location 300B and surround the virtual location 300B. The proximity distance threshold may define such a threshold, which the user 202 may set or the stream selection unit 44 may again determine dynamically based on a quality of the audio elements 302F-302J, the gain or loudness of the audio source 308, tracking information 41 (e.g., to determine whether the user 202 is facing the audio source 308), or any other factors.

In this respect, the stream selection unit 44 may increase audio spatialization accuracy when the listener is at the location 300B. Furthermore, when the listener is at the location 300A, the stream selection unit 44 may reduce a bitrate, as only the audio stream of audio element 302A is used to generate the soundfield rather than multiple audio streams of audio elements 302B-302J.

Figure 3B:
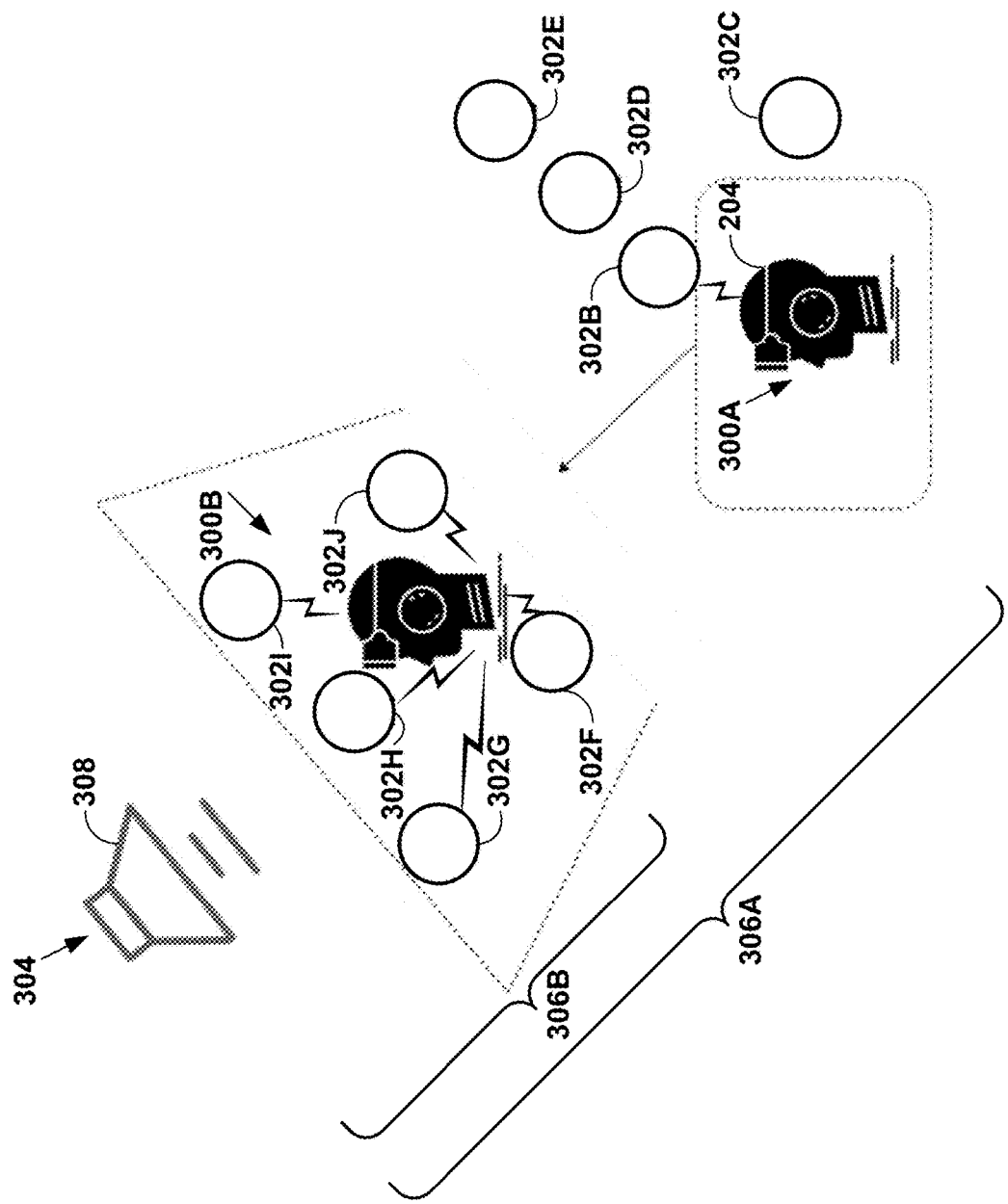

Referring next to the example of FIG. 3B, the stream selection unit 44 may determine that the audio stream of the audio element 302A is corrupted, noisy, or unavailable. The stream selection unit 44 may remove the audio stream from the CM 47 and reiterate through the bitstreams 27 in accordance with the techniques described in more detail above to select a single one of the bitstreams 27 (e.g., the audio stream of the audio element 302B in the example of FIG. 3B) given that the audio source distance 306A is greater than the audio source distance threshold.

Figure 3C:
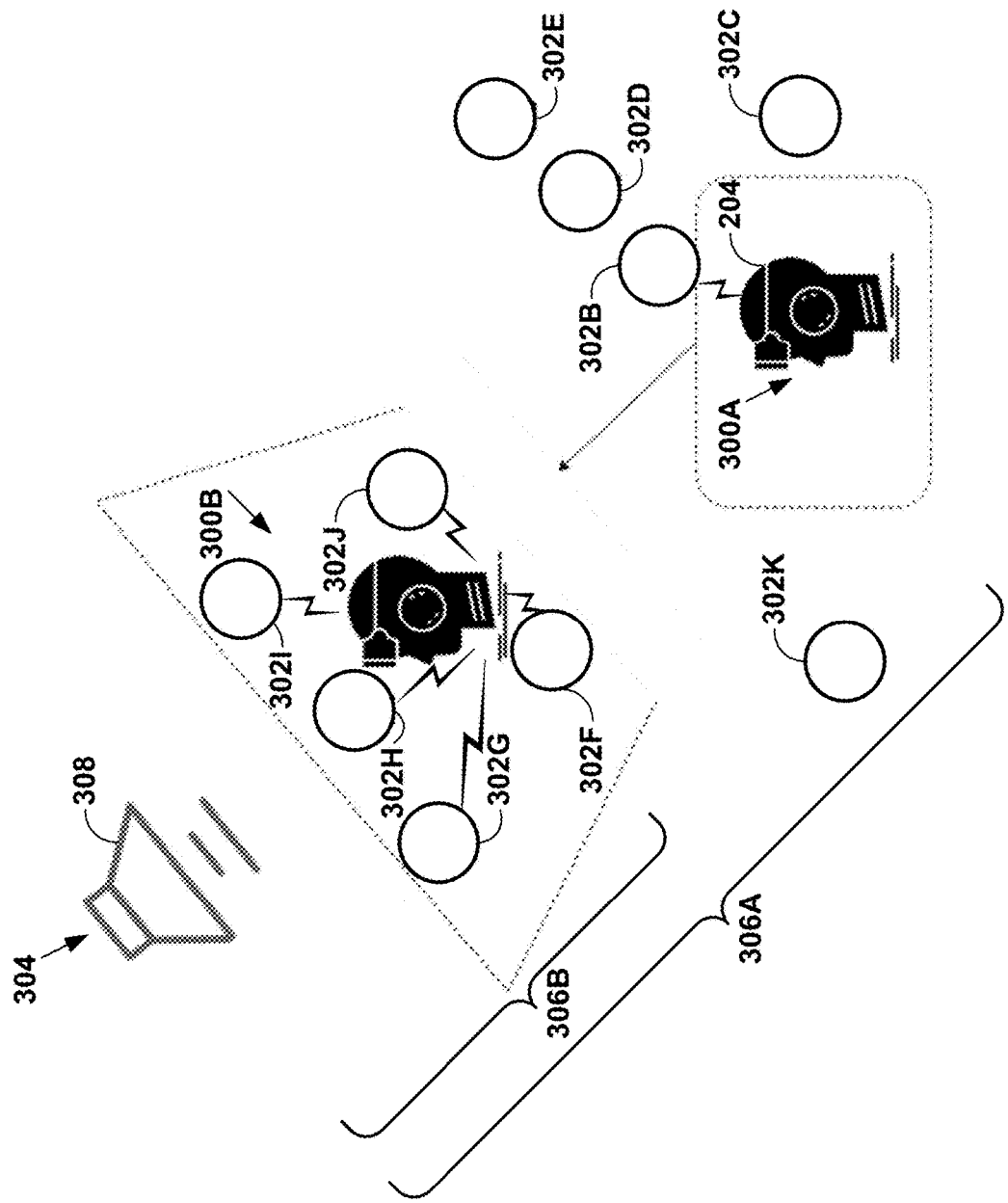

Referring next to the example of FIG. 3C, the stream selection unit 44 may obtain a new audio stream (the audio stream of the audio element 302K) and corresponding new information (e.g., metadata) that includes ALI 45A. The stream selection unit 44 may add the new audio stream to the CM 47 representative of the bitstreams 27. The stream selection unit 44 may then reiterate through the bitstreams 27 in accordance with the techniques described in more detail above to select a single one of the bitstreams 27 (e.g., the audio stream of the audio element 302B in the example of FIG. 3C) given that the audio source distance 306A is greater than the audio source distance threshold.

Figure 3D:
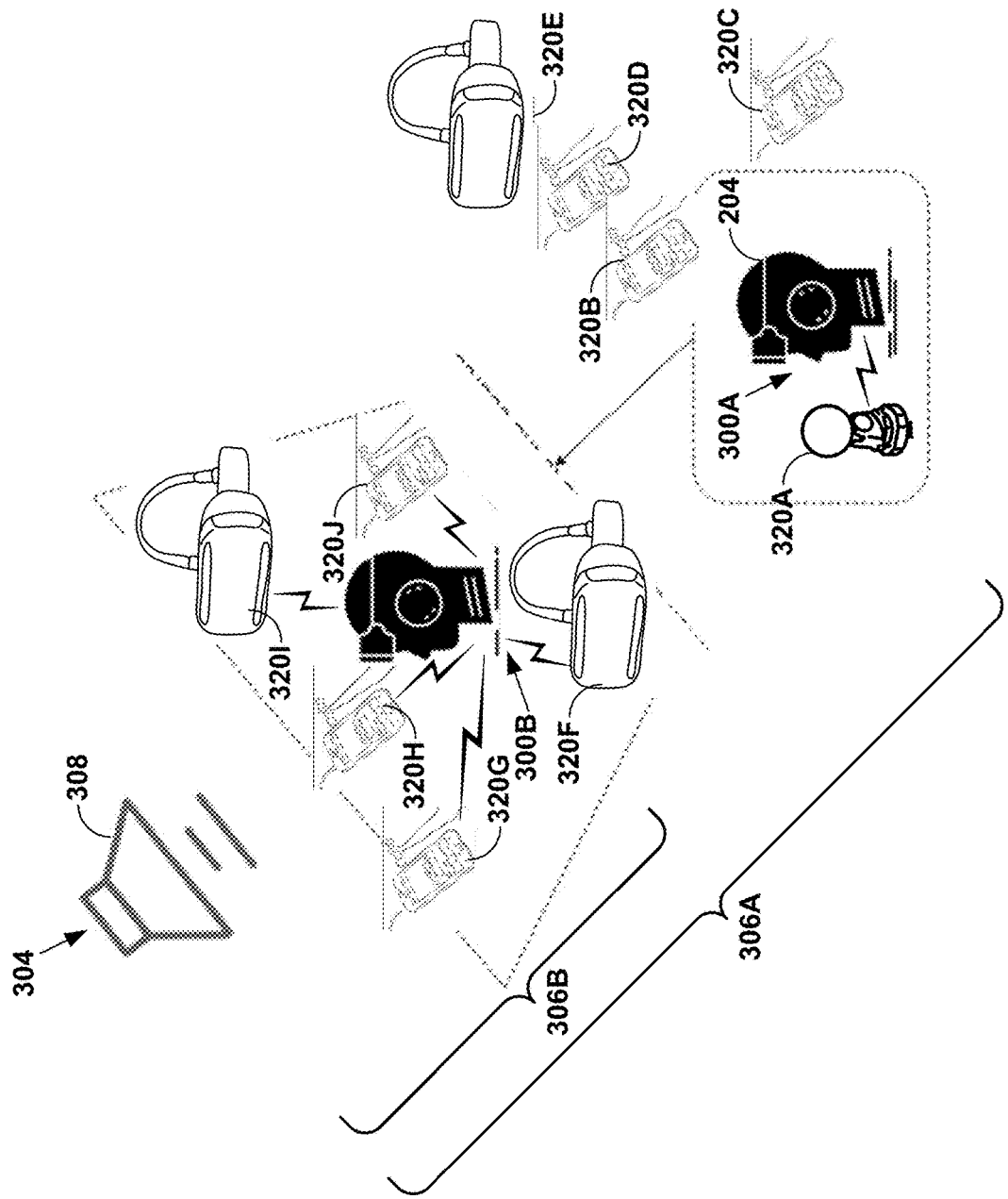

In the example of FIG. 3D, the audio elements 302 are replaced with specific example devices 320A-320.1 ("devices 320"), where device 320A represents a dedicated microphone 320A, while devices 320B, 320C, 320D, 320G, 320H, and 320I represent smartphones. The devices 320E, 320F, and 320I may represent XR devices (e.g., VR devices). Each of devices 320 may include the audio elements 302, which capture or synthesize bitstreams 27 (e.g., audio streams) that are to be selected or excluded in accordance with various aspects of the stream selection techniques and parameter adjustment techniques described in this disclosure.

In some examples, devices 320 may further include one or more audio speakers. While not shown in the example of FIG. 3D, it will be understood that FIG. 3D may further include audio elements 302 that correspond to generated audio sources, such as an audio generated via a computer program. The parameter settings for the audio elements configured to generate audio data 19, such as a microphone or synthesized audio source, may be adjusted based on an energy map analysis and comparison of each respective audio element, such that user 202 experiences audio in a way that closely matches the way in which the audio was intended to be experienced (e.g., equalized audio). In an example, user 202 may speak into microphone 320A and another user may be able to then hear user 202 speak through headphones or other speaker devices. When the microphone 320A is uncompensated in view of other sounds (e.g., audio stream generated) in the XR environment of the other user (e.g., at a virtual concert), the other user may experience or perceive the spoken words of user 202 at an unsuitable volume or gain, or as a noisy or distorted signal, that can then potentially cause the other user to have an unenjoyable experience with the XR system.

In an illustrative example, audio decoding device 34 may compensate the microphone 320A of user 202 based on the energy map of one or more sounds in the XR environment (e.g., energy map for each microphone capturing audio in a concert environment), such that when the soundfield is generated for the other user, audio decoding device 34 may generate the audio stream of the voice of user 202 during a jointly viewable virtual concert, where the other user can hear user 202 speak following various gain adjustments of microphone 320A.

In some examples, audio decoding device 34 may cause the compensation of microphone 320A by transmitting a parameter adjustment (e.g., via side channel 33), at least one audio stream for generating an energy map, or at least one energy map (e.g., a composite energy map), to source device 12, where source device 12 may implement the parameter adjustment to compensate the audio element (e.g., microphone 18, synthesizing device 29, etc.) for one or more variances in the energy map corresponding to the audio element and the at least one other energy map (e.g., a composite energy map). In another example, soundfield representation generator 24 of source device 12 or audio decoding device 34 of content consumer device 14 may condition the audio data 19 generated from the audio element based on the energy map analysis to ultimately generate audio data 19' that represents an energy map that aligns with one or more other energy maps, including with a composite energy map. In this illustrative example, the other user may be physically separate from user 202, but in the virtual world, may be sitting next to user 202 and enjoying the same concert.

Figure 4A:
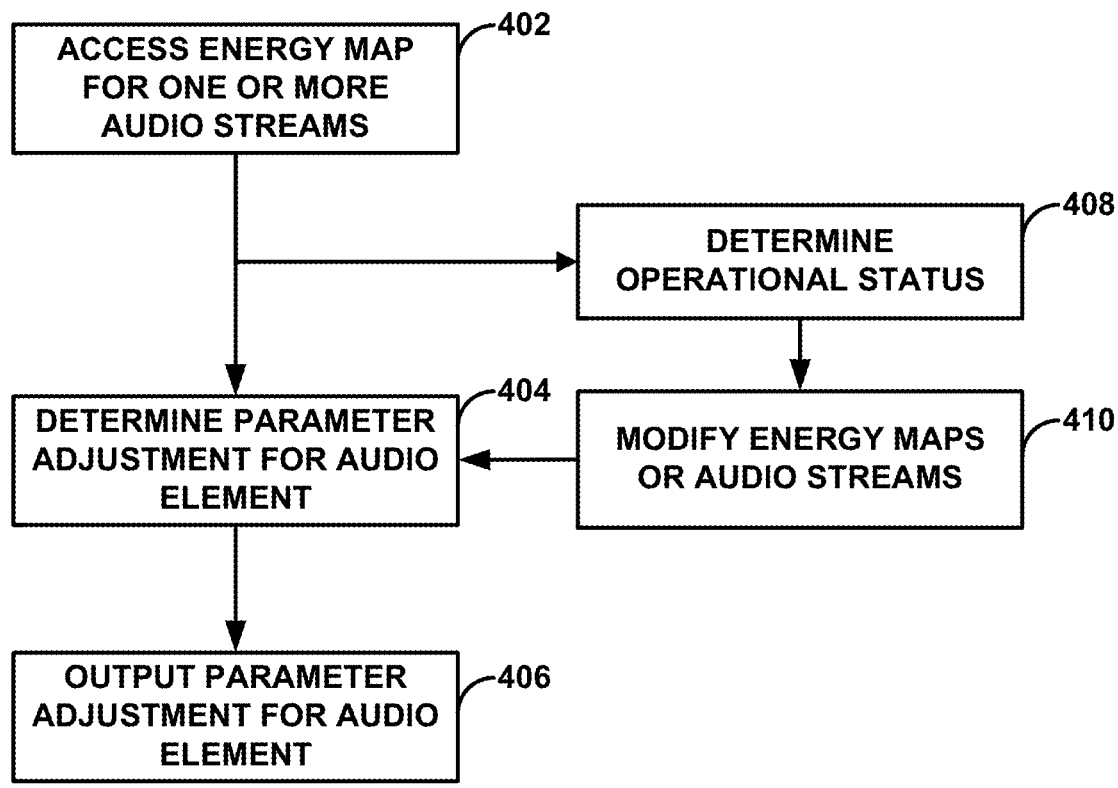
FIGS. 4A-4B are flowcharts illustrating example operations of the audio decoding device shown in the examples of FIGS. 1A-1C in performing various aspects of the adjustment techniques.

FIG. 4A is a flowchart illustrating example operations of the audio decoding device 34 shown in the examples of FIGS. 1A-1C in performing various aspects of the parameter adjustment techniques. In FIG. 4A, the audio decoding device 34 may obtain a bitstream 27 (e.g., an audio stream) from all enabled audio elements in a particularly defined set of audio elements, such as a constellation set defined by the proximity of the audio elements to content consumer device 14 or to a space in which the soundfield of the audio is located. In an example, the audio decoding device 34 may obtain a bitstream 27 from each audio-receiving device (e.g., which is another way to refer to microphones, such as the microphone 18). The bitstreams 27 may include corresponding information (e.g., metadata). The audio decoding device 34 may perform an energy analysis with respect to each of the bitstreams 27 to calculate a respective energy map and store the energy maps to a memory location, such as to CM 47.

In some examples, the audio decoding device 34 may access at least one energy map (402). The at least one energy map may include a composite energy map that is formed from each of the respective energy maps stored to the memory location. In some instances, accessing the at least one energy map may include the audio decoding device 34 receiving the at least one energy map from another device, receiving more than one energy map from another device, generating one or more energy maps based on audio streams, generating a composite energy map, obtaining an audio stream and generating an energy map therefrom, or any combination thereof.

The audio decoding device 34 may then determine the parameter adjustment for an audio element, such as a microphone or synthesizing device 29 using the accessed energy map (404). In some examples, the audio decoding device 34 may compare a first energy map that corresponds to audio of a first audio element to a comparison energy map. As discussed above, the comparison energy map may be based on one or more energy maps and may include the first energy map or may be a composite energy map based on one or more energy maps, which may or may not include the first energy map.

In some examples, the audio decoding device 34 may determine a variance score with respect to the comparison of energy maps. For example, the variance score may represent the degree to which a particular audio element deviates from a baseline energy map (e.g., a composite energy map). In some examples, audio decoding device 34 may adjust the variance score based on discrepancies in the comparison. For example, the audio decoding device 34 may increase the variance score when there is a discontinuity with respect to the first energy map or a discontinuity between the first energy map and one or more other energy maps, which indicates a discontinuity with respect to an audio stream or between multiple audio streams. The audio decoding device 34 may compare the variance score to a variance threshold to determine whether a parameter adjustment is necessary. In other examples, the audio decoding device 34 may use the variance score to determine a parameter adjustment regardless of whether the score exceeds a variance threshold. For example, the audio decoding device 34 may use a look-up table or a compensation formula to determine the parameter adjustment based on the variance score.

In some examples, the audio decoding device 34 may determine the parameter adjustment by determining a variance between an energy map of an audio element and a composite energy map. In such examples, the variance may be indicative of the frequency-dependent equalizer (EQ) gain that has been or is to be applied to the audio signals of the target audio element (e.g., an audio element targeted for parameter adjustment). In an example, the variance is the difference between the expected energy at the position of the audio element given by the composite energy map and the measured energy of the audio element signal. In an illustrative example, audio decoding device 34 may determine, based at least in part on the composite energy map, an expected energy at a particular position of an audio element, and then may perform an energy analysis of the signal generated by the audio element to determine a variance (e.g., an energy difference). Audio decoding device 34 Audio decoding device 34 may then transmit the parameter adjustment to an audio element, which may include the variance as part of the parameter adjustment. In implementing the parameter adjustment, the audio element may apply the variance, in decibels (dB), directly as a gain factor to audio signals generated by the audio element.

In some instances, the audio decoding device 34 may determine an operational status of one or more audio elements before determining the parameter adjustment (408). The operational status may include a signal-to-noise ratio for the audio element. In another example, the audio decoding device 34 may utilize self-diagnostic data received from one or more microphones 18 to determine an array of microphones 18 that may be used to establish a baseline reading. In one example, the audio decoding device 34 may utilize such data prior to accessing the one or more energy maps or after accessing the energy maps. In the case of prior, the audio decoding device 34 may selectively access only those energy maps that meet the criteria as defined by the operational status information and as previously discussed. In the case of after, the audio decoding device 34 may modify the energy maps or the audio streams based on the operational status (410). For example, the audio decoding device 34 may remove or exclude certain audio streams or energy maps from consideration in forming a composite energy map. In any case, audio decoding device 34 may remove noisy signals or remove those devices that are generating the noisy signals from consideration.

The audio decoding device 34 may update various inputs according to any given frequency. For example, the audio decoding device 34 may update all or some of the energy maps at an audio frame rate (meaning that the energy maps are updated each frame). In some instances, the audio decoding device 34 may periodically update the energy maps and a composite energy map. In some examples, the audio decoding device 34 may update energy maps in response to a trigger, such as the detection of a new audio element or the detection that a previously unavailable, unresponsive, noisy, or otherwise corrupt audio element has now become available for consideration. For example, a user may update a privacy setting that either allows audio decoding device 34 to use a new audio stream and corresponding energy map to determine a parameter adjustment or requires audio decoding device 34 to now exclude an audio stream or energy map from consideration. In another example, the audio decoding device 34 may update permission/privacy settings at a UI rate (meaning, updates are driven by way of updates entered via the UI). The audio decoding device 34, as another example, may update positions at sensor rate (meaning that as positions are changed through movement of the audio element).

In some examples, the audio decoding device 34 may output the parameter adjustment for the corresponding microphone (406). For example, the audio decoding device 34 may transmit the parameter adjustment to a microphone that corresponds to the audio stream capture requiring adjustment. In another example, the audio decoding device 34 may directly implement the parameter adjustment with respect to a microphone that corresponds to the audio decoding device 34. In some examples, the audio decoding device 34 may output the parameter adjustment to a memory location and store the parameter adjustment for subsequent access. In some instances, the audio decoding device 34 may decode and output the audio data 19' that corresponds to one of the bitstreams 27 in accordance with the parameter setting, either adjusted or maintained due to a strong energy map reading (e.g., a close energy map comparison).

In another example, the audio decoding device 34 may adjust the frequency dependent gain per audio element (e.g., per receiver). In an example, the audio decoding device 34 may determine an adjustment to a frequency dependent gain based on a comparison of a composite energy map to individual energy maps obtained for each audio element.

Figure 4B:
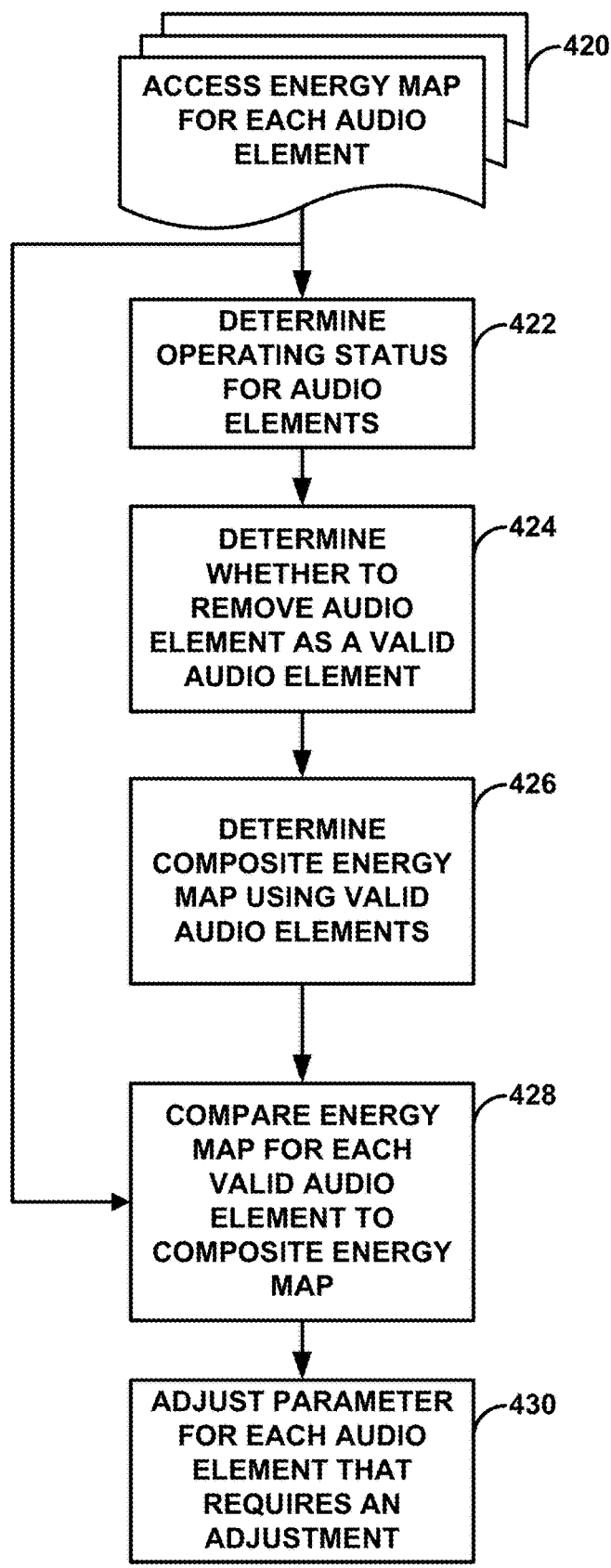

As shown in FIG. 4B, the audio decoding device 34 may repeat the process in a loop configuration. For example, the audio decoding device 34 may then access and/or determine an energy map for each audio element 302 (e.g., audio capture receiver, audio synthesizer) (420). In some examples, the audio decoding device 34 may then determine an operational status for the audio elements 302 (422). In an example, the audio decoding device 34 may receive operational status information (e.g., self-diagnostics) and check whether any of the audio capture receivers are ineligible (e.g., noise or silence).

In some examples, the audio decoding device 34 may determine whether to remove any audio elements from consideration as a valid audio element (424). In an example, the audio decoding device 34 may remove those ineligible audio elements from consideration. That is, the audio decoding device 34 may only use or consider the energy maps using valid audio elements (e.g., receivers, synthesizers). As such, the audio decoding device 34 may determine a composite energy map using energy maps obtained via valid audio elements (426). The valid audio elements may include audio elements that are not corrupt, noisy, silent, or otherwise infeasible for use in forming a composite energy map for baseline comparisons.

In some examples, the audio decoding device 34 may determine the composite energy map. Although described with reference to the audio decoding device 34, the techniques of this disclosure are not so limited and it will be understood that other devices or processing systems of content consumer device 14, of source device 12, or of a remote device (e.g., a remote server 504) may perform one or more of the various techniques of this disclosure. In an illustrative example involving the source device 12 performing one or more of the various techniques of this disclosure, controller 31 may receive a plurality of energy maps from content consumer device 14A via side channel 33 or from other source devices 12.

In another example, a particular controller 31 for a source device 12 may receive audio streams (e.g., bitstream 27) from other source devices 12 or from content consumer device 14. The particular controller 31 may, in turn, determine a composite energy map from the plurality of energy maps, or from the plurality of audio streams, that correspond to audio elements 302. In another example, controller 31 may transfer the plurality of energy maps and/or the plurality of audio streams to content editing device 22, for example, as metadata 25 transferred from controller 31, or from soundfield representation generator 24, to content editing device 22. In addition, content editing device 22 or content capture device 20 may receive the plurality of energy maps and/or the plurality of audio streams from controller 31 or from soundfield representation generator 24 and in turn, may determine a composite energy map based on the plurality of energy maps or based on the plurality of audio streams determined for each of a plurality of source devices 12. As described, controller 31 may be integrated with one or more of soundfield representation generator 24 and/or content editing device 22.

To avoid confusion, however, and as described herein, various techniques of this disclosure are described with reference to audio decoding device 34, where audio decoding device 34 may determine parameter adjustments for particular source devices 12 (e.g., valid source devices 12) through an analysis of one or more respective energy maps in view of a composite energy map and transfer the parameter adjustments to the various source devices 12, where the source devices 12 may receive the parameter adjustment (e.g., as PSI 46A) and implement the parameter adjustment to compensate the generation of audio data 19 via the source device 12 or to provide compensated edited content 23 that compensates for variances (e.g., differences) between energy maps. In some instances, the parameter adjustment may include instructions to disable a particular source device 12, where the source device 12 is generating and/or transmitting a corrupt, noisy, or otherwise disorienting bitstream 27 to content consumer device 14 or to a remote server (e.g., remote server 504).

In some examples, to generate a composite energy map, the audio decoding device 34 may calculate the roll-off (e.g., frequency) from multiple energy maps and combine the energy maps to form a composite energy map based on the roll-off frequency. In an example, the audio decoding device 34 may interpolate between roll-off values of a plurality of energy maps to determine a single, composite energy map, such as an energy map composed from at least two energy maps from the plurality of energy maps (e.g., two energy maps having the highest SNR, a comparison energy map and one or more reference energy maps from pre-compensated, reference audio elements, etc.). The composite energy map may be distinct and separate from the energy maps used to form the composite energy map. In another example, the composite energy map may include an individual energy map specific to a particular one source device 12. In any case, the composite energy map is formed so as to serve as a baseline for determining when the energy map of another device is not aligned or otherwise uncompensated with other devices in a constellation set of audio elements 302.

In an illustrative example, the audio decoding device 34 may calculate a theoretical and/or position-dependent roll-off from multiple energy maps to form the composite energy map. The roll-off calculation may be based on either a linear or logarithmic scale (e.g., decibels, etc.) depending on tuning preference information (e.g., based on PSI 46 that includes tuning preference information). In some examples, audio decoding device 34 may determine the composite energy map from the roll-off information in a number of different ways, including by determining a reference energy map, by interpolating between energy maps, such as by interpolating between frequency data of respective energy maps, and so forth.

In some examples, the audio decoding device 34 may determine a first audio element (e.g., audio element 302A) that has been signaled as having been pre-compensated (e.g., pre-calibrated, pre-equalized). In an illustrative and non-limiting example, the first audio element may include a microphone 18 and/or content capture device 20 (e.g., FIG. 1A or 1B). In any case, the audio decoding device 34 may use an energy map corresponding to the first audio element as a reference energy map. The audio decoding device 34 may then calculate the composite energy map by calculating the roll-off of the other audio elements (e.g., receivers, synthesized soundfields, etc.) relative to the reference energy map. In example where no audio element has been signaled as being pre-compensated, the audio decoding device 34 may calculate a centroid position of a plurality of audio elements in a set of audio elements. The audio decoding device 34 may then determine the one or more audio elements that are closest to the centroid position as the reference element to provide a reference energy map for performing the energy map comparison (e.g., roll-off frequency comparison).

In another example, the audio decoding device 34 (or a remote server in some examples) may receive a plurality of audio streams (e.g., a plurality of bitstreams 27) from a plurality of source devices 12. In addition or alternatively, the audio decoding device 34 may receive a plurality of energy maps and/or information regarding the SNR of one or more energy maps. The audio decoding device 34 may determine the plurality of energy maps from the plurality of audio streams and/or may determine the SNR information for a plurality of energy maps (e.g., energy maps of different audio elements 12). Based on the SNR information relating to the plurality of energy maps and/or the SNR information of the one or more energy maps, the audio decoding device 34 may determine the one or more audio elements 302 from a set (e.g., constellation) of audio elements that have the highest SNR energy maps relative to the energy maps of the other audio elements 302 in the constellation.

In an example, the audio decoding device 34 may determine the top 'N' number of audio elements 302 with higher SNR energy maps relative to the other audio elements 302 in the constellation. In another example, the audio decoding device 34 may determine the top 'N' number of audio elements 302 in the constellation of audio elements 302 that exceed a SNR threshold. In some examples, the audio decoding device 34 may receive SNR information (e.g., as audio metadata) that indicates an operational status of one or more audio elements 302 and then may determine the composite energy map from the SNR information based on the audio elements 302 that have the highest SNR energy maps relative to any other audio elements 302 in the set of audio elements 302.

In an illustrative example, the audio decoding device 34 may be that of device 204 (e.g., headphones, an audio speaker, an XR device, etc.) that receives audio streams and/or energy maps from audio elements 302A-302K, such as those described with reference FIGS. 3A-3C, for example illustration purposes. In another example, the techniques of this disclosure may be performed by an audio element 302 that implements the functionality of the source device 12, such as where audio element 302 includes content capture device 20 (e.g., microphone 18) and/or synthesizing device 29. The audio element 302 may determine the composite energy map and determine one or more parameter adjustments that the audio element 302 may transmit to other audio elements 302 in the constellation of audio elements 302.

Figure 5A:
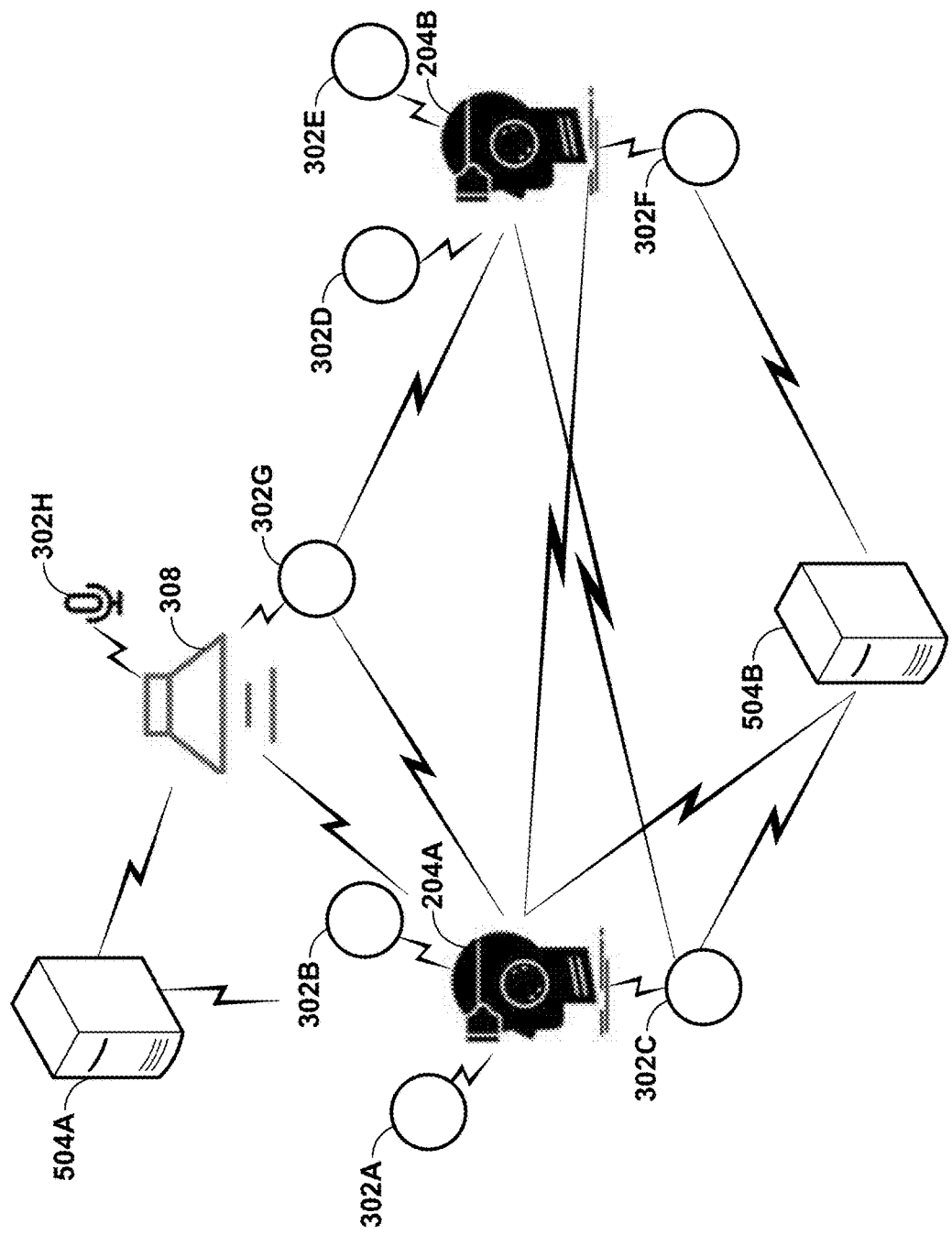
FIGS. 5A-5D are diagrams illustrating, in more detail, example operations of the audio decoding device shown in the example of FIGS. 1A-1C.
Figure 5B:
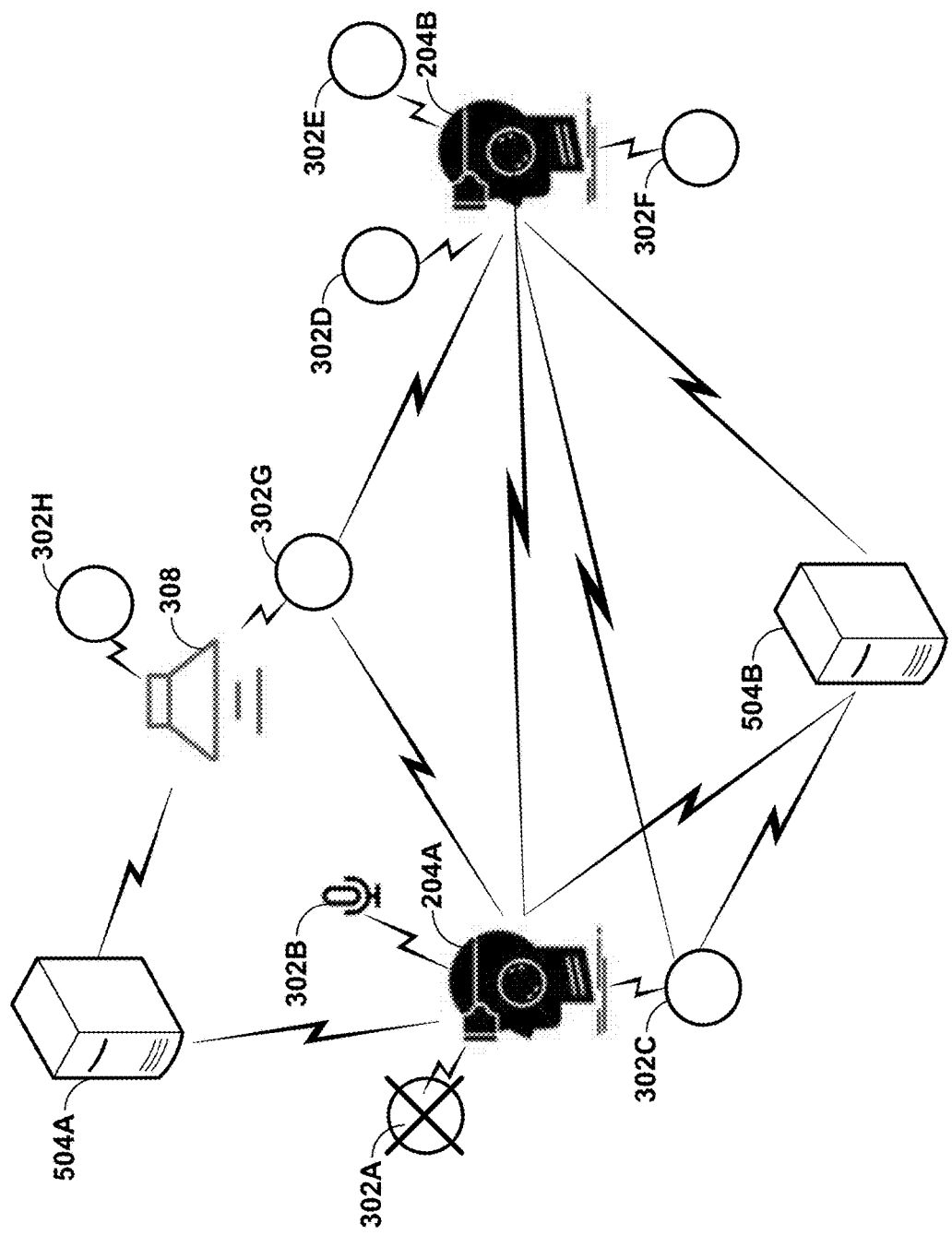

In another illustrative example, with reference to FIG. 5B to illustrate, any one or more of devices 504A, 204A, 204B, 504B, etc. may determine the composite energy map based on the top 'N' number of audio elements 302 or based on a reference energy map in order to then determine a parameter adjustment for audio element 302A that includes, in the illustrative example of FIG. 5B, disabling audio element 302A from generating audio for the XR experience for a user 202 of device 204A or 204B or to exclude an energy map of audio element 302A from being utilized in the generation of a composite energy map. This may be because audio element 302A, for example, has a poor quality characteristic, operational or feasibility status (e.g., in a pocket, password protected), energy map variance, etc. such that audio element 302A is disabled and/or signaled as ineligible until such a time that audio element 302A is reconfigured so as to then provide an improvement in the quality, operational status, energy map variance, or other factors that caused the audio decoding device 34 to provide a parameter adjustment that disabled, or marked as ineligible, audio element 302A in the first place.

In any case, once generated, audio decoding device 34, or another device in another example, may access the composite energy map once generated in order to determine parameter adjustments for one or more of the audio elements as described herein. Audio decoding device 34 may update the composite energy map over time as additional audio elements enter the constellation set of audio elements 302 and/or as particular audio elements 302 gain eligibility status or lose eligibility status (e.g., audio element 302A could reenter the constellation in the example of FIG. 5B prompting audio decoding device 34 of device 504, 204, or another audio element, to update, or otherwise modify, one or more composite energy maps. The audio decoding device 34 (e.g., of device 204A) may then utilize the composite energy map to determine variances in the energy maps of audio elements in the constellation set of audio elements and/or may transmit the composite energy map to other devices (e.g., one or more of servers 504, device 204B, other audio elements 302, etc.) for further energy map and/or parameter-adjustment processing.

When determining the composite energy map, the audio decoding device 34 is further configured to utilize the top 'N' number of audio elements 302 (e.g., the audio elements 302 with the highest SNR energy maps) and may utilize the respective energy maps that correspond to audio elements 302 from the set of audio elements 302 that have energy maps that satisfy an SNR threshold or that have energy maps that have SNR values that are otherwise higher than the SNR of energy maps corresponding to other audio elements 302 in a set of audio elements 302. The audio decoding device 34 may then interpolate between the N energy maps to form a composite energy map. In an example, the audio decoding device 34 may access the plurality of energy maps that correspond to a plurality of audio streams, where the energy maps have SNR values that satisfy a SNR threshold (e.g., have a higher quality characteristic relative to other energy maps), and then audio decoding device 34 may interpolate values between the plurality of energy maps to form the composite energy map. In some examples, audio decoding device 34 may determine an average between the plurality of energy maps and form the composite energy map based on the average and/or based on the interpolation.

In an illustrative example, 'N' may be based on the total number of audio elements 302 detected within a threshold distance of one another in geographic region. The total number of audio elements 302 may include, in an arbitrary example, fifteen microphones and two synthesized soundfields, stationed on a stage (e.g., stage 523) of a concert hall. The audio decoding device 34 may be configured to choose a particular number that is less than the total as 'N' (e.g., top five) or a fraction of the total as 'N' (e.g., top half or top third of the total seventeen audio elements 302 in this illustrative example).

In some examples, the audio decoding device 34 may compare energy maps for each valid audio element to the composite energy map (428). In an example, the audio decoding device 34 may then analyze the energy maps to check for a frequency dependent variance(s) between energy maps.

In some instances, the audio decoding device 34 may not perform the operational status check for audio elements 302. In such examples, audio decoding device 34 may compare energy maps for the audio elements to determine whether any frequency dependent variances exist between energy maps and the composite energy map. From there, the audio decoding device 34 may adjust the frequency dependent gain per receiver. However, the audio decoding device 34 may determine that no parameter adjustment is required for the audio element based upon an analysis of the frequency dependent variance(s). In such examples, the audio decoding device 34 may return to analyzing energy maps for all valid audio elements.

In some examples, the audio decoding device 34 may receive or determine the operational status information prior to accessing the energy maps. In such cases, the audio decoding device 34 may remove some energy maps or some audio streams from consideration based on the operational status information. In other instances, audio decoding device 34 may analyze energy maps and operational status information in parallel so as to determine which energy maps should be analyzed and which should not be analyzed. The audio decoding device 34 may then automatically equalize or normalize real-time XR capture devices for 6DOF listening and/or rendering.

In another example, the audio decoding device 34 may access a composite energy map for a plurality of audio elements, the composite energy map generated from a set of energy maps that each correspond to an audio element of the plurality of audio elements; determine a variance between a configuration signature for at least one audio element of the plurality of audio elements and the composite energy map; and generate an instruction to adjust a parameter setting based at least in part on the variance.

In some examples, the audio decoding device 34 may compile a set of energy maps, the set of energy maps including an energy map for at least two audio elements from the plurality of audio elements. The audio decoding device 34 may then generate a composite energy map for a plurality of audio elements, the composite energy map generated from the set of energy maps that each correspond to an audio element of the plurality of audio elements. Content consumer device 14 may then transmit the composite energy map to source device 12.

In another example, the controller 31 may generate an energy map and transmit the energy map to content consumer device 14. The controller 31 may receive, in turn, an instruction from the content consumer device 14A to adjust a parameter setting. The content consumer device 14 may determine the instruction based on a comparison of the energy map to a composite energy map. In response to receiving the instruction, source device 12 may adjust the parameter setting.

Although discussed in terms of audio decoding device 34, any number of different audio devices may perform the various techniques of this disclosure, including one or more processors of the source device 12 or one or more processors of the content consumer device or any other audio-related device. The audio device should at least be configured to access and/or analyze one or more energy maps.

FIGS. 5A-5D are diagrams illustrating, in more detail, example operations of the audio decoding device 34 shown in the example of FIG. 1A-1C. As shown in the example of FIG. 5A, the audio decoding device 34 may determine the presence of multiple audio elements 302. The audio decoding device 34 may correspond to one of VR device 204A or VR device 204B ("VR devices 204"), audio source 308, one of audio elements 302, or one of remote servers 504. The audio decoding device 34 may determine the parameter settings for the one or more audio elements 302 (which may represent not just microphones, such as the microphone 18 shown in FIGS. 1A and 1B, but other types of audio-receiving devices, including other XR devices, mobile phones—including so-called smartphones—and the like, or generated soundfield(s)).

As described above, the audio decoding device 34 may obtain the bitstreams 27 from audio elements 302 (which may represent not just microphones, such as the microphone 18 shown in FIG. 1A, but other types of capture devices, including other XR devices, mobile phones—including so-called smartphones—and the like, or generated soundfield (s)). The audio decoding device 34 may interface with audio elements 302 to obtain the bitstreams 27. In some examples, the stream selection unit 44 may interact with an interface (such as a receiver, a transmitter and/or a transceiver) to obtain the bitstreams 27 in accordance with a 5G cellular standard, a personal area network (PAN), such as Bluetooth®, or some other open-source, proprietary or standardized communication protocol. Wireless communication of the audio streams and/or transmission of other audio data, such as energy maps or parameter adjustments, is denoted as a lightning bolt in the examples of FIGS. 5A-5C, where the selected audio data 19' is shown as being communicated from the one or more of the audio elements 302 to and from the VR devices 204, to and from the remote servers 504, and to and from audio source 308.

In some instances, the audio source 308 may include the user, a streaming source (e.g., a smart television), or some other audio generating source, such as an environment having sound. In some instances, an audio element 302G may be positioned in an environment remote from the users, where the user may experience the environment in XR space. For example, users may be remotely watching a movie in a remote movie theatre with multiple people remotely experiencing the XR space together, where one or more microphones may be placed in the movie theatre to capture one or more audio streams.

The audio decoding device 34 may access at least one energy map in the manner described above, either by retrieving the energy map from memory or generating the at least one energy map. For example, the audio decoding device 34 may perform an energy analysis with respect to one of bitstreams 27 to determine the at least one energy map that corresponds to a respective audio streams, or in some instances, multiple audio streams, such as when determining a composite energy map.

Referring next to the example of FIG. 5B, the audio decoding device 34 may receive operational status information from audio element 302A. Using the operational status information, the audio decoding device 34 may determine that the audio stream captured by the audio element 302A is corrupted, noisy, or unavailable. In some examples, the audio decoding device 34 may compare the SNR for an audio element to a threshold SNR to determine whether the audio element is corrupted, noisy, or unavailable. Similarly, the audio element may apply a minimum gain check for silence (e.g., a device is on but in a pocket or purse of a user). The audio decoding device 34 may remove the audio stream and/or the corresponding energy map from the CM 47.

In some instances, the audio decoding device 34 may remove the audio stream and/or an energy map prior to generating a composite energy map. In other instances, the audio decoding device 34 may regenerate a composite energy map without the audio stream and/or energy map deemed unusable. In any event, the audio decoding device 34 may periodically update the energy map with respect to an audio frame rate, either the energy maps individually or as a composite energy map. The composite energy map may be an average of a multitude of energy maps, such that the composite energy map most likely provides the most accurate depiction of a common soundfield.

Figure 5C:
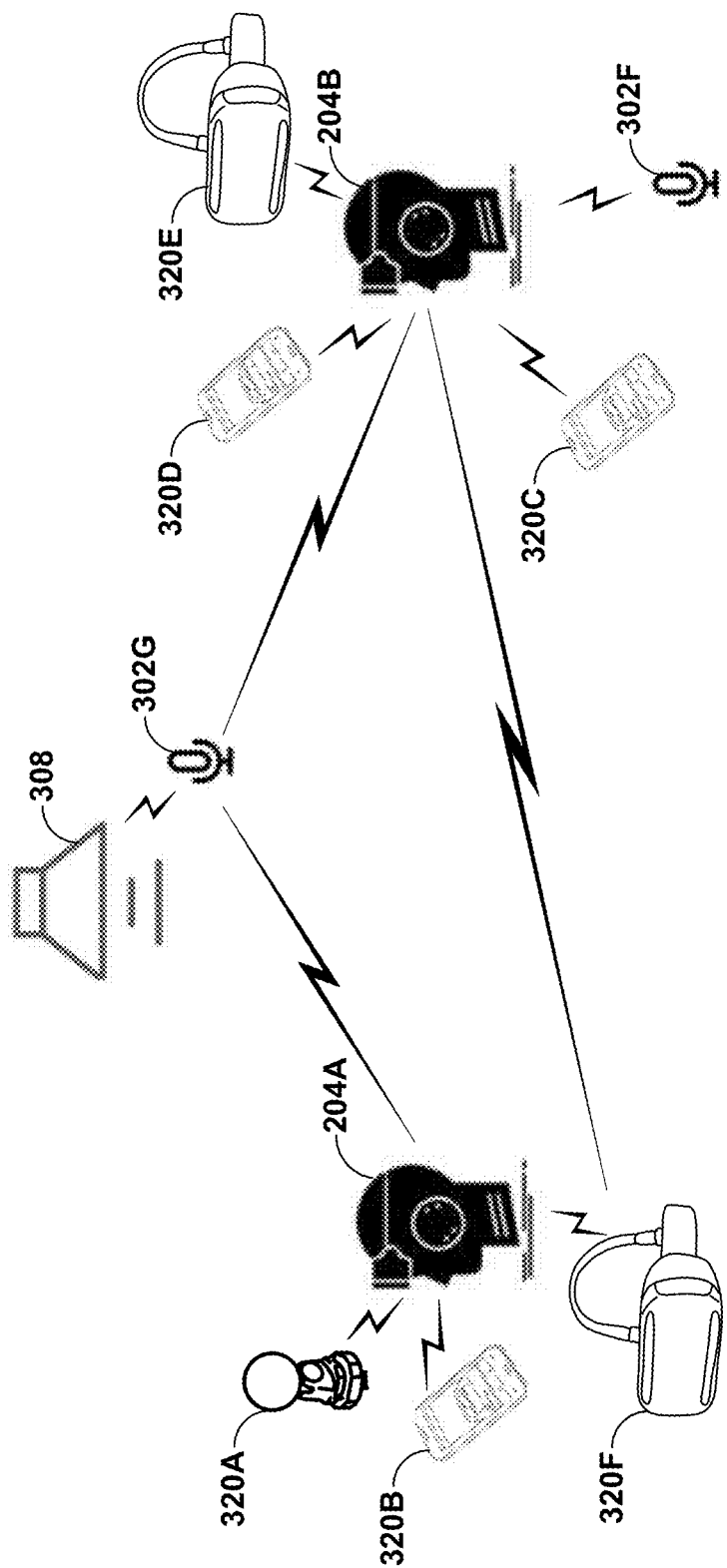

In the example of FIG. 5C, the audio elements 302 are replaced with specific devices 320A-320E ("devices 320"), where device 320A represents a dedicated microphone 320A, while devices 320B and 320C represent mobile devices 320 (e.g., smartphones or mobile handhelds). The devices 320E and 320F may represent VR devices 320. Each of devices 320 may include the audio elements 302, which capture bitstreams 27 that are conditioned in accordance with various aspects of the parameter adjustment techniques described in this disclosure. In some examples, the audio elements 302 may be enabled to receive audio. In another example, the audio elements 302 may be generated by synthesizing device 29. Further, devices 320 may include a wearable device, a mobile handset, an XR device, an audio receiver.

The devices 320 may be coupled to one or more speakers. The speakers may be configured to generate a soundfield, such as by reproducing, recreating, producing, playing, storing, or otherwise representing a soundfield. The devices 320 may be configured to provide a 3DOF, 3DOF+, or 6DOF user experience in accordance with various aspects of this disclosure. In some instances, the devices 320 may include receivers configured to receive audio streams in accordance with a 5G cellular standard and/or in accordance with a personal area network standard. In addition, the devices 320 may be configured to receive data over a wireless link, such as over a 5G air interface or a Bluetooth® interface. In other examples, the devices 320 may be configured to receive data over a wired link. In some instances, one of devices 320 may include a remote server configured to perform the adjustment techniques. In addition, devices 320 may include the source device 12 or the content consumer device 14. For example, devices 320 may be generating audio through one or more speakers, and thus, may include a source device 12.

In some examples, a mobile device, such as a smart phone, may receive the audio streams from multiple source devices 12 and determine parameter adjustments for the source devices 12 and the content consumer device 14. The smart phone may generate the energy maps and render an energy plot overlay to provide a visual representation of the energy maps and soundfields. The smart phone may access the energy maps, either from another audio device, external server, or through generation of the energy map using bitstreams 27.

In some examples, audio decoding device 34 may use peer-to-peer communication to share a parameter adjustment (e.g., a calibration adjustment) from one or more devices that are already adjusted and share the parameter adjustment with new devices introduced to the area. In some examples, audio decoding device 34 may utilize Electronic communication networks (ECNS). Audio decoding device 34 may be configured to prevent feedback through noise or other microphone-to-speaker feedback.

In some examples, there may be room-dependent parameter adjustment. For example, audio decoding device 34 may be configured to reduce room mode resonances. In an example, particular room resonances may occur at one or more particular nodes. In some examples, particular room resonances may occur at a node, or multiple nodes, where a sound wavelength is a multiple of the room dimensions. When the audio element is located at a destructive interference node, then the audio decoding device 34 may apply a parameter adjustment to boost frequencies that the one or more particular nodes have affected. In such examples, the affected audio element may implement (e.g., apply) a band-pass equalization gain to boost the frequencies affected by the node.

In another example, when the audio element is at a node where there is constructive interference, then the audio decoding device 34 may determine a parameter adjustment that reduces the gain at the room-dependent frequency. In this way, an audio element may implement the parameter adjustment (e.g., to reduce the gain, boost one or more affected frequencies, etc.) to increase a quality characteristic of the signal generated by the audio element. In an example, reducing the gain at the room-dependent frequency for an audio element at a node where there is constructive interference may allow the audio element to generate a soundfield that does not sound "boomy" or at least sounds less "boomy" than before the parameter adjustment.

Figure 5D:
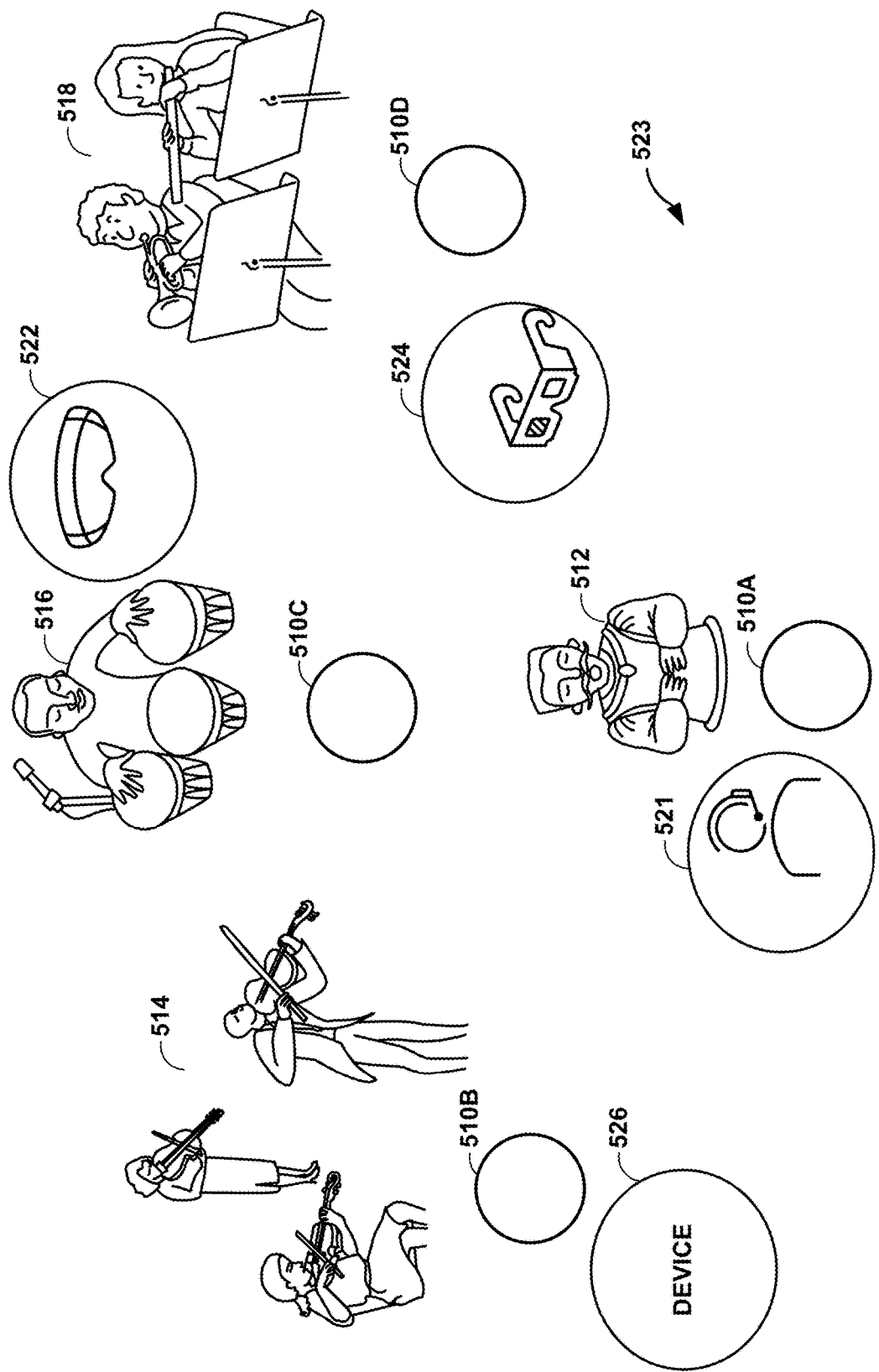

FIG. 5D is a conceptual diagram illustrating an example concert with three or more audio elements. In the example of FIG. 5D, a number of musicians are depicted on stage 523. Singer 512 is positioned behind audio element 510A. A string section 514 is depicted behind audio element 510B. Drummer 516 is depicted behind audio element 510C. Other musicians 518 are depicted behind audio element 510D. Audio elements 510A-510D may capture audio streams that correspond to the sounds received by microphones. In some examples, audio elements 510A-510D may represent generated audio streams (e.g., synthesized audio streams).

Audio element 510A may represent one or more captured audio stream(s) primarily associated with singer 512. In addition, or alternatively, the example audio stream(s) may also include sounds generated by other band members, such as the string section 514, the drummer 516 or the other musicians 518. In addition, or alternatively, the audio element 510B may represent one or more audio stream(s) primarily associated with string section 514 but also sounds generated by other band members. In this manner, each of audio elements 510A-510D may represent a different audio stream(s).

Also a number of devices are depicted. These devices represent user devices located at a number of different target listening positions. Headphones 521 are positioned near audio element 510A, but between audio element 510A and audio element 510B. As such, according to the techniques of this disclosure, stream selection unit 44 may select at least one of the audio streams to generate an audio experience for the user of the headphones 521 similar to the user being located where the headphones 521 are located in FIG. 5D. Similarly, VR goggles 522 are shown located behind the audio element 510C and between the drummer 516 and the other musicians 518. The stream selection unit 44 may select at least one audio stream to generate an audio experience for the user of the VR goggles 522 similar to the user being located where the VR goggles 522 are located in FIG. 5D.

Smart glasses 524 are shown located fairly centrally between the audio elements 510A, 510C and 510D. The stream selection unit 44 may select at least one audio stream to generate an audio experience for the user of the smart glasses 524 similar to the user being located where the smart glasses 524 are located in FIG. 5D. Additionally, device 526 (which may represent any device capable of implementing the techniques of this disclosure, such as a mobile handset, a speaker array, headphones, VR goggles, smart glasses, etc.) is shown located in front of audio element 510B. Stream selection unit 44 may select at least one audio stream to generate an audio experience for the user (e.g., the user 202) of the device 526 similar to the user being located where the device 526 is located in FIG. 5D. While specific devices are discussed with respect to particular locations, any of the devices depicted may provide an indication of a desired listening position that is different than depicted in FIG. 5D.

In such examples, content consumer device 14 and/or source device 12 may coordinate with one another to form a composite energy map of each audio element 510 and audio element 521 (e.g., a headset microphone) to determine whether to disable any audio elements 510 or 521. In some examples, content consumer device 14 and/or source device 12 may further determine whether to remove any audio elements 510 or 521 prior to generating a composite energy map, such as where one audio element is noisy. In an example, audio element 510A may include a microphone of an audience member where the microphone is in the pocket of the audience member and thus, may have a poor SNR reading or other quality metric that falls below a predetermined SNR threshold. As such, content consumer device 14 and/or source device 12 may receive the energy map for audio element 510A but may exclude the energy map when generating a composite energy map for the remaining and valid audio elements relative to stage 523. In some examples, musicians 518 may not be physically present on stage 523 but audio element 510D may include an audio stream generated at the location of where musicians are shown in FIG. 5D. Content consumer device 14 and/or source device 12 may nevertheless determine a composite energy map that includes an energy map corresponding to synthesized audio element 510D.

Figure 6:
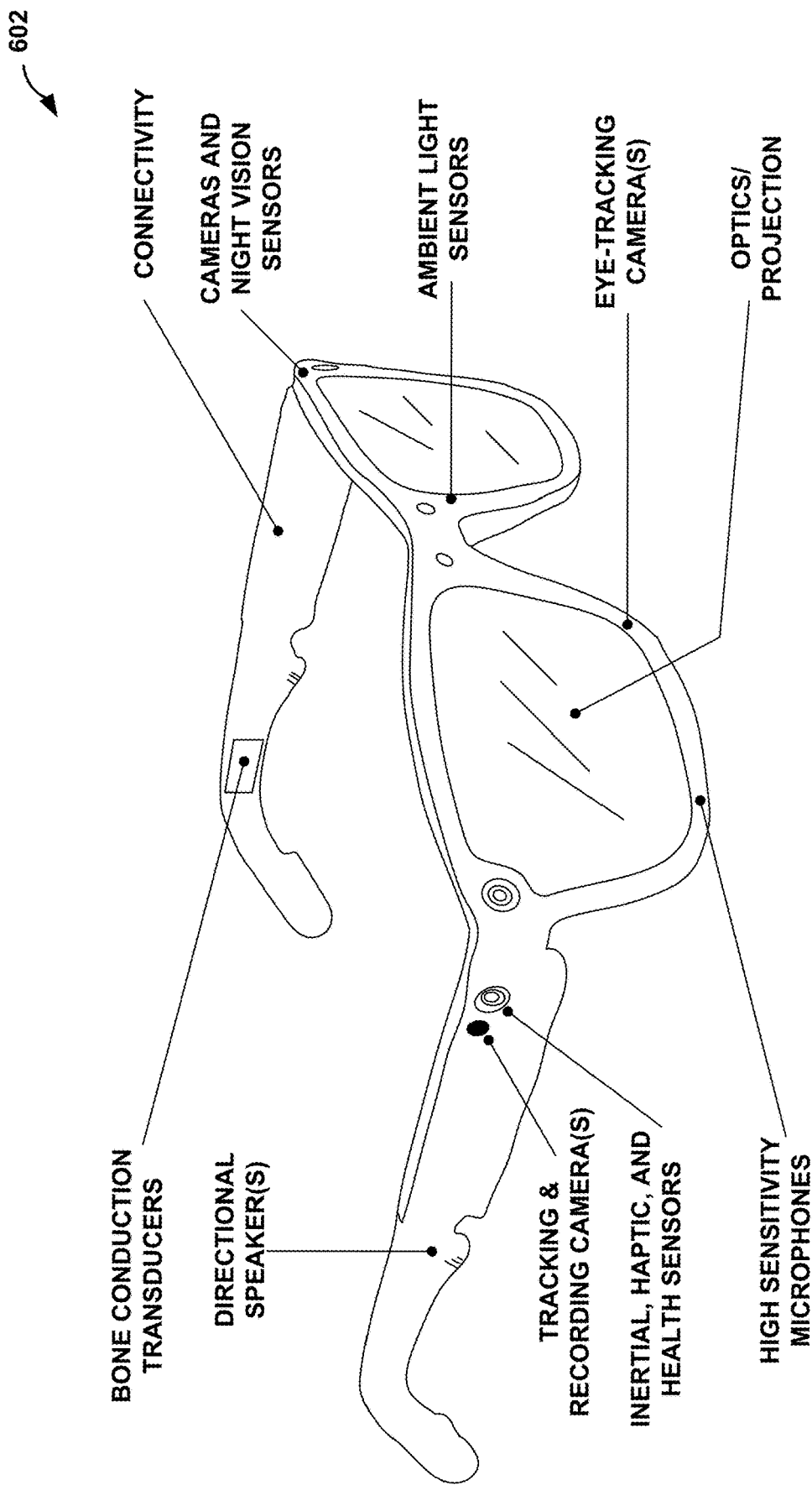
FIG. 6 is a diagram illustrating an example of a wearable device that may operate in accordance with various aspect of the techniques described in this disclosure.

FIG. 6 is a diagram illustrating an example of a wearable device 602 that may operate in accordance with various aspect of the techniques described in this disclosure. In various examples, the wearable device 602 may represent an XR device (e.g., such as the VR device(s) 204 described herein, an AR headset, an MR headset, or any other type of XR headset). Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 602 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 602 may communicate with the computing device supporting the wearable device 602 via a wired connection or a wireless connection.

In some instances, the computing device supporting the wearable device 602 may be integrated within the wearable device 602 and as such, the wearable device 602 may be considered as the same device as the computing device supporting the wearable device 602. In other instances, the wearable device 602 may communicate with a separate computing device that may support the wearable device 602. In this respect, the term "supporting" should not be understood to require a separate dedicated device but that one or more processors configured to perform various aspects of the techniques described in this disclosure may be integrated within the wearable device 602 or integrated within a computing device separate from the wearable device 602.

For example, when the wearable device 602 represents a VR device, a separate dedicated computing device (such as a personal computer including the one or more processors) may render the audio and visual content, while the wearable device 602 may determine the translational head movement upon which the dedicated computing device may render, based on the translational head movement, the audio content (as the speaker feeds) in accordance with various aspects of the techniques described in this disclosure. As another example, when the wearable device 602 represents smart glasses, the wearable device 602 may include the one or more processors that both determine the translational head movement (by interfacing within one or more sensors of the wearable device 602) and render, based on the determined translational head movement, the speaker feeds.

As shown, the wearable device 602 includes one or more directional speakers, and one or more tracking and/or recording cameras. In addition, the wearable device 602 includes one or more inertial, haptic, and/or health sensors, one or more eye-tracking cameras, one or more high sensitivity audio elements (e.g., one or more microphones), and optics/projection hardware. The optics/projection hardware of the wearable device 602 may include durable semi-transparent display technology and hardware.

The wearable device 602 also includes connectivity hardware, which may represent one or more network interfaces that support multimode connectivity, such as 4G communications, 5G communications, Bluetooth®, Wi-Fi™, etc. The wearable device 602 also includes one or more ambient light sensors, one or more cameras and night vision sensors, and one or more bone conduction transducers. In some instances, the wearable device 602 may also include one or more passive and/or active cameras with fisheye lenses and/or telephoto lenses. Although not shown in FIG. 6, the wearable device 602 also may include one or more light emitting diode (LED) lights. In some examples, the LED light(s) may be referred to as "ultra bright" LED light(s). The wearable device 602 also may include one or more rear cameras in some implementations. It will be appreciated that the wearable device 602 may exhibit a variety of different form factors.

Furthermore, the tracking and recording cameras and other sensors may facilitate the determination of translational distance. Although not shown in the example of FIG. 6, wearable device 602 may include other types of sensors for detecting translational distance.

Although described with respect to particular examples of wearable devices, such as the VR device 204 discussed herein with respect to the examples of FIG. 2 and other devices set forth in the examples of FIGS. 1A-1C, a person of ordinary skill in the art would appreciate that descriptions related to FIGS. 1A-1C, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 7A:
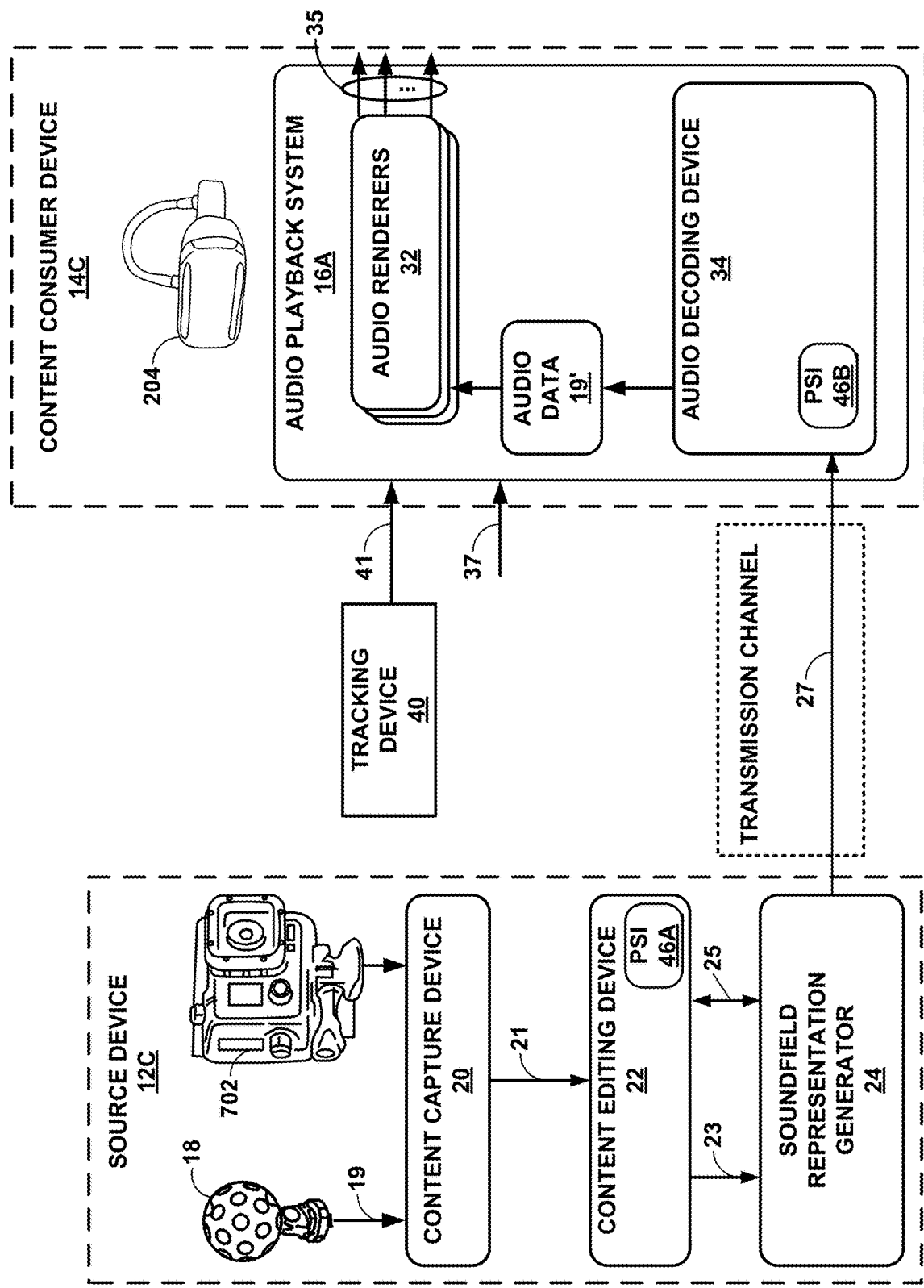
FIGS. 7A and 7B are diagrams illustrating other example systems that may perform various aspects of the techniques described in this disclosure.
Figure 7B:
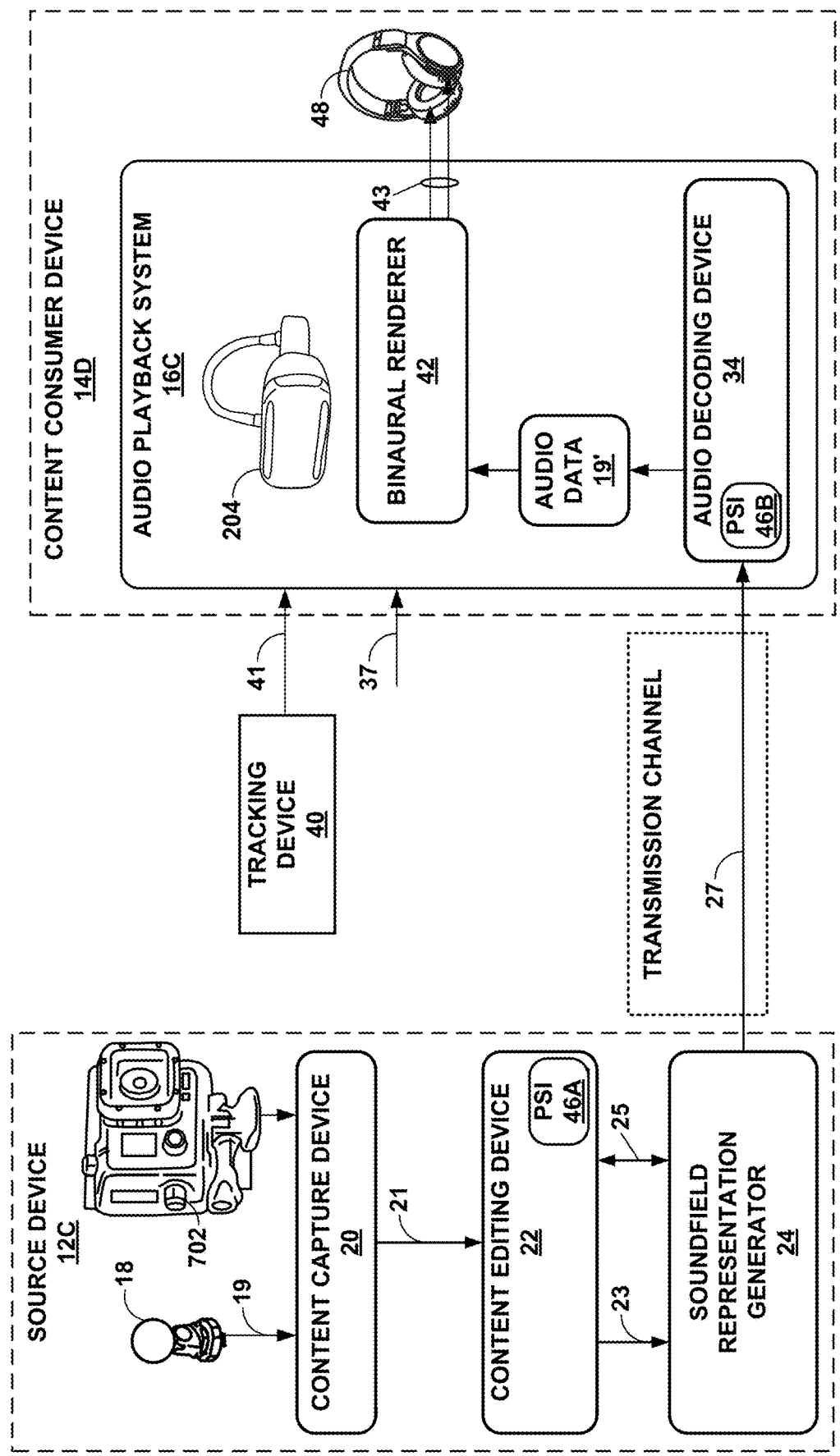

FIGS. 7A and 7B are diagrams illustrating example systems that may perform various aspects of the techniques described in this disclosure. FIG. 7A illustrates an example in which the source device 12C further includes a camera 702. The camera 702 may be configured to capture video data, and provide the captured raw video data to the content capture device 20. The content capture device 20 may provide the video data to another component of the source device 12C, for further processing into viewport-divided portions.

In the example of FIG. 7A, the content consumer device 14C also includes the VR device 204. It will be understood that, in various implementations, the VR device 204 may be included in, or externally coupled to, the content consumer device 14C. The VR device 204 includes display hardware and speaker hardware for outputting video data (e.g., as associated with various viewports) and for rendering audio data.

FIG. 7B illustrates an example in which the audio renderers 32 shown in FIG. 7A are replaced with a binaural renderer 42 capable of performing binaural rendering using one or more HRTFs or the other functions capable of rendering to left and right speaker feeds 43. The audio playback system 16C of content consumer device 14D may output the left and right speaker feeds 43 to headphones 48.

The headphones 48 may couple to the audio playback system 16C via a wired connection (such as a standard 3.5 mm audio jack, a universal system bus (USB) connection, an optical audio jack, or other forms of wired connection) or wirelessly (such as by way of a Bluetooth® connection, a wireless network connection, and the like). The headphones 48 may generate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43. It should be noted that the content consumer device 14C and/or the content consumer device 14D may be used with the source device 12 of FIGS. 1A-1C.

Figure 8:
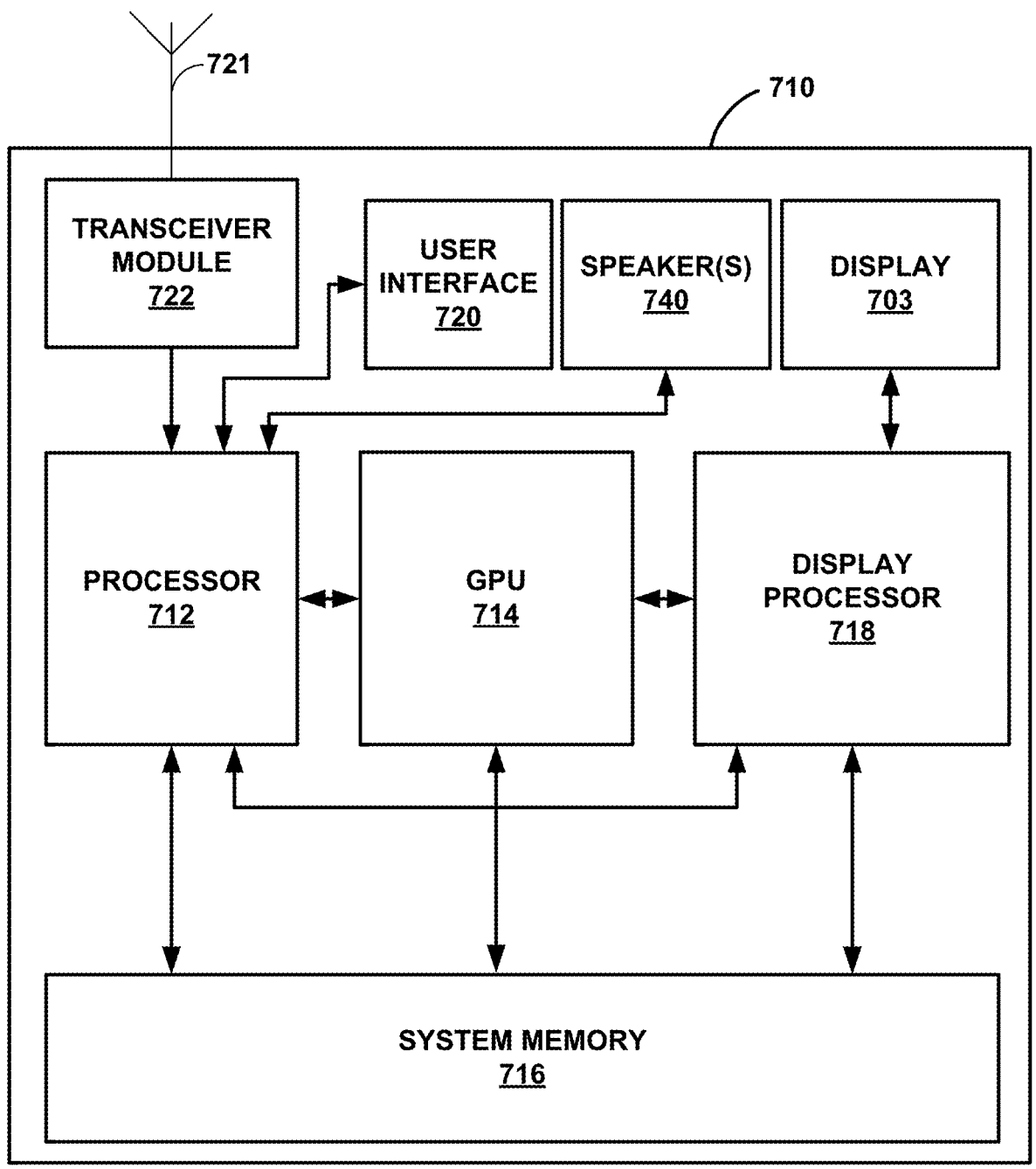
FIG. 8 is a block diagram illustrating example components of one or more of the source device and the content consumer device shown in the example of FIGS. 1A-1C.

FIG. 8 is a block diagram illustrating example components of one or more of the source device and the content consumer device shown in the examples of FIGS. 1A-1C. In the example of FIG. 8, the device 710 includes a processor 712 (which may be referred to as "one or more processors"

or "processor(s)"), a graphics processing unit (GPU) 714, system memory 716, a display processor 718, one or more integrated speakers 740, a display 703, a UI 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (e.g., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (e.g., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail herein. The system memory 716 may store instructions for execution of the applications. The execution of one of the applications on the processor 712 causes the processor 712 to generate graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may include one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The UI 720 may represent one or more hardware or virtual (meaning a combination of hardware and software) UIs by which a user may interface with the device 710. The UI 720 may include physical buttons, switches, toggles, lights or virtual versions thereof. The UI 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the source device 12 (e.g., a content creator device) and/or the content consumer device 14. For example, the processor 712 may implement the functionality described above in FIGS. 3A-3D, FIGS. 4A-4B, FIGS. 5A-5D, FIG. 6, FIGS. 7A-7B, and FIGS. 9A-9C, and FIG. 10, with respect to parameter adjustments and/or energy maps. The antenna 721 and the transceiver module 722 may represent a unit configured to establish and maintain the connection between the source device 12 and the content consumer device 14. The antenna 721 and the transceiver module 722 may represent one or more receivers and/or one or more transmitters capable of wireless communication in accordance with one or more wireless communication protocols, such as a 5G cellular standard, a PAN protocol, such as Bluetooth®, or other open-source, proprietary, or other communication standard. As such, the transceiver module 722 may be configured to receive and/or transmit a wireless signal. In some examples, the transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

Figure 9A:
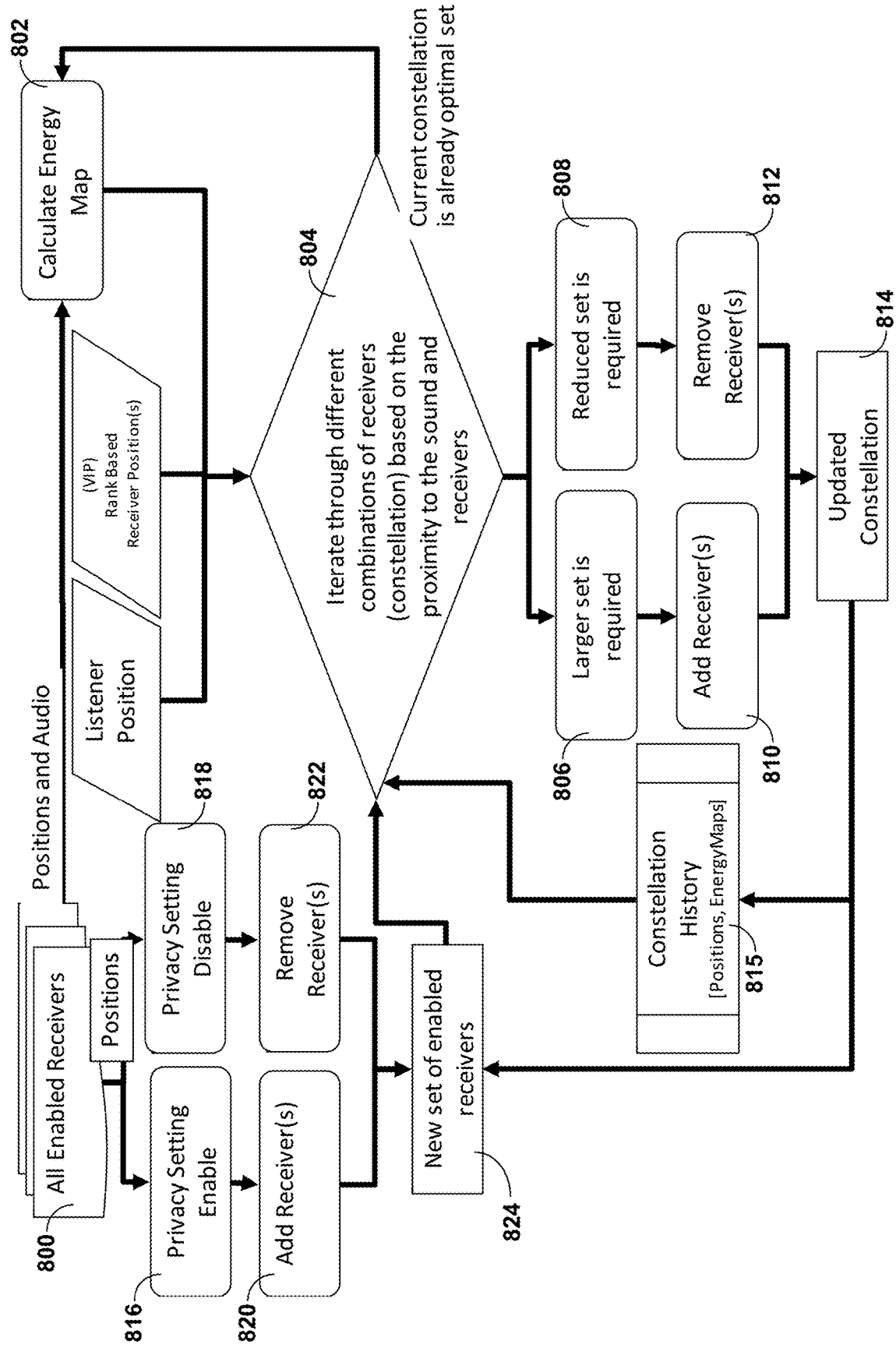
FIGS. 9A-9C are flowcharts illustrating example operations of the stream selection unit shown in the examples of FIGS. 1A-1C in performing various aspects of the stream selection techniques.
Figure 9B:
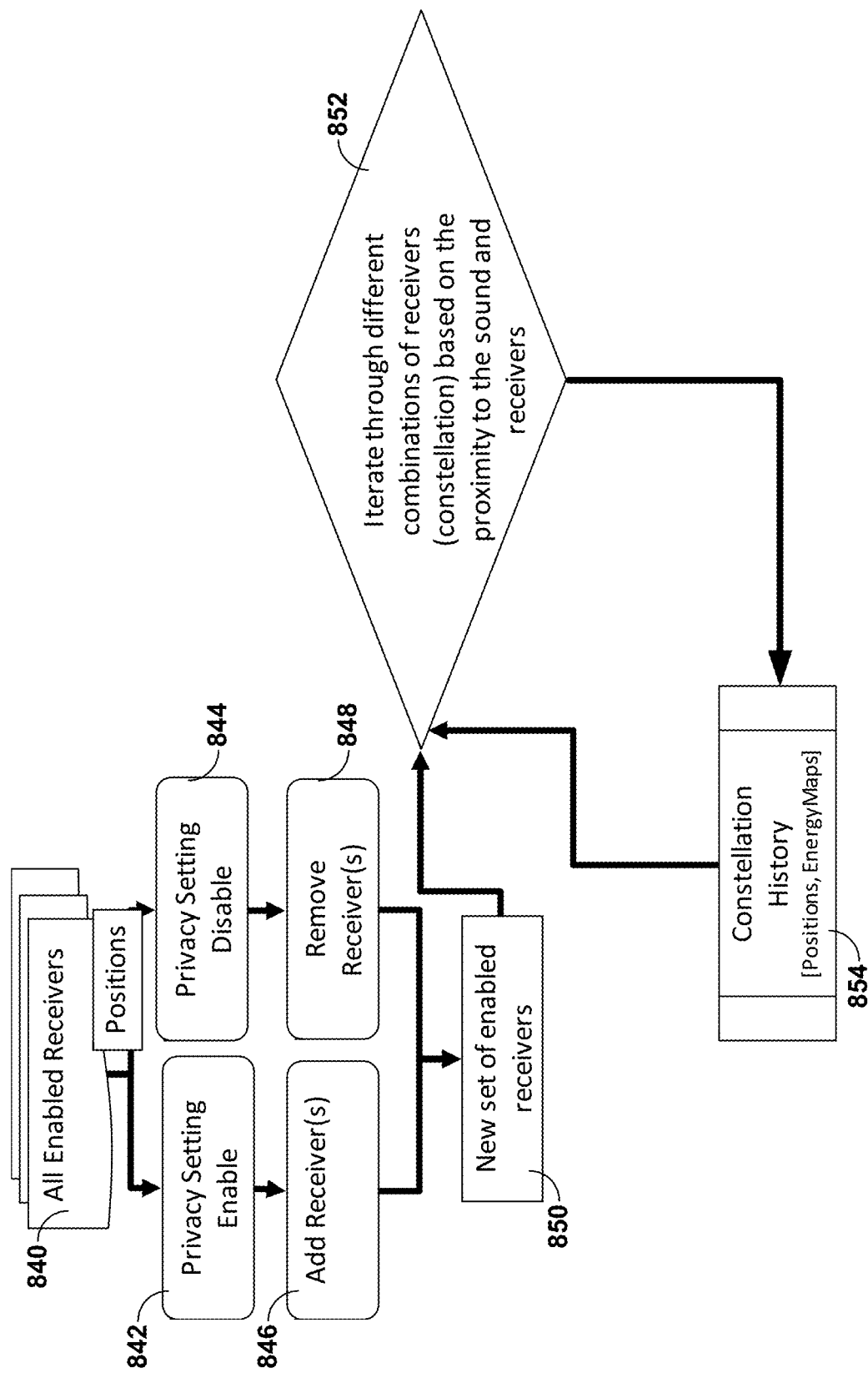
Figure 9C:
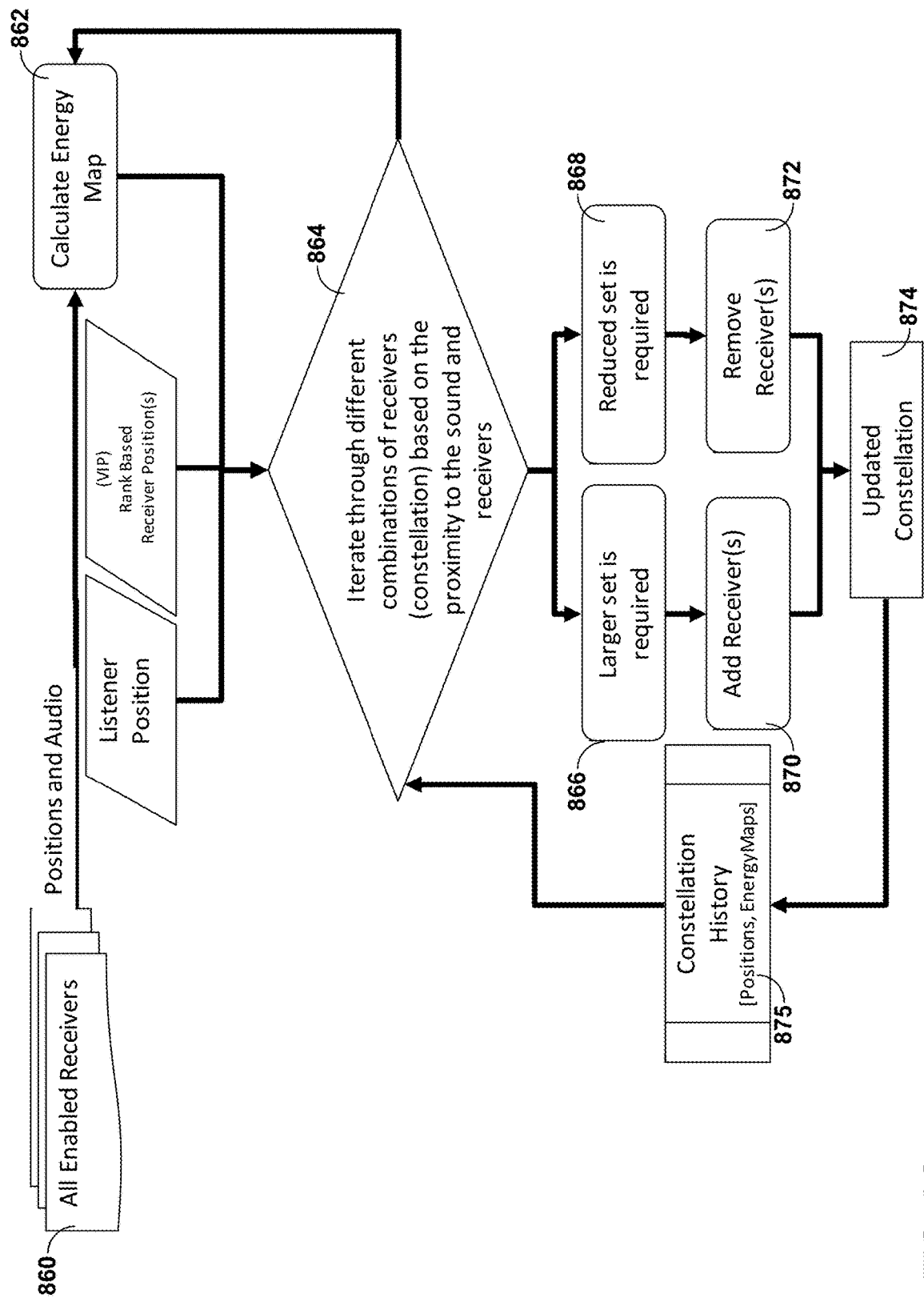

FIGS. 9A-9C are flowcharts illustrating example operations of the stream selection unit 44 shown in the examples of FIGS. 1A-1C in performing various aspects of the stream selection and audio element compensation techniques. Referring first to the example of FIG. 9A, the stream selection unit 44 may obtain a bitstream 27 from all enabled audio elements (e.g., receivers, such as the microphone 18, audio synthesizers, such as the synthesizing device 29, etc.), where the bitstreams 27 may include corresponding information (e.g., metadata), such as the ALI 45A (800). The stream selection unit 44 may perform the energy analysis with respect to each of the bitstreams 27 to calculate a respective energy map (802). In an illustrative example, the stream selection unit 44 may determine a composite energy map based on a combination of at least two energy maps (e.g., energy maps determined for a plurality of audio elements in a constellation of audio elements). In an illustrative example, audio decoding device 34 may interpolate between a plurality of energy maps to form the composite energy map. In another example, audio decoding device 34 may compare the roll-off of an energy map to the roll-off of another reference energy map of a pre-compensated audio element to form the composite energy map.

The stream selection unit 44 may iterate through different combinations of the audio elements (defined in the CM 47) based on proximity to the audio source 308 (as defined by audio source distance 306A and/or 306B) and the audio elements (as defined by the proximity distances discussed herein) (804). As shown in FIG. 9A, the audio elements may be ranked or otherwise associated with different access rights. The stream selection unit 44 may iterate, based on the listener position (which is another way to refer to the "virtual location" or "device location") represented by the DLI 45B, and the audio element positions represented by the ALI 45A, in the manner described above to identify whether a larger subset of the bitstreams 27 or a reduced subset of the bitstreams 27 is required (806, 808).

When a larger subset of the bitstreams 27 is required, the stream selection unit 44 may add audio element(s), or in other words, additional audio stream(s) to the audio data 19' (such as when the user is closer to the audio source in the example of FIG. 3A) (810). When a reduced subset of the bitstreams 27 is required, the stream selection unit 44 may remove audio element(s) or in other words one or more existing audio stream(s) from the audio data 19' (such as when the user is farther from the audio source in the example of FIG. 3A) (812).

In some examples, the stream selection unit 44 may determine that the current constellation of audio elements is an optimal set (or, in other words, that the existing audio data 19' is to remain the same as the selection process described herein results in the same audio data 19') (804), and the process may return to 802. However, when audio streams are added or removed from the audio data 19', the stream selection unit 44 may update the CM 47 (814), generating a constellation history (815) (including positions, energy maps, etc.).

In addition, the stream selection unit 44 may determine whether privacy settings enable or disable addition of the audio elements (where the privacy settings may refer to digital access rights that limit access to one or more of the bitstreams 27, e.g., by way of a password, an authorization level or rank, a time, etc.) (816, 818). When privacy settings enable addition of an audio element, the stream selection unit 44 may add audio element(s) to the updated CM 47 (which refers to addition of audio stream(s) to the audio data 19') (820). When privacy settings disable addition of an audio element, the stream selection unit 44 may remove audio element(s) from the updated CM 47 (which refers to removal of one or more audio stream(s) from the audio data 19') (822). In this manner, the stream selection unit 44 may identify a new set of enabled audio elements (824).

The stream selection unit 44 may iterate in this fashion and update various inputs according to any given frequency. For example, the stream selection unit 44 may update privacy settings at a UI rate (meaning that updates are driven by way of updates entered via the UI). The stream selection unit 44, as another example, may update positions at sensor rate (meaning as positions are changed through movement of the audio element). The stream selection unit 44 may further update the energy maps at an audio frame rate (meaning that the energy maps are updated each frame).

Referring next to the example of FIG. 9B, the stream selection unit 44 may operate in the manner described above with respect to FIG. 9A, except that the stream selection unit 44 may not base the determination of the CM 47 on energy maps. As such, the stream selection unit 44 may obtain bitstream 27 from all enabled audio elements, where the bitstreams 27 may include corresponding information (e.g., metadata), such as the ALI 45A (840). The stream selection unit 44 may determine whether privacy settings enable or disable addition of the audio elements (where the privacy settings may refer to digital access rights that limit access to one or more of the bitstreams 27, e.g., by way of a password, an authorization level or rank, a time, etc.) (842, 844).

When privacy settings enable addition of a receiver, the stream selection unit 44 may add audio element(s) to the updated CM 47 (which refers to addition of audio stream(s) to the audio data 19') (846). When privacy settings disable addition of a receiver, the stream selection unit 44 may remove audio element(s) from the updated CM 47 (which refers to removal of one or more audio stream(s) from the audio data 19') (848). In this manner, the stream selection unit 44 may identify a new set of enabled audio elements (850). The stream selection unit 44 may iterate (852) through the different combinations of audio elements in the CM 47 to determine the constellation history (854), which is representative of the audio data 19'.

The stream selection unit 44 may iterate in this fashion and update various inputs according to any given frequency. For example, the stream selection unit 44 may update privacy settings at a UI rate (meaning that updates are driven by way of updates entered via the UI). The stream selection unit 44, as another example, may update positions at sensor rate (meaning as positions are changed through movement of the audio element). The stream selection unit 44 may further update the energy maps at an audio frame rate (meaning that the energy maps are updated each frame).

Referring next to the example of FIG. 9C, the stream selection unit 44 may operate in the manner described above with respect to FIG. 9A, except that the stream selection unit 44 may not base the determination of the CM 47 on privacy settings of enabled audio elements. As such, the stream selection unit 44 may obtain bitstreams 27 (e.g., audio streams) from all enabled audio elements, where the bitstreams 27 may include corresponding metadata (e.g., audio metadata, PSI, ALI 45A, etc.) (860). The stream selection unit 44 may perform the energy analysis with respect to each of the bitstreams 27 to calculate a respective energy map (862).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above) (864). As shown in FIG. 9C, the audio elements may be ranked or otherwise associated with different access rights. The stream selection unit 44 may iterate, based on the listener position (which again is another way to refer to the "virtual location" or "device location" discussed above) represented by the DLI 45B, and the audio element positions represented by the ALI 45A, in the manner described above to identify whether a larger subset of the bitstreams 27 or a reduced subset of the bitstreams 27 is required (866, 868).

When a larger subset of the bitstreams 27 is required, the stream selection unit 44 may add audio element(s), or in other words, additional audio stream(s) to the audio data 19' (such as when the user is closer to the audio source in the example of FIG. 3A) (870). When a reduced subset of the bitstreams 27 is required, the stream selection unit 44 may remove audio element(s), or in other words, one or more existing audio stream(s) from the audio data 19' (such as when the user is farther from the audio source in the example of FIG. 3A) (872).

In some examples, the stream selection unit 44 may determine that the current constellation of audio elements is an optimal set (or, in other words, that the existing audio data 19' is to remain the same as the selection process described herein results in the same audio data 19') (864), and the process may return to 862. However, when audio streams are added or removed from the audio data 19', the stream selection unit 44 may update the CM 47 (874), generating a constellation history (875).

The stream selection unit 44 may iterate in this fashion and update various inputs according to any given frequency. For example, the stream selection unit 44 may update positions at sensor rate (meaning as positions are changed through movement of the audio element). The stream selection unit 44 may further update the energy maps at an audio frame rate (meaning that the energy maps are updated each frame).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

Figure 10:
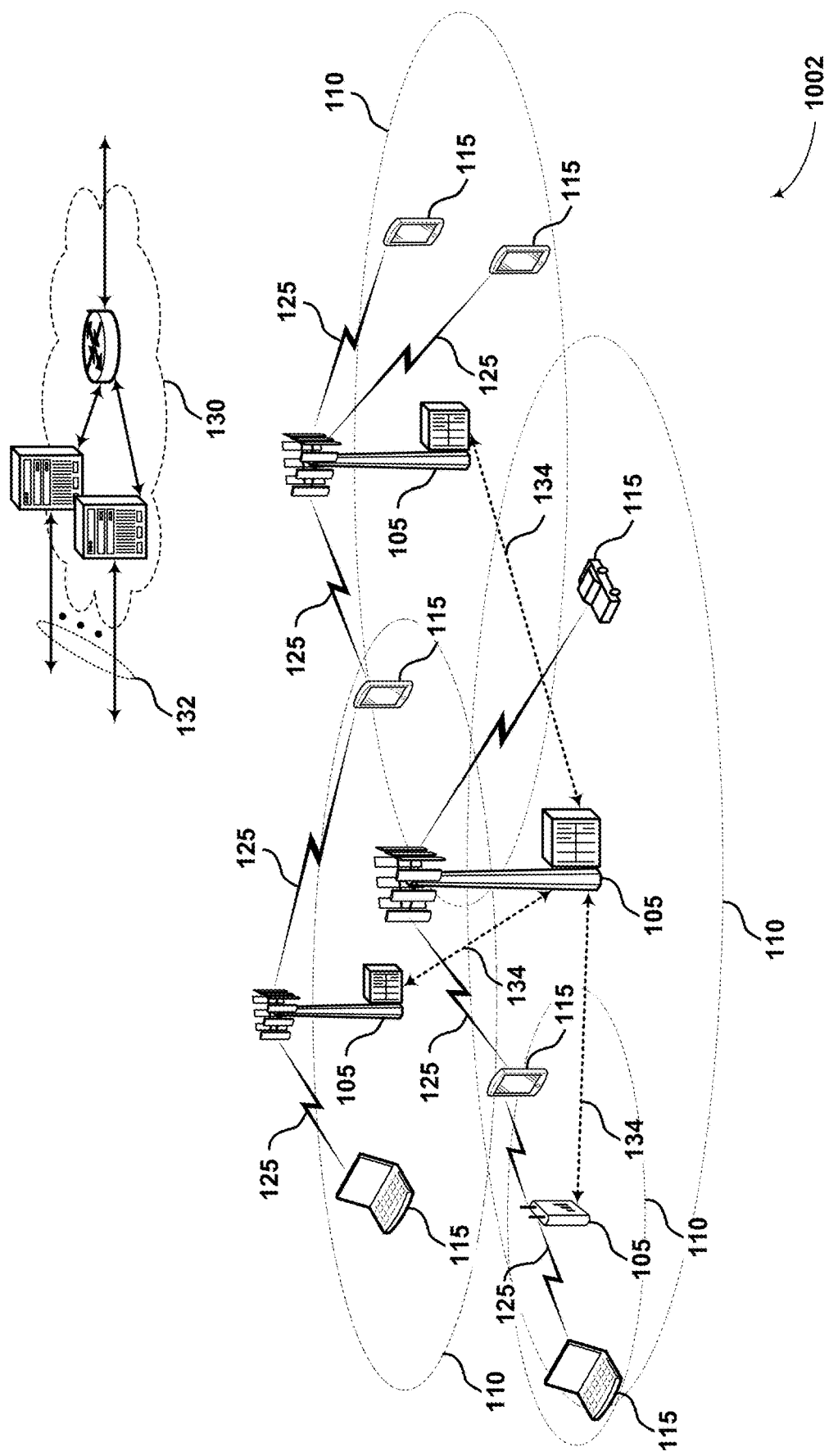
FIG. 10 illustrates an example of a wireless communications system that supports parameter adjustments in accordance with aspects of the present disclosure.

FIG. 10 illustrates an example of a wireless communications system 1002 that supports parameter adjustments in accordance with aspects of the present disclosure. The wireless communications system 1002 includes base stations 105, user equipment (UEs) 115, and a core network 130. In some examples, the wireless communications system 1002 may be a Long Term Evolution (LTE) network, an LTE-Advanced (LTE-A) network, an LTE-A Pro network, a 5G cellular network, or a New Radio (NR) network. In some cases, wireless communications system 1002 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 1002 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 1002 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 1002 may include, for example, a heterogeneous LTE/LTE-A/LTE-A Pro, 5G cellular or NR network in which different types of base stations 105 provide coverage for various geographic coverage areas 110.

UEs 115 may be dispersed throughout the wireless communications system 1002, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, a synthesized audio stream may be an audio stream that was stored in memory or was previously generated (e.g., created, synthesized, etc.). In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use parameter settings and parameter adjustments, for example gain or frequency response adjustments indicating parameter adjustments and/or energy plot overlay data to adjust a set of parameter settings for one or more microphones capturing various audio streams and/or audio sources (e.g., audio elements).

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 1002 may utilize both licensed and unlicensed radio frequency spectrum bands. For example, wireless communications system 1002 may employ License Assisted Access (LAA), LTE-Unlicensed (LTE-U) radio access technology (RAT), or NR technology in an unlicensed band such as the 5 GHz Industrial Scientific Medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The present disclosure includes the following examples:

Example 1A: An audio device configured to determine parameter adjustments for a capture of audio, the audio device comprising: a memory configured to store at least one energy map that corresponds to one or more audio streams; and one or more processors coupled to the memory, and configured to: access the at least one energy map that corresponds to the one or more audio streams; determine, based at least in part on the at least one energy map, a parameter adjustment with respect to at least one microphone, the parameter adjustment configured to adjust the capture of audio by the at least one microphone; and output an indication indicating the parameter adjustment with respect to the at least one microphone.

Example 2A: An audio device according to claim 1A, wherein the one or more processors are configured to: perform an energy analysis with respect to the one or more audio streams to determine the at least one energy map.

Example 3A: An audio device according to any combination of Examples 1A and 2A, wherein the one or more processors are configured to: compare the at least one energy map to one or more other energy maps, the one or more other energy maps corresponding to audio captured by the at least one microphone; and determine the parameter adjustment based at least in part on the comparison between the at least one energy map and the one or more other energy maps.

Example 4A: An audio device according to any combination of Examples 1A through 3A, wherein the one or more processors are configured to: receive, from one or more source devices, at least one of: the at least one energy map and the one or more other energy maps.

Example 5A: An audio device according to any combination of Examples 1A through 4A, wherein the at least one energy map comprises a plurality of energy map components.

Example 6A: An audio device according to Example 5A, wherein the energy map components correspond to the one or more audio streams.

Example 7A: An audio device according to any combination of Examples 1A through 6A, wherein the one or more processors are configured to: analyze, in determining the parameter adjustment, at least one of: gain and frequency response.

Example 8A: An audio device according to any combination of Examples 1A through 7A, wherein the one or more processors are configured to: determine the parameter adjustment so as to modify capture of the one or more audio streams.

Example 9A: An audio device according to any combination of Examples 1A through 8A, wherein the parameter adjustment includes an adjustment to a gain of the at least one microphone.

Example 10A: An audio device according to Example 9A, wherein the gain is frequency dependent.

Example 11A: An audio device according to any combination of Examples 1A through 10A, wherein the one or more processors are configured to: utilize, in accordance with the parameter adjustment, one or more parameter settings of the at least one microphone to receive audio.

Example 12A: An audio device according to any combination of Examples 1A through 11A, wherein the one or more processors are configured to: transmit, to a first source device that corresponds to the at least one microphone, the parameter adjustment.

Example 13A: An audio device according to any combination of Examples 1A through 12A, wherein determining the parameter adjustment includes determining a variance score with respect to the one or more audio streams.

Example 14A: An audio device according to Example 13A, wherein the variance score increases when there is a discontinuity with respect to at least one of the one or more audio streams.

Example 15A: An audio device according to Example 14A, wherein the discontinuity comprises a gap in a frequency response of the at least one audio stream.

Example 16A: An audio device according to any combination of Examples 13A through 15A, wherein the one or more processors are configured to: compare the variance score to a variance threshold; and determine the parameter adjustment based at least in part on the comparison of the variance score to the variance threshold.

Example 17A: An audio device according to any combination of Examples 1A through 16A, wherein determining the parameter adjustment includes determining a variation in gain of the one or more audio streams.

Example 18A: An audio device according to any combination of Examples 1A through 17A, wherein the one or more processors are configured to: render an energy plot overlay based at least in part on the at least one energy map.

Example 19A: An audio device according to Example 18A, wherein the one or more processors are configured to output the energy plot overlay for display to a user.

Example 20A: An audio device according to any combination of Examples 1A through 19A, wherein the one or more processors are configured to: access diagnostic data for at least one of the one or more audio streams; determine a quality characteristic for the one or more audio streams based at least in part on the diagnostic data; modify, based at least in part on the quality characteristic, at least one of: the at least one energy map and the one or more audio streams; and determine, based at least in part on the modification, the parameter adjustment.

Example 21A: An audio device according to any combination of Examples 1A through 20A, wherein the one or more processors are configured to: determine a permission status that corresponds to at least one of the one or more audio streams; modify, based at least in part on the permission status, at least one of: the at least one energy map and the one or more audio streams; and determine, based at least in part on the modification, the parameter adjustment.

Example 22A: An audio device according to Example 21A, wherein the permission status indicates whether the one or more audio streams are restricted or unrestricted.

Example 23A: An audio device according to any combination of Examples 1A through 22A, wherein the one or more processors are configured to: determine a feasibility status of the one or more microphones, the feasibility status indicating a feasibility score for the one or more microphones; modify, based at least in part on the feasibility status, at least one of: the at least one energy map and the one or more audio streams; and determine, based at least in part on the modification, the parameter adjustment.

Example 24A: An audio device according to any combination of Examples 20A through 23A, wherein modifying comprises adjusting a number of energy map components used to determine the at least one energy map.

Example 25A: An audio device according to any combination of Examples 20A through 24A, wherein modifying comprises removing at least one audio stream from the one or more audio streams.

Example 26A: An audio device according to any combination of Examples 20A through 25A, wherein the one or more processors are configured to: receive the diagnostic data as self-diagnostic data.

Example 27A: An audio device according to any combination of Examples 20A through 26A, wherein the diagnostic data comprises at least one of: signal-to-noise ratio information and gain.

Example 28A: An audio device according to any combination of Examples 20A through 27A, wherein determining the quality characteristic comprises tagging at least one of the one or more audio streams as an ineligible audio stream.

Example 29A: An audio device according to any combination of Examples 1A through 28A, wherein the one or more processors are configured to: receive an adjustment status.

Example 30A: An audio device according to Example 29A, wherein the adjustment status indicates a successful adjustment with respect to the at least one microphone receiving audio in accordance with the parameter adjustment.

Example 31A: An audio device according to any combination of Examples 29A and 30A, wherein the adjustment status indicates that the at least one microphone is receiving audio.

Example 32A: An audio device according to any combination of Examples 1A through 31A, wherein the one or more processors are configured to: periodically update the at least one energy map with respect to an audio frame rate.

Example 33A: An audio device according to any combination of Examples 1A through 32A, wherein the audio device comprises a wearable device.

Example 34A: An audio device according to any combination of Examples 1A through 33A, wherein the audio device comprises a mobile device.

Example 35A: An audio device according to any combination of Examples 35A, wherein the mobile device comprises a mobile handset.

Example 36A: An audio device according to any combination of Examples 1A through 35A, wherein the audio device comprises the at least one microphone.

Example 37A: An audio device according to any combination of Examples 1A through 36A, wherein the audio device comprises a headset coupled to one or more speakers.

Example 38A: An audio device according to any combination of Examples 1A through 37A, wherein the audio device comprises one or more speakers.

Example 39A: An audio device according to any combination of Examples 1A through 38A, wherein the audio device includes an extended reality (XR) headset coupled to one or more speakers.

Example 40A: An audio device according to Example 39A, wherein the XR headset comprises one or more of an augmented reality headset, a virtual reality headset or a mixed reality headset.

Example 41A: An audio device according to any combination of Examples 1A through 41A, wherein the audio device includes one or more speakers configured to generate a soundfield.

Example 42A: An audio device according to any combination of Examples 1A through 41A, wherein the at least one microphone is configured to provide a six degrees-of-freedom user experience.

Example 43A: An audio device according to any combination of Examples 1A through 42A, wherein the audio device comprises an audio receiver enabled to receive audio.

Example 44A: An audio device according to any combination of Examples 1A through 43A, wherein the audio device comprises a receiver configured to receive the one or more audio streams.

Example 45A: An audio device according to Example 44A, wherein the receiver includes a receiver configured to receive the one or more audio streams in accordance with a 5G cellular standard.

Example 46A: An audio device according to Example 44A, wherein the receiver includes a receiver configured to receive the one or more audio streams in accordance with a personal area network standard.

Example 47A: An audio device according to any combination of Examples 1A through 46A, wherein the one or more processors are configured to: receive, over a wireless link, at least one of: the one or more audio streams and the at least one energy map.

Example 48A: An audio device according to Example 47A, wherein the wireless link is over a 5G air interface.

Example 49A: An audio device according to Example 47A, wherein the wireless link is over a Bluetooth interface.

Example 50A: An audio device according to any combination of Examples 1A through 49A, wherein the audio device comprises a remote server configured to determine the at least one energy map.

Example 51A: A method for determining parameter adjustment for a capture of audio, the method comprising: accessing at least one energy map, the at least one energy map corresponding to one or more audio streams; determining, based at least in part on the at least one energy map, a parameter adjustment with respect to at least one microphone, the parameter adjustment configured to adjust the capture of audio by the at least one microphone; and outputting an indication indicating the parameter adjustment with respect to the at least one of microphone.

Example 52A: A method according to Example 51A, the method further comprising: performing an energy analysis with respect to the one or more audio streams to determine the at least one of the energy map.

Example 53A: A method according to any combination of Examples 51A and 52A, the method further comprising: comparing the at least one energy map to one or more other energy maps, the one or more other energy maps corresponding to audio captured by the at least one microphone; and determining the parameter adjustment based at least in part on the comparison between the at least one energy map and the one or more energy maps.

Example 54A: A method according to any combination of Examples 51A through 53A, the method further comprising: receiving, from one or more source devices, at least one of: the at least one energy map and the other energy maps.

Example 55A: A method according to any combination of Examples 51A through 54A, wherein the at least one energy map comprises a plurality of energy map components.

Example 56A: A method according to Example 55A, wherein the energy map components correspond to the one or more audio streams.

Example 57A: A method according to any combination of Examples 51A through 56A, the method further comprising: analyzing, in determining the parameter adjustment, at least one of: gain and frequency response.

Example 58A: A method according to any combination of Examples 51A through 57A, the method further comprising: determining the parameter adjustment so as to modify capture of the one or more audio streams.

Example 59A: A method according to any combination of Examples 51A through 58A, wherein the parameter adjustment includes an adjustment to a gain of the at least one microphone.

Example 60A: A method according to Example 59A, wherein the gain is frequency dependent.

Example 61A: A method according to any combination of Examples 51A through 60A, the method comprising: utilizing, in accordance with the parameter adjustment, one or more parameter settings of the at least one microphone to receive audio.

Example 62A: A method according to any combination of Examples 51A through 61A, the method further comprising: transmitting, to a first source device that corresponds to the at least one microphone, the parameter adjustment.

Example 63A: A method according to any combination of Examples 51A through 62A, wherein determining the parameter adjustment includes: determining a variance score with respect to the one or more audio streams.

Example 64A: A method according to Example 63A, the method further comprising: increasing the variance score when there is a discontinuity with respect to at least one of the one or more audio streams.

Example 65A: A method according to Example 64A, wherein the discontinuity comprises a gap in a frequency response of the at least one audio stream.

Example 66A: A method according to any combination of Examples 63A through 65A, the method further comprising: comparing the variance score to a variance threshold; and determining the parameter adjustment based at least in part on the comparison of the variance score to the variance threshold.

Example 67A: A method according to any combination of Examples 51A through 66A, wherein determining the parameter adjustment includes: determining a variation in gain of the one or more audio streams.

Example 68A: A method according to any combination of Examples 51A through 67A, the method comprising: rendering an energy plot overlay based at least in part on the at least one energy map.

Example 69A: A method according to Example 68A, the method further comprising: outputting the energy plot overlay for display to a user.

Example 70A: A method according to any combination of Examples 51A through 69A, the method further comprising: accessing diagnostic data for at least one of the one or more audio streams; determining a quality characteristic for the one or more audio streams based at least in part on the diagnostic data; modifying, based at least in part on the quality characteristic, at least one of: the one or more energy maps and the plurality of audio streams; and determining, based at least in part on the modification, the parameter adjustment.

Example 71A: A method according to any combination of Examples 51A through 70A, the method further comprising: determining a permission status that corresponds to at least one of the one or more audio streams; modifying, based at least in part on the permission status, at least one of: the one or more energy maps and the plurality of audio streams; and determining, based at least in part on the modification, the parameter adjustment.

Example 72A: A method according to Example 71A, wherein the permission status indicates whether the one or more audio streams are restricted or unrestricted.

Example 73A: A method according to any combination of Examples 51A through 72A, the method further comprising: determining a feasibility status of the one or more microphones, the feasibility status indicating a feasibility score for the one or more microphones; modifying, based at least in part on the feasibility status, at least one of: the at least one energy map and the one or more audio streams; and determining, based at least in part on the modification, the parameter adjustment.

Example 74A: A method according to any combination of Examples 70A through 73A, wherein modifying comprises: adjusting a number of energy map components used to determine the at least one energy map.

Example 75A: A method according to any combination of Examples 70A through 74A, wherein modifying comprises removing at least one audio stream from the one or more audio streams.

Example 76A: A method according to any combination of Examples 70A through 75A, the method further comprising: receiving the diagnostic data as self-diagnostic data.

Example 77A: A method according to any combination of Examples 70A through 76A, wherein the diagnostic data comprises at least one of: signal-to-noise ratio information and gain information.

Example 78A: A method according to any combination of Examples 70A through 77A, wherein determining the quality characteristic comprises: tagging at least one of the one or more audio streams as an audio stream.

Example 79A: A method according to any combination of Examples 51A through 78A, the method further comprising: determining an adjustment status.

Example 80A: A method according to Example 79A, wherein the adjustment status indicates that the at least one microphone is receiving audio.

Example 81A: A method according to Example 80A, wherein the adjustment status indicates that at least one microphone is receiving audio in accordance with the parameter adjustment.

Example 82A: A method according to any combination of Examples 51A through 81A, the method further comprising: periodically updating the at least one energy map with respect to an audio frame rate.

Example 83A: A method according to any combination of Examples 51A through 82A, wherein at least one audio device performs the method, the at least one audio device comprising a wearable device.

Example 84A: A method according to any combination of Examples 51A through 83A, wherein at least one audio device performs the method, the at least one audio device comprising a mobile device.

Example 85A: A method according to Example 84A, wherein the mobile device comprises a mobile handset.

Example 86A: A method according to any combination of Examples 51A through 85A, wherein at least one audio device performs the method, the at least one audio device comprising the at least one microphone.

Example 87A: A method according to any combination of Examples 51A through 86A, wherein at least one audio device performs the method, the at least one audio device comprising a headset coupled to one or more speakers.

Example 88A: A method according to any combination of Examples 51A through 87A, wherein at least one audio device performs the method, the at least one audio device comprising one or more speakers.

Example 89A: A method according to any combination of Examples 51A through 88A, wherein at least one audio device performs the method, the at least one audio device comprising an extended reality (XR) headset coupled to one or more speakers.

Example 90A: A method according to Example 89A, wherein the XR headset comprises one or more of an augmented reality headset, a virtual reality headset or a mixed reality headset.

Example 91A: A method according to any combination of Examples 51A through 90A, wherein at least one audio device performs the method, the at least one audio device comprising one or more speakers configured to generate a soundfield.

Example 92A: A method according to any combination of Examples 51A through 91A, wherein at least one audio device performs the method, wherein the at least one audio device is configured to provide a six degrees-of-freedom user experience.

Example 93A: A method according to any combination of Examples 51A through 92A, wherein at least one audio device performs the method, the at least one audio device including at least one audio receiver, the audio receiver enabled to receive audio from one or more source devices.

Example 94A: A method according to any combination of Examples 51A through 93A, wherein at least one audio device performs the method, the at least one audio device including at least one audio receiver, the audio receiver configured to receive the one or more audio streams.

Example 95A: A method according to Example 94A, wherein the receiver includes a receiver configured to receive the one or more audio streams in accordance with a 5G cellular standard.

Example 96A: A method according to Example 94A, wherein the receiver includes a receiver configured to receive the one or more audio streams in accordance with a personal area network standard.

Example 97A: A method according to any combination of Examples 51A through 96A, the method further comprising: receiving, over a wireless link, at least one of: the one or more audio streams and the at least one energy map.

Example 98A: A method according to Example 97A, wherein the wireless link is over a 5G air interface.

Example 99A: A method according to Example 97A, wherein the wireless link is over a Bluetooth interface.

Example 100A: A method according to any combination of Examples 51A through 99A, wherein the audio device comprises a remote server configured to determine the at least one energy map.

Example 101A: An audio device configured to adjust a capture of audio, the audio device comprising: means for accessing at least one energy map, the at least one energy map corresponding to one or more audio streams; means for determining, based at least in part on the at least one energy map, a parameter adjustment with respect to at least one microphone, the parameter adjustment configured to adjust the capture of audio by the at least one microphone; and means for outputting an indication indicating the parameter adjustment with respect to the at least one microphone.

Example 102A: An audio device according to Example 101A, the audio device further comprising: means for performing an energy analysis with respect to the one or more audio streams to determine the at least one of the energy map.

Example 103A: An audio device according to any combination of Examples 101A and 102A, the audio device further comprising: means for comparing the at least one energy map to one or more other energy maps, the one or more other energy maps corresponding to audio captured by the at least one microphone; and means for determining the parameter adjustment based at least in part on the comparison between the at least one energy map and the one or more other energy maps.

Example 104A: An audio device according to any combination of Examples 101A through 103A, the audio device further comprising: means for receiving, from one or more source devices, at least one of: the at least one energy map and the one or more energy maps.

Example 105A: An audio device according to any combination of Examples 101A through 104A, wherein the at least one energy map comprises a plurality of energy map components.

Example 106A: An audio device according to Example 105A, wherein the energy map components correspond to the one or more audio streams.

Example 107A: An audio device according to any combination of Examples 101A through 106A, where the means for determining the parameter adjustment further comprise: means for analyzing at least one of: gain and frequency response.

Example 108A: An audio device according to any combination of Examples 101A through 107A, wherein the parameter adjustment is configured to modify capture of one or more audio streams.

Example 109A: An audio device according to any combination of Examples 101A through 108A, wherein the parameter adjustment includes an adjustment to a gain of the at least one microphone.

Example 110A: An audio device according to Example 109A, wherein the gain is frequency dependent.

Example 111A: An audio device according to any combination of Examples 101A through 110A, further comprising: means for utilizing, in accordance with the parameter adjustment, one or more parameter settings of the at least one microphone.

Example 112A: An audio device according to any combination of Examples 101A through 111A, further comprising: means for transmitting, to a first source device that corresponds to the at least one microphone, the parameter adjustment.

Example 113A: An audio device according to any combination of Examples 101A through 112A, wherein the means for determining the parameter adjustments further comprise: means for determining a variance score with respect to one or more audio streams.

Example 114A: An audio device according to Example 113A, wherein the variance score increases when there is a discontinuity between at least one of the one or more audio streams.

Example 115A: An audio device according to Example 114A, wherein the discontinuity comprises a gap in a frequency response of the at least one audio stream.

Example 116A: An audio device according to any combination of Examples 113A through 115A, the audio device further comprising: means for comparing the variance score to a variance threshold; and means for determining the parameter adjustment based at least in part on the comparison of the variance score to the variance threshold.

Example 117A: An audio device according to any combination of Examples 101A through 116A, wherein the means for determining the parameter adjustment further comprise: means for determining a variation in gain of the one or more audio streams wherein the variance is based at least in part on a variation in gain of the at least one audio stream.

Example 118A: An audio device according to any combination of Examples 101A through 117A, further comprising: means for rendering an energy plot overlay based at least in part on the at least one energy map.

Example 119A: An audio device according to Example 118A, the audio device further comprising: means for outputting the energy plot overlay for display to a user.

Example 120A: An audio device according to any combination of Examples 101A through 119A, the audio device further comprising: means for accessing diagnostic data for at least one of the one or more audio streams; means for determining a quality characteristic for the one or more audio streams based at least in part on the diagnostic data; means for modifying, based at least in part on the quality characteristic, at least one of: the at least one energy map and the one or more audio streams; and means for determining, based at least in part on the modification, the parameter adjustment.

Example 121A: An audio device according to any combination of Examples 101A through 120A, the audio device further comprising: means for determining a permission status that corresponds to at least one of the one or more audio streams; means for modifying, based at least in part on the permission status, at least one of: the at least one energy map and the one or more audio streams; and means for determining, based at least in part on the modification, the parameter adjustment.

Example 122A: An audio device according to Example 121A, wherein the permission status indicates whether the one or more audio streams are restricted or unrestricted.

Example 123A: An audio device according to any combination of Examples 101A through 122A, the audio device further comprising: means for determining a feasibility status of the one or more microphones, the feasibility status indicating a feasibility score for the one or more microphones; means for modifying, based at least in part on the feasibility status, at least one of: the at least one energy map and the one or more audio streams; and means for determining, based at least in part on the modification, the parameter adjustment.

Example 124A: An audio device according to any combination of Examples 120A through 123A, wherein the means for modifying further comprises: means for adjusting a number energy map components used to determine the at least one energy map.

Example 125A: An audio device according to any combination of Examples 120A through 124A, wherein the means for modifying further comprises: means for removing at least one audio stream from the one or more audio streams.

Example 126A: An audio device according to any combination of Examples 120A through 125A, the audio device further comprising: means for receiving the diagnostic data as self-diagnostic data.

Example 127A: An audio device according to any combination of Examples 120A through 126A, wherein the diagnostic data comprises at least one of: signal-to-noise ratio information and gain level information.

Example 128A: An audio device according to any combination of Examples 120A through 127A, the audio device further comprising: means for tagging, based at least in part on the quality characteristic, at least one of the one or more audio streams as an ineligible audio stream.

Example 129A: An audio device according to any combination of Examples 101A through 128A, the audio device further comprising: means for determining an adjustment status.

Example 130A: An audio device according to Example 129A, wherein the means for determining an adjustment status includes means for indicating a successful adjustment with respect to the at least one microphone receiving audio in accordance with the parameter adjustment.

Example 131A: An audio device according to any combination of Examples 129A and 130A, wherein the means for determining the adjustment status includes means for indicating that the at least one microphone is receiving audio.

Example 132A: An audio device according to any combination of Examples 101A through 131A, the audio device further comprising: means for periodically updating the at least one energy map with respect to an audio frame rate.

Example 133A: An audio device according to any combination of Examples 101A through 132A, wherein the audio device comprises a wearable device.

Example 134A: An audio device according to any combination of Examples 101A through 133A, wherein the audio device comprises a mobile device.

Example 135A: An audio device according to any combination of Examples 101A through 134A, wherein the mobile device comprises a mobile handset.

Example 136A: An audio device according to any combination of Examples 101A through 135A, wherein the audio device comprises at least one of the microphones from the one or more microphones.

Example 137A: An audio device according to any combination of Examples 101A through 136A, wherein the audio device comprises a headset coupled to one or more speakers.

Example 138A: An audio device according to any combination of Examples 101A through 137A, wherein the audio device comprises one or more speakers.

Example 139A: An audio device according to any combination of Examples 101A through 138A, wherein the audio device includes an extended reality (XR) headset coupled to one or more speakers.

Example 140A: An audio device according to Example 139A, wherein the XR headset comprises one or more of an augmented reality headset, a virtual reality headset or a mixed reality headset.

Example 141A: An audio device according to any combination of Examples 101A through 140A, wherein the audio device includes means for generating a soundfield.

Example 142A: An audio device according to any combination of Examples 101A through 141A, further comprising means for providing a six degrees-of-freedom user experience.

Example 143A: An audio device according to any combination of Examples 101A through 142A, wherein the audio device comprises at least one audio receiver, the audio receiver comprising means for receiving audio from one or more source devices.

Example 144A: An audio device according to any combination of Examples 101A through 143A, wherein the audio device comprises a receiver comprising means for receiving the one or more audio streams.

Example 145A: An audio device according to Example 144A, wherein the receiver includes a receiver comprising means to receive the one or more audio streams in accordance with a 5G cellular standard.

Example 146A: An audio device according to Example 144A, wherein the receiver includes a receiver comprising means to receive the one or more audio streams in accordance with a personal area network standard.

Example 147A: An audio device according to any combination of Examples 101A through 146A, further comprising: means for receiving, over a wireless link, at least one of: the one or more audio streams and the at least one energy map.

Example 148A: An audio device according to Example 147A, wherein the means for receiving over a wireless link includes a 5G air interface.

Example 149A: An audio device according to Example 147A, wherein the means for receiving over a wireless link includes a Bluetooth interface.

Example 150A: An audio device according to any combination of Examples 111A through 149A, wherein the audio device comprises a remote server comprising means for determining the at least one energy map.

Example 151A: A non-transitory computer-readable storage medium having stored thereon instructions that, when executed, cause one or more processors of an audio device to: access at least one energy map that corresponds to one or more audio streams; determine, based at least in part on the at least one energy map, a parameter adjustment with respect to at least one microphone, the parameter adjustment configured to adjust the capture of audio by the at least one microphone; and output an indication indicating the parameter adjustment with respect to the at least one microphone.

Example 1B: An audio device configured to generate a soundfield, the audio device comprising: a memory configured to store audio data representative of the soundfield; and one or more processors coupled to the memory, and configured to: transmit an audio stream to one or more source devices; determine an instruction to adjust a parameter setting of the audio device; and adjust the parameter setting to adjust generation of the soundfield.

Example 2B: An audio device according to Example 1B, wherein the one or more processors are configured to transmit diagnostic data to the one or more source devices.

Example 3B: An audio device according to any combination of Examples 1B and 2B, wherein the one or more processors are configured to: perform an energy analysis with respect to the audio stream to determine at least one energy map; and transmit the at least one energy map to the one or more source devices.

Example 4B: An audio device according to any combination of Examples 1B through 3B, wherein the parameter setting is configured to modify capture of the audio stream.

Example 5B: An audio device according to any combination of Examples 1B through 4B, wherein the parameter setting includes an adjustment to a frequency-dependent gain of the audio device.

Example 6B: An audio device according to any combination of Examples 1B through 5B, wherein the one or more processors are configured to render an energy plot overlay based at least in part the at least one energy map.

Example 7B: The device of Example 6B, wherein the energy plot overlay is rendered based at least in part on a composite energy map, the composite energy map based at least in part on the at least one energy map.

Example 8B: An audio device according to any combination of Examples 6B and 7B, wherein the one or more processors are configured to output the energy plot overlay for display to a user.

Example 9B: An audio device according to any combination of Examples 1B through 8B, wherein the one or more processors are configured to: determine a quality characteristic for the audio stream; and transmit the quality characteristic to the one or more source devices.

Example 10B: An audio device according to any combination of Examples 1B through 9B, wherein the one or more processors are configured to: transmit, to the or more source devices, at least one of: a permission status and a feasibility status.

Example 11B: An audio device according to any combination of Examples 1B through 10B, wherein the instruction is received from the one or more source devices.

Example 12B: An audio device according to any combination of Examples 1B through 11B, wherein the one or more processors are configured to: receive a composite energy map from the one or more source devices.

Example 13B: An audio device according to any combination of Examples 1B through 12B, wherein the instruction is based at least in part on a composite energy map.

Example 14B: An audio device according to any combination of Examples 1B through 13B, wherein the one or more processors are configured to: receive diagnostic data from the one or more source devices, wherein the diagnostic data comprises at least one of: signal-to-noise ratio information and sound level information.

Example 15B: An audio device according to any combination of Examples 1B through 14B, wherein the one or more processors are configured to: transmit an adjustment status.

Example 16B: An audio device according to any combination of Example 15B, wherein the adjustment status indicates that the audio device is receiving audio.

Example 17B: An audio device according to any combination of Examples 1B through 16B, wherein the audio device comprises a wearable device.

Example 18B: An audio device according to any combination of Examples 1B through 17B, wherein the audio device comprises a mobile device.

Example 19B: An audio device according to any combination of Examples 18B, wherein the mobile device comprises a mobile handset.

Example 20B: An audio device according to any combination of Examples 1B through 19B, wherein the audio device comprises at least one microphone.

Example 21B: An audio device according to any combination of Examples 1B through 20B, wherein the audio device comprises a headset coupled to one or more speakers.

Example 22B: An audio device according to any combination of Examples 1B through 21B, wherein the audio device comprises one or more speakers.

Example 23B: An audio device according to any combination of Examples 1B through 22B, wherein the audio device includes an extended reality (XR) headset coupled to one or more speakers.

Example 24B: An audio device according to Example 23B, wherein the XR headset comprises one or more of an augmented reality headset, a virtual reality headset or a mixed reality headset.

Example 25B: An audio device according to any combination of Examples 1B through 24B, wherein the audio device includes one or more speakers configured to generate a soundfield.

Example 26B: An audio device according to any combination of Examples 1B through 25B, wherein the one or more source devices comprises a plurality of audio receivers.

Example 27B: An audio device according to any combination of Examples 1B through 26B, wherein the audio device includes a transmitter configured to transmit data in accordance with a 5G cellular standard.

Example 28B: An audio device according to any combination of Examples 1B through 27B, wherein the audio device includes a transmitter configured to transmit data in accordance with a personal area network standard.

Example 29B: An audio device according to any combination of Examples 1B through 28B, wherein the one or more processors are configured to: transmit, over a wireless link, at least one of: the audio stream and the at least one energy map.

Example 30B: An audio device according to Example 29B, wherein the wireless link is over a 5G air interface.

Example 31B: An audio device according to Example 29B, wherein the wireless link is over a Bluetooth interface.

Example 32B: An audio device according to any combination of Examples 1B through 31B, wherein the audio device comprises a remote server configured to determine the at least one energy map.

Example 33B: A method for configuring an audio device configured to adjust a capture of audio, the method comprising: transmitting an audio stream to one or more source devices; determining an instruction to adjust a parameter setting of the audio device; and adjusting the parameter setting to adjust of a soundfield.

Example 34B: A method according to Example 33B, the method further comprising: transmitting diagnostic data to the one or more source devices.

Example 35B: The method any combination of Examples 33B and 34B, the method further comprising: performing an energy analysis with respect to the audio stream to determine at least one energy map; and transmitting the energy map to the one or more source devices.

Example 36B: A method according to any combination of Examples 33B through 35B, wherein the parameter setting is configured to modify capture of the audio stream.

Example 37B: A method according to any combination of Examples 33B through 36B, wherein the parameter setting includes an adjustment to a frequency-dependent gain of the audio device.

Example 38B: A method according to any combination of Examples 33B through 37B, the method further comprising: rendering an energy plot overlay based at least in part on the at least one energy map.

Example 39B: A method according to Example 38B, wherein the energy plot overlay is rendered based at least in part on a composite energy map, the composite energy map based at least in part on the one or more energy maps.

Example 40B: A method according to any combination of Examples 38B and 39B, the method further comprising: outputting the energy plot overlay for display to a user.

Example 41B: A method according to any combination of Examples 33B through 40B, the method further comprising: determining a quality characteristic for the audio stream; and transmitting the quality characteristic to the one or more source devices.

Example 42B: A method according to any combination of Examples 33B through 41B, the method further comprising: transmitting, to the or more source devices, at least one of: a permission status and a feasibility status.

Example 43B: A method according to any combination of Examples 33B through 42B, the method further comprising: receiving the instruction from the one or more source devices.

Example 44B: A method according to any combination of Examples 33B through 43B, the method further comprising: receiving a composite energy map from the one or more source devices.

Example 45B: A method according to any combination of Examples 33B through 44B, wherein the instruction is based at least in part on a composite energy map.

Example 46B: A method according to any combination of Examples 33B through 45B, the method further comprising: receiving diagnostic data from the one or more source devices, wherein the diagnostic data comprises at least one of: signal-to-noise ratio information and sound level information.

Example 47B: A method according to any combination of Examples 33B through 46B, the method further comprising: transmitting an adjustment status.

Example 48B: A method according to Example 47B, wherein the adjustment status indicates that the audio device is receiving audio.

Example 49B: A method according to any combination of Examples 33B through 48B, wherein at least one audio device performs the method, the at least one audio device comprising a wearable device.

Example 50B: A method according to any combination of Examples 33B through 49B, wherein at least one audio device performs the method, the at least one audio device comprising a mobile device.

Example 51B: A method according to any combination of Examples 33B through 50B, wherein at least one audio device performs the method, the at least one audio device comprising a headset coupled to one or more speakers.

Example 52B: A method according to any combination of Examples 33B through 51B, wherein at least one audio device performs the method, the at least one audio device comprising one or more speakers.

Example 53B: A method according to any combination of Examples 33B through 52B, wherein at least one audio device performs the method, the at least one audio device comprising an extended reality (XR) headset coupled to one or more speakers.

Example 54B: A method according to Example 53B, wherein the XR headset comprises one or more of an augmented reality headset, a virtual reality headset or a mixed reality headset.

Example 55B: A method according to any combination of Examples 33B through 54B, wherein at least one audio device performs the method, the at least one audio device comprising one or more speakers configured to generate a soundfield.

Example 56B: A method according to any combination of Examples 33B through 55B, wherein at least one audio device performs the method, the at least one audio device comprising a plurality of audio receivers.

Example 57B: A method according to any combination of Examples 33B through 56B, wherein at least one audio device performs the method, the at least one audio device comprises at least one microphone.

Example 58B: A method according to any combination of Examples 33B through 57B, wherein at least one audio device performs the method, the at least one audio device comprising a headset coupled to one or more speakers.

Example 59B: A method according to any combination of Examples 33B through 58B, wherein at least one audio device performs the method, the at least one audio device comprises one or more speakers.

Example 60B: A method according to any combination of Examples 33B through 59B, wherein at least one audio device performs the method, the at least one audio device comprises a plurality of audio receivers.

Example 61B: A method according to any combination of Examples 33B through 60B, wherein at least one audio device performs the method, the at least one audio device including a transmitter configured to transmit data in accordance with a 5G cellular standard.

Example 62B: A method according to any combination of Examples 33B through 61B, wherein at least one audio device performs the method, the at least one audio device including a transmitter configured to transmit data in accordance with a personal area network standard.

Example 63B: A method according to any combination of Examples 33B through 62B, wherein at least one audio device performs the method, the at least one audio device configured to: transmit, over a wireless link, at least one of: the audio stream and the at least one energy map.

Example 64B: A method according to Example 63B, wherein the wireless link is over a 5G air interface.

Example 65B: A method according to Example 63B, wherein the wireless link is over a Bluetooth interface.

Example 66B: A method according to any combination of Examples 33B through 65B, wherein at least one audio device performs the method, the at least one audio device comprising a remote server configured to determine the at least one energy map.

Example 67B: An audio device configured to generate a soundfield, the audio device comprising: means for transmitting an audio stream to one or more source devices; means for determining an instruction to adjust a parameter setting of the audio device; and means for adjusting the parameter setting to adjust generation of a soundfield.

Example 68B: An audio device according to Example 67B, the audio device further comprising: means for transmitting diagnostic data to the one or more source devices.

Example 69B: The audio device any combination of Examples 67B and 68B, the audio device further comprising: means for performing an energy analysis with respect to the audio stream to determine an energy map; and means for transmitting the energy map to the one or more source devices.

Example 70B: An audio device according to any combination of Examples 67B through 69B, wherein the parameter setting is configured to modify capture of the audio stream.

Example 71B: An audio device according to any combination of Examples 67B through 70B, wherein the parameter setting includes an adjustment to a frequency-dependent gain of the audio device.

Example 72B: An audio device according to any combination of Examples 67B through 71B, the audio device further comprising: means for rendering an energy plot overlay based at least in part on one or more energy maps.

Example 73B: An audio device according to Example 72B, the audio device further comprising: means for rendering the energy plot overlay based at least in part on a composite energy map, the composite energy map based at least in part on the one or more energy maps.

Example 74B: An audio device according to any combination of Examples 72B and 73B, the audio device further comprising: means for outputting the energy plot overlay for display to a user.

Example 75B: An audio device according to any combination of Examples 67B through 74B, the audio device further comprising: means for determining a quality characteristic for the audio stream; and means for transmitting the quality characteristic to the one or more source devices.

Example 76B: An audio device according to any combination of Examples 67B through 75B, the audio device further comprising: means for transmitting, to the or more source devices, at least one of: a permission status and a feasibility status.

Example 77B: An audio device according to any combination of Examples 67B through 76B, the audio device further comprising: means for receiving the instruction from the one or more source devices.

Example 78B: An audio device according to any combination of Examples 67B through 58B, the audio device further comprising: means for receiving a composite energy map from the one or more source devices.

Example 79B: An audio device according to any combination of Examples 67B through 78B, wherein the instruction is based at least in part on a composite energy map.

Example 80B: An audio device according to any combination of Examples 67B through 79B, the audio device further comprising: means for receiving diagnostic data from the one or more source devices, wherein the diagnostic data comprises at least one of: signal-to-noise ratio information and sound level information.

Example 81B: An audio device according to any combination of Examples 67B through 80B, the audio device further comprising: means for transmitting an adjustment status.

Example 82B: An audio device according to Example 81B, wherein the adjustment status indicates that the audio device is receiving audio.

Example 83B: An audio device according to any combination of Examples 67B through 82B, wherein the audio device comprises a wearable device.

Example 84B: An audio device according to any combination of Examples 67B through 83B, wherein the audio device comprises a mobile device.

Example 85B: An audio device according to any combination of Examples 67B through 84B, wherein the audio device comprises a headset coupled to one or more speakers.

Example 86B: An audio device according to any combination of Examples 67B through 85B, wherein the audio device comprises one or more speakers.

Example 87B: An audio device according to any combination of Examples 67B through 86B, wherein the audio device comprises an extended reality (XR) headset coupled to one or more speakers.

Example 88B: An audio device according to Example 87B, wherein the XR headset comprises one or more of an augmented reality headset, a virtual reality headset or a mixed reality headset.

Example 89B: An audio device according to any combination of Examples 67B through 88B, wherein the audio device comprises means for generating a soundfield.

Example 90B: An audio device according to any combination of Examples 67B through 89B, wherein the audio device comprises a plurality of audio receivers.

Example 91B: An audio device according to any combination of Examples 67B through 90B, the audio device comprising a plurality of audio receivers.

Example 92B: An audio device according to any combination of Examples 67B through 90B, wherein the audio device comprises at least one microphone.

Example 93B: An audio device according to any combination of Examples 67B through 92B, wherein the audio device comprises a headset coupled to one or more speakers.

Example 94B: An audio device according to any combination of Examples 67B through 93B, wherein the audio device comprises one or more speakers.

Example 95B: An audio device according to any combination of Examples 67B through 94B, wherein the audio device comprises a plurality of audio receivers.

Example 96B: An audio device according to any combination of Examples 67B through 95B, the audio device comprises means for transmitting data in accordance with a 5G cellular standard.

Example 97B: An audio device according to any combination of Examples 67B through 96B, wherein the audio device comprises means for transmitting data in accordance with a personal area network standard.

Example 98B: An audio device according to any combination of Examples 67B through 97B, wherein at least one audio device comprises: means for transmitting, over a wireless link, at least one of: the audio stream and the at least one energy map.

Example 99B: An audio device according to Example 98B, wherein the wireless link is over a 5G air interface.

Example 100B: An audio device according to Example 98B, wherein the wireless link is over a Bluetooth interface.

Example 101B: An audio device according to any combination of Examples 67B through 100B, wherein the audio device comprises a remote server with means to determine the at least one energy map.

Example 102B: A non-transitory computer-readable storage medium having stored thereon instructions that, when executed, cause one or more processors of an audio device to: transmit an audio stream to one or more source devices; determine an instruction to adjust a parameter setting of the audio device; and adjust the parameter setting to adjust generation of a soundfield.

It should be noted that the methods described herein describe possible implementations, and that the operations and the steps may be rearranged or otherwise modified and that other implementations are possible. Further, aspects from two or more of the methods may be combined.

In one or more examples, the functions described may be implemented in hardware, software, firmware, or any combination thereof. When implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, when instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually generate data magnetically, while discs generate data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to determine parameter adjustments for a capture of audio, the device comprising:
    a memory configured to store at least one energy map that corresponds to one or more audio streams; and
    one or more processors coupled to the memory, and configured to:
        access the at least one energy map that corresponds to the one or more audio streams;
        determine, based at least in part on the at least one energy map, a parameter adjustment with respect to at least one audio element, the parameter adjustment configured to adjust capture, by the at least one audio element, of the one or more audio streams; and
        output the parameter adjustment.

2. The device of claim 1, wherein the one or more processors are configured to:
    perform an energy analysis with respect to the one or more audio streams to determine the at least one energy map.

3. The device of claim 1, wherein the one or more processors are configured to:
    compare the at least one energy map to one or more other energy maps, the one or more other energy maps corresponding to audio captured by the at least one audio element; and
    determine the parameter adjustment based at least in part on the comparison between the at least one energy map and the one or more other energy maps.

4. The device of claim 1, wherein the one or more processors are configured to:
    utilize, in accordance with the parameter adjustment, one or more parameter settings of the at least one audio element to receive audio.

5. The device of claim 1, wherein the one or more processors are configured to:
    transmit, to a first source device that corresponds to the at least one audio element, the parameter adjustment.

6. The device of claim 1, wherein the one or more processors are configured to:
    determine a quality characteristic for the one or more audio streams;
    modify, based at least in part on the quality characteristic, at least one of: the at least one energy map and the one or more audio streams; and
    determine, based at least in part on the modification, the parameter adjustment.

7. The device of claim 1, wherein the one or more processors are configured to:
    determine a permission status that corresponds to at least one of the one or more audio streams;
    modify, based at least in part on the permission status, at least one of: the at least one energy map and the one or more audio streams; and
    determine, based at least in part on the modification, the parameter adjustment.

8. The device of claim 1, wherein the one or more processors are configured to:
    determine a feasibility status of the one or more audio elements, the feasibility status indicating a feasibility score for the one or more audio elements;
    modify, based at least in part on the feasibility status, at least one of: the at least one energy map and the one or more audio streams; and
    determine, based at least in part on the modification, the parameter adjustment.

9. The device of claim 1, wherein the device comprises one or more speakers.

10. The device of claim 1, wherein the device includes an extended reality (XR) headset.

11. The device of claim 1, wherein the device comprises the at least one audio element, wherein the at least one audio element is configured to receive audio.

12. The device of claim 1, wherein the at least one audio element comprises at least one microphone configured to receive the one or more audio streams.

13. The device of claim 1, wherein the one or more processors are configured to:
    receive, over a wireless link, at least one of: the one or more audio streams and the at least one energy map.

14. The device of claim 1, wherein the device comprises a remote server configured to determine the at least one energy map.

15. A method for determining parameter adjustment for a capture of audio, the method comprising:
    accessing at least one energy map, the at least one energy map corresponding to one or more audio streams;

determining, based at least in part on the at least one energy map, a parameter adjustment with respect to at least one audio element, the parameter adjustment configured to adjust capture, by the at least one audio element, of the one or more audio streams; and outputting an indication indicating the parameter adjustment with respect to the at least one of audio element.

16. The method of claim 15, the method further comprising:

performing an energy analysis with respect to the one or more audio streams to determine the at least one of the energy map.

17. The method of claim 15, the method further comprising:

comparing the at least one energy map to one or more other energy maps; and determining the parameter adjustment based at least in part on the comparison between the at least one energy map and the one or more other energy maps.

18. The method of claim 17, the method further comprising:

receiving, from one or more source devices, at least one of: the at least one energy map and the one or more other energy maps.

19. The method of claim 15, the method further comprising:

analyzing, in determining the parameter adjustment, at least one of: a gain and a frequency response for the at least one audio element.

20. The method of claim 15, wherein the at least one audio element includes a microphone, and wherein the parameter adjustment includes an adjustment to a gain of the microphone.

21. The method of claim 15, the method comprising:

utilizing, in accordance with the parameter adjustment, one or more parameter settings of the at least one audio element to receive audio.

22. The method of claim 15, the method further comprising:

transmitting, to a first source device that corresponds to the at least one audio element, the parameter adjustment.

23. The method of claim 15, wherein determining the parameter adjustment includes:

determining a variance score with respect to the one or more audio streams.

24. The method of claim 23, the method further comprising:

comparing the variance score to a variance threshold; and determining the parameter adjustment based at least in part on the comparison of the variance score to the variance threshold.

25. The method of claim 15, the method further comprising:

determining a quality characteristic for the one or more audio streams;

modifying, based at least in part on the quality characteristic, at least one of: the at least one energy map and the one or more audio streams; and determining, based at least in part on the modification, the parameter adjustment.

26. The method of claim 15, the method further comprising:

determining a permission status that corresponds to at least one of the one or more audio streams;

modifying, based at least in part on the permission status, at least one of: the at least one energy map and the one or more audio streams; and determining, based at least in part on the modification, the parameter adjustment.

27. The method of claim 15, the method further comprising:

determining a feasibility status of the at least one audio element, the feasibility status indicating a feasibility score for the at least one audio element;

modifying, based at least in part on the feasibility status, at least one of: the at least one energy map and the one or more audio streams; and determining, based at least in part on the modification, the parameter adjustment.

28. The method of claim 15, the method further comprising:

receiving, over a wireless link, at least one of: the one or more audio streams and the at least one energy map.

29. A device configured to adjust a capture of audio, the device comprising:

means for accessing at least one energy map, the at least one energy map corresponding to one or more audio streams;

means for determining, based at least in part on the at least one energy map, a parameter adjustment with respect to at least one audio element, the parameter adjustment configured to adjust the capture, by the at least one audio element, of the one or more audio streams; and means for outputting an indication indicating the parameter adjustment with respect to the at least one audio element.

30. A non-transitory computer-readable storage medium having stored thereon instructions that, when executed, cause one or more processors to:

access at least one energy map that corresponds to one or more audio streams;

determine, based at least in part on the at least one energy map, a parameter adjustment with respect to at least one audio element, the parameter adjustment configured to adjust the capture, by the at least one audio element, of the one or more audio streams; and output an indication indicating the parameter adjustment with respect to the at least one audio element.

* * * * *